United States Patent
Kikuchi et al.

(10) Patent No.: US 6,457,007 B1
(45) Date of Patent: Sep. 24, 2002

(54) DISTRIBUTED DATABASE MANAGEMENT SYSTEM INCLUDING LOGICAL DATABASE CONSTITUTED BY A GROUP OF PHYSICAL DATABASES

(75) Inventors: Satoshi Kikuchi; Hiromichi Ito; Keiichi Nakane; Hisashi Hashimoto, all of Yokohama; Eisaku Nishiyama, Ebina, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 08/285,534

(22) Filed: Aug. 5, 1994

(30) Foreign Application Priority Data

Aug. 5, 1993 (JP) .............................. 5-194470
May 31, 1994 (JP) .............................. 6-118517

(51) Int. Cl.[7] .............................................. G06F 17/30
(52) U.S. Cl. ......................................... 707/10; 707/100
(58) Field of Search .................... 395/600; 364/DIG. 1, 364/DIG. 2; 707/10, 100, 102, 103 R–103 Z

(56) References Cited

U.S. PATENT DOCUMENTS

| | | | | |
|---|---|---|---|---|
| 4,853,843 A | * | 8/1989 | Ecklund ..................... | 395/600 |
| 5,181,238 A | * | 1/1993 | Medamana et al. .......... | 379/95 |
| 5,247,575 A | * | 9/1993 | Sprague et al. ............. | 380/9 |
| 5,333,317 A | * | 7/1994 | Dann ......................... | 395/600 |
| 5,412,806 A | * | 5/1995 | Du et al. .................... | 395/600 |
| 5,426,747 A | * | 6/1995 | Weinreb et al. ............. | 395/400 |
| 5,457,797 A | * | 10/1995 | Butterworth et al. ....... | 395/650 |

OTHER PUBLICATIONS

W. Litwin et al., "Interoperability of Multiple Autonomous Databases", *ACM Computing Surveys*, vol. 22, No. 3, Sep. 1990, pp. 267–293.

W. Litwin et al., "Interoperability of Multiple Autonomous Databases", *computer science—acm computing surveys '90*, special issue of bit, Jul. 1992, pp. 115–139, published by Kyoritsu Shuppan Co., Ltd., Tokyo, Japan (in Japanese).

* cited by examiner

*Primary Examiner*—Maria N. Von Buhr
(74) *Attorney, Agent, or Firm*—Antonelli, Terry, Stout, & Kraus, LLP

(57) ABSTRACT

A distributed database management system includes a communication network, at least a terminal device including an application program execution unit connected to the communication network, a plurality of information processors connected to the communication network, a plurality of physical databases installed in at least one of the information processors, at least a logical database grouping a plurality of the, physical databases, the logical database being defined by logical database information stored in at least one of the terminal device and the plurality of information processors, at least a table stored in at least one of the physical databases, and a table location searching unit installed in at least one of the terminal device and the plurality of information processors, for searching a table stored in at least one of the physical databases based on the logical database information, the table being requested to access on a logical database, from the application program execution unit.

42 Claims, 32 Drawing Sheets

FIG. 3(a)

LOGICAL DATABASE CREATING STATEMENT     14

```
CREATE [ PUBLIC ] LOGICAL DATABASE logical database name
[ (USER _ ID logical database user ID IDENTIFY logical database pass word
[, USER _ ID logical database user ID IDENTIFY logical database pass word ]...)]
   (DATABASE database name USER_ID database user ID IDENTIFY database pass word
   [, DATABASE database name USER_ID database user ID IDENTIFY database pass word ...)
```

FIG. 3(b)

LOGICAL DATABASE DELETING STATEMENT    15

```
DROP LOGICAL DATABASE logical database name
```

FIG. 3(c)

LOGICAL DATABASE ACCESS PRIVILEGE GRANTING STATEMENT    16

```
GRANT privileges ON logical database name TO USER | GROUP | PUBLIC user ID | group ID
```

FIG. 4

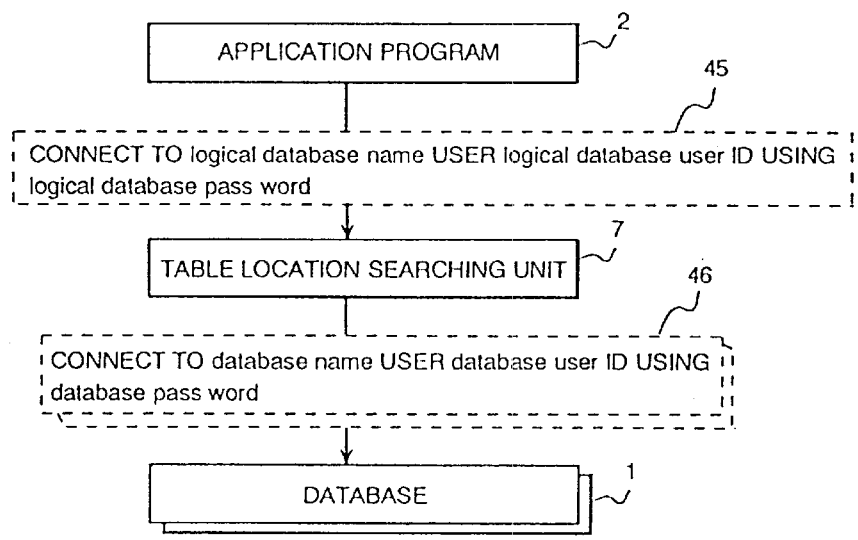

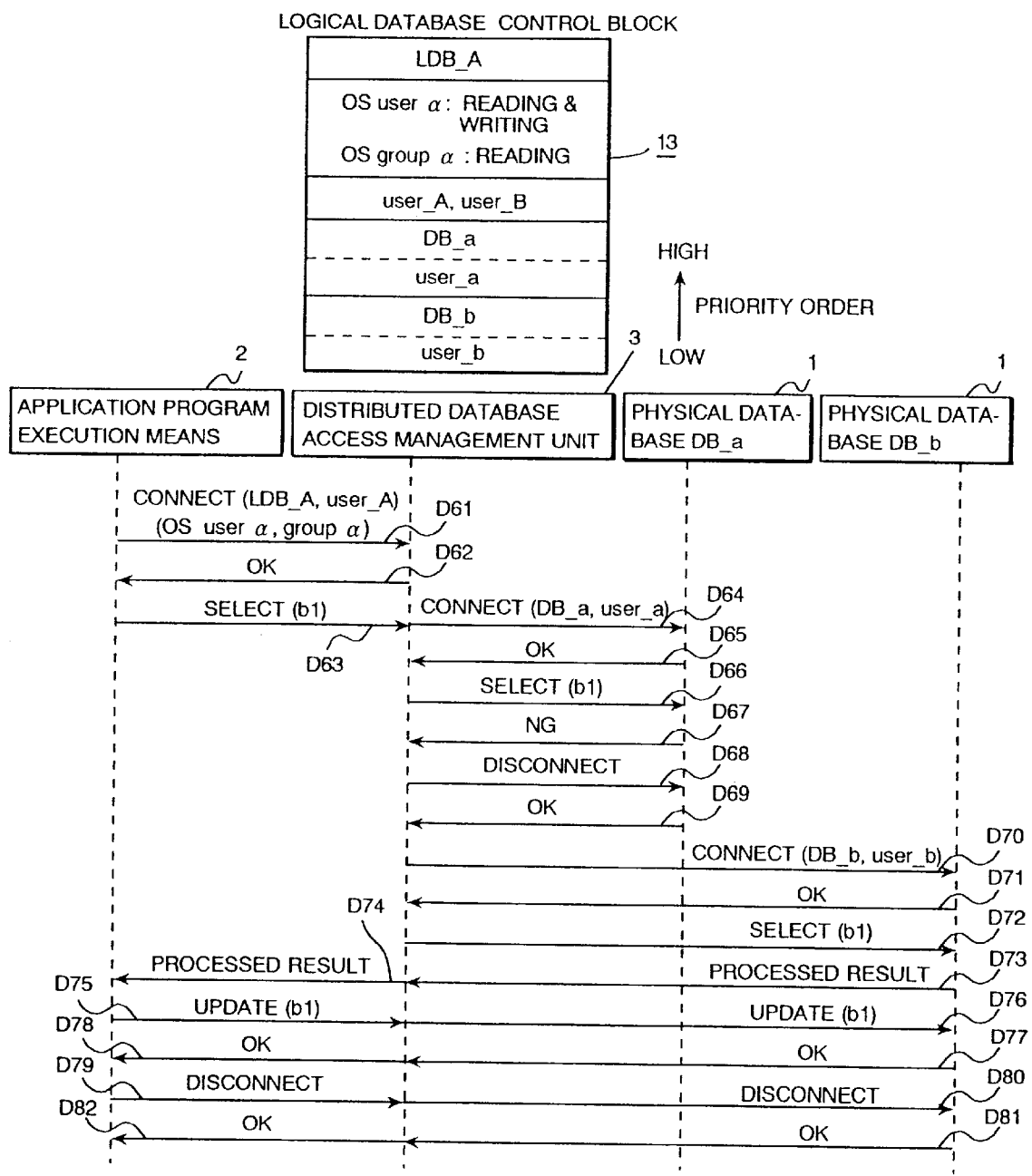

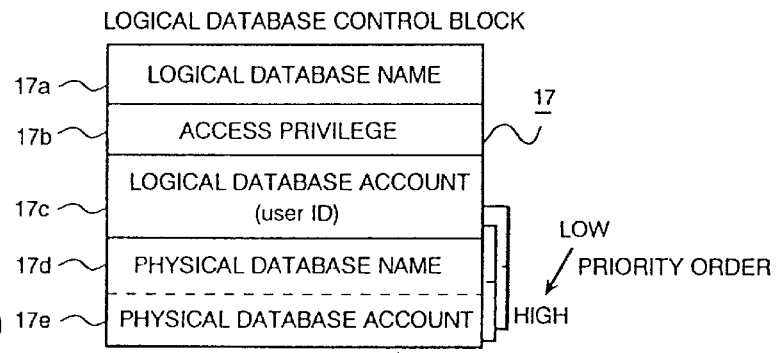
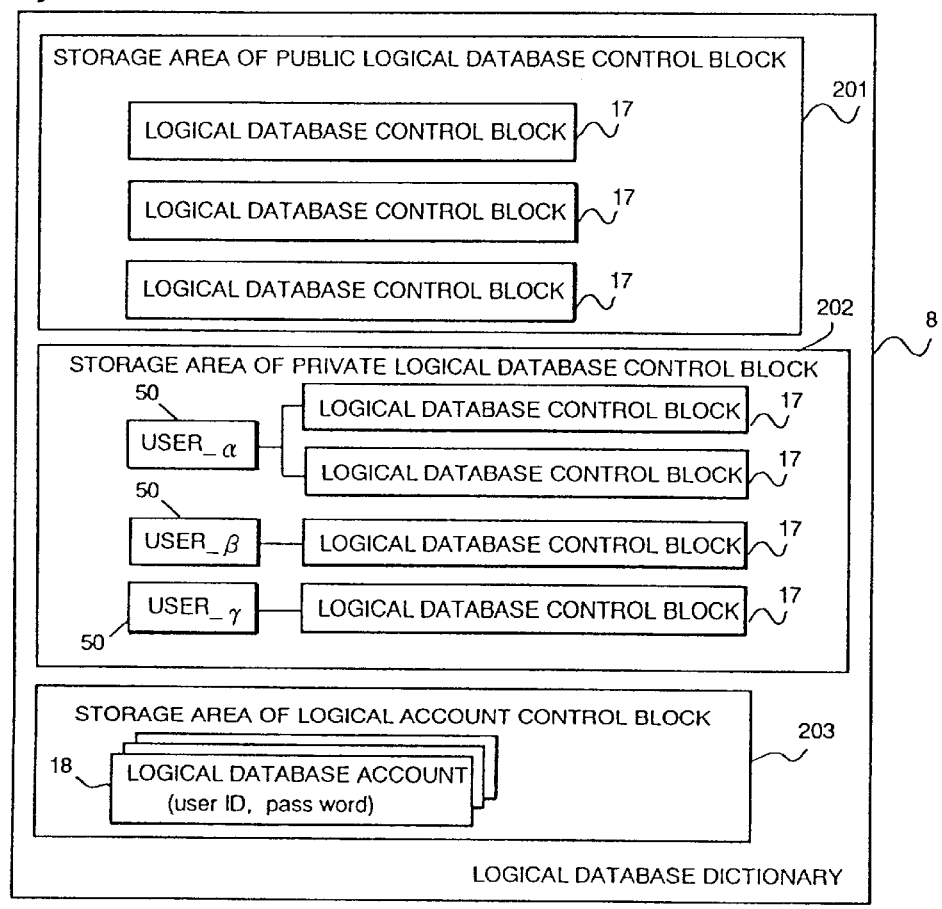

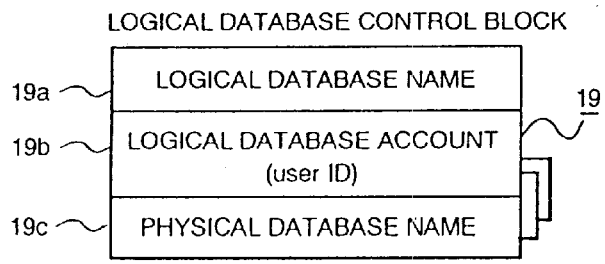
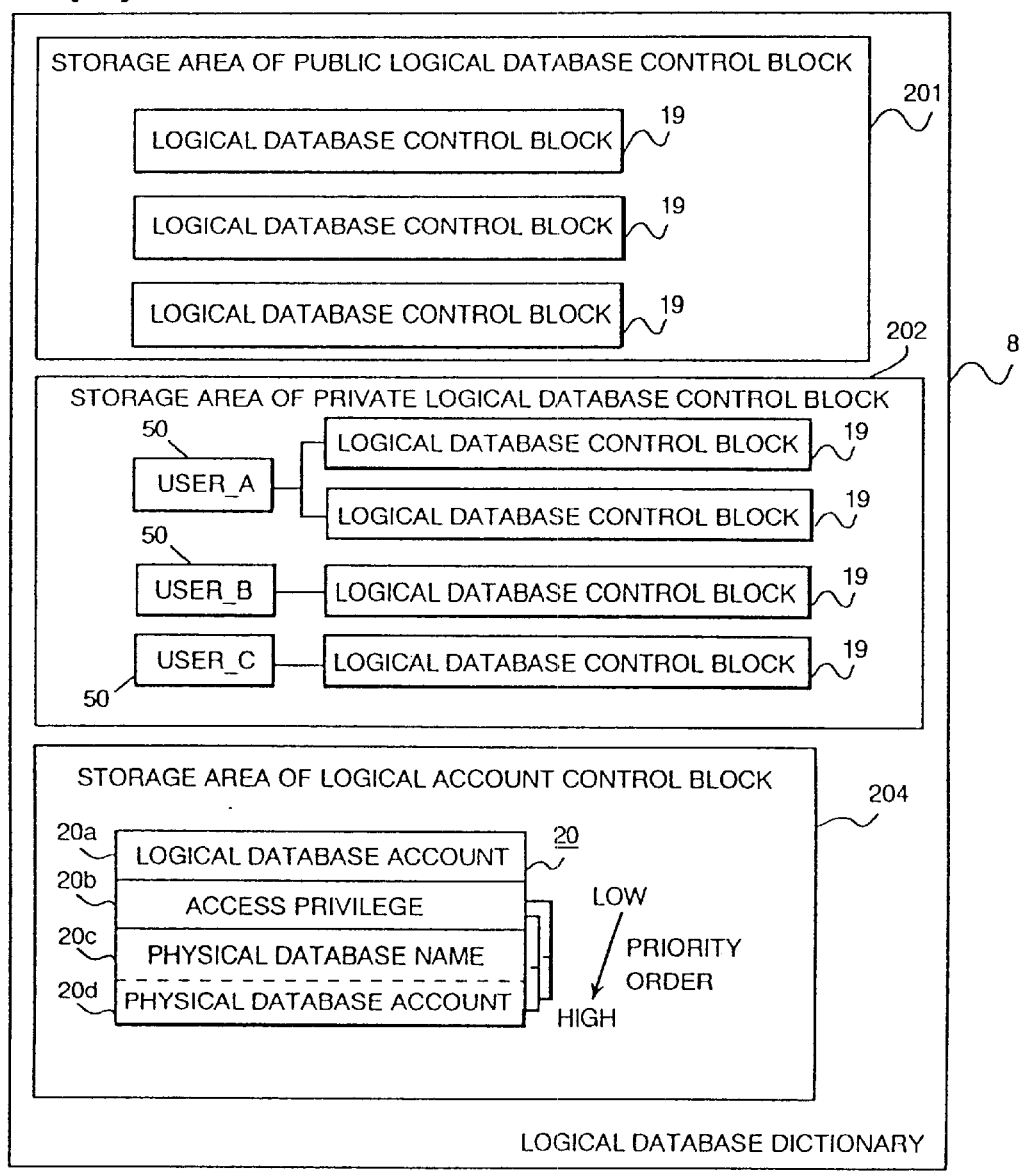

LOGICAL DATABASE ACCESS LOG BUFFER 25

| LOGICAL DATABASE NAME | LOGICAL DATABASE USER ID | TABLE NAME | PHYSICAL DATABASE NAME | PHYSICAL DATABASE USER ID | ACCESS DATE |
|---|---|---|---|---|---|
| | | | | | |
| | | | | | |
| | | | | | |
| | | | | | |

FIG. 18(a)

LOGICAL DATABASE CREATING STATEMENT

```
CREATE [PUBLIC | PRIVATE] LOGICAL DATABASE logical database name                26
  CONNECT TO { database name [ , database name] ... |
              (database name priority order [ , database name priority order]  ...)}
```

FIG. 18(b)

LOGICAL DATABASE MODIFYING STATEMENT

```
ALTER [PUBLIC | PRIVATE] LOGICAL DATABASE logical database name
  [NAME logical database name]
  [ADD {database name [ , database name] ... |                                  27
        (database name priority order [ , database name priority order] ...)}]
  [MODIFY (database name priority order [ , database name priority order] ...)]
  [DROP (database name [ , database name] ... | ALL)]
```

FIG. 18(c)

LOGICAL DATABASE DELETING STATEMENT

```
DROP LOGICAL DATABASE logical database name     28
```

FIG. 18(d)

LOGICAL DATABASE ACCESS PRIVILEGE GRANTING STATEMENT

```
GRANT LOGICAL DATABASE logical database name    29
  TO {logical database user ID | PUBLIC}
```

FIG. 18(e)

LOGICAL ACCOUNT REGISTERING STATEMENT

```
GRANT USER logical database user ID [USING logical database pass word]   30
```

FIG. 18(f)

LOGICAL ACCOUNT MODIFYING STATEMENT

```
ALTER USER logical database user ID                                       31
  [USING logical database pass word]
  [ADD (database name database user ID [database pass word]
        [ , database name database user ID [database pass word]] ... )]
  [MODIFY (database name database user ID [database pass word]
        [ , database name database user ID [database pass word]] ... )]
  [DROP (database name [ , database name] ... | ALL)]
```

FIG. 18(g)

LOGICAL ACCOUNT DELETING STATEMENT

```
REVOKE USER logical database user ID     32
```

DISTRIBUTED DATABASE MANAGEMENT SYSTEM INCLUDING LOGICAL DATABASE CONSTITUTED BY A GROUP OF PHYSICAL DATABASES

BACKGROUND OF THE INVENTION

The present invention relates to a distributed database management system having a plurality of information processors connected to a network.

Recently, database management systems for holding various data in common so as to use it effectively are introduced in many information processing systems.

Among them, a relational database management system for handling data in a related table format has come into wide use rapidly.

Conventional users construct a database on a main frame system and search or update common data. However, there are problems on cost, function, and operability imposed in a database management system of a main frame system.

Therefore, such a database management system of a main frame system is being changed to a client server type database management system using a miniature information processor such as a workstation or personal computer so as to decrease the cost of the system, to expand the function, to improve the operability, and to respond to the diversified information society flexibly. The client server type database management system can construct a highly expandable distributed database environment depending on the business scale.

A user connects an information processor which is a client to each database management system via a network and accesses a table on a relational database using a database access statement, for example, in the SQL (structured query language) which is the standard data manipulation language of the ISO (International Standardization Organization). In this case, it is necessary for the user in the distributed database environment to always recognize the database where the table to be accessed is stored, that is, the table location and to connect himself to an appropriate database before table access. Furthermore, it may be necessary to add the table location to each access statement. However, in a large scale distributed database environment, it is difficult for the user to recognize many table locations one by one and addition of the table location to each access statement requires a very complicated operation.

In the relational database, data in a plurality of related tables is searched by a database access statement and the tables can be joined as a table. This processing which is called a join is generally executed in a single database management system. In the distributed database environment, however, a join (distributed search function) for a plurality of tables stored in different database management systems is also necessary. However, a general client cannot be connected to a plurality of database management systems at the same time. Therefore, there is a product in which the database management system which receives a join request automatically fetches data from another database management system and joins it with the own search data so as to support the distributed search function. When such a distributed search function is used, it is necessary for the user to explicitly describe identification information for another database management system in which the table to be accessed is stored and user certification information at the time of connection in the database access statement.

To solve the above problems, it is important to allow the user in the distributed database environment not to be aware of the database management system where the table is stored, that is, to make the table position transparent.

As a method for realizing such a subject, there is a derivation database processing method which is described in Japanese Patent Application Laid-Open No. 4-112246. This method collects tables on a plurality of distributed database management systems partially and handles them as a derivation database and the user registers the definition information of each database management system and the definition information of the derivation database in a dictionary. The definition information of each database management system consists of identification information of a plurality of tables stored in each database and the definition information of the derivation database consists of identification information of a plurality of database management systems and tables which constitute the derivation database. The database manipulation means receives a derivation database access request from the application program, searches the above dictionary for the table location, and issues a database access statement to the database management system where the table is stored. By this method, the application program can access a plurality of database management systems via a derivation database.

By this derivation database processing method, the user can access a plurality of tables which are registered in the dictionary as a derivation database without being aware of the table location. However, when the user creates a new table after definition of the derivation database, it is necessary for the user to additionally define the created table and the stored identification information of the database management system in the dictionary.

In the distributed database environment, each department of enterprises often operates each database management system independently and accordingly there is a possibility that a duplicated table name exists between a plurality of database management systems. Since the aforementioned derivation database processing method identifies tables of the duplicated name uniquely, it is necessary to define a different name for each table.

In a general database environment, a new table is created frequently. Therefore, in the aforementioned derivation database processing method, it is necessary for the user to redefine the derivation database every time or to define a different name of the table and the operation burden is increased.

The database management system prevents an unqualified person from use of a database under the account control using the independent user ID (identifier: identification) and password (hereafter a combination of the two is called an account). The account control means installed in the database management system checks the password which is inputted by the user at the time of logging-in prior to table access, checks whether the logging-in user is granted a privilege for writing or reading in the table or record to be accessed, and then starts the table access processing.

However, in the distributed database environment where each database management system is operated independently, the accounts registered in the database management systems are not always the same. There is a method available for reregistering the accounts of all the database management systems and constructing a unified database account environment. However, for the reason of an increase in the account reregistration operation and reusing to the existing database application program property, many enterprises use a different account environment for each database management system continuously. Therefore, it is necessary for the user to selectively use the corresponding account for each database management system to be connected. However, in a large scale distributed database environment, in the same way as with the table location, storing and using of accounts to be used by the user for many database management systems require a very complicated operation.

SUMMARY OF THE INVENTION

An object of the present invention is to eliminate the difficulties of the prior arts mentioned above and to provide a distributed database management system which can correspond to a large scale distributed database environment by a simple operation without the table location being added to many access statements by the user.

Another object of the present invention is to provide a distributed database management system which can correspond to a large scale distributed database environment on the basis of single account information without a large amount of account information being stored and used by the user.

Another object of the present invention is to provide a distributed database management system which has a distributed database access management unit in a gateway server or specific database server and can correspond to a large scale distributed database environment with a simple configuration.

To accomplish the above objects, the present invention is a distributed database management system consisting of a terminal device which is connected to a network and has an application program execution means and of a plurality of information processors (servers) connected to the above network, wherein a distributed database access management means including a logical database defining unit for defining a logical database in which at least one database among physical databases covering the above plurality of information processors (servers) is grouped beforehand, a logical database dictionary for registering the definition information of the logical database which is defined in the above logical database defining unit, a logical database access controller for receiving a database access statement which is instructed from the application program execution means of the above terminal device, and a table location searching unit for searching for the database stored in the desired table on the physical database belonging to the logical database via the physical database management system of the above desired information processor (server) with reference to the definition information of the logical database which is registered in the above logical database dictionary on the basis of the database access statement received by the above logical database access controller is installed in the above desired information processor (server). Furthermore, the present invention is a distributed database management system consisting of a terminal device which is connected to a network and has an application program execution means and of a plurality of information processors (servers) connected to the above network, wherein a distributed database management means including a logical database defining unit for defining the identification information of the physical database constituting the logical database in which at least one database among physical databases covering the above plurality of information processors (servers) is grouped beforehand and the account information of the physical database, a logical database dictionary for registering the identification information of the physicl database constituting the logical database and the account information of the physicl database which are defined in the above logical database defining unit, a logical database access controller for receiving a database access statement which consists of the identification information of the logical database and of the account information of the logical database which are instructed from the application program execution means of the above terminal device, and a table location searching unit for logging in the physical database belonging to the logical database via the physical database management system of the above desired information processor (server) with reference to the identification information and the account information of the physical database which is registered in the above logical database dictionary on the basis of the database access statement received by the above logical database access controller and searching for the database stored in the desired table is installed in the above desired information processor (server). Furthermore, the present invention is a desired database server among a plurality of database servers having a physical database management system and a physical database as a desired information processor (server) having the above distributed database access management means in the above distribution database management system.

Furthermore, the present invention is a gateway server for positioning between a plurality of database servers having the above physical database, physical database management system, and terminal device via the above network as a desired information processor (server) having the above distributed database access management means in the above distributed database management system and for managing the above plurality of database servers.

Furthermore, in the above distributed database management system of the present invention, the above definition information which is registered in the logical database dictionary includes the priority order of each physical database constituting the logical database and the above table location searching unit searches for the database stored in the desired table on the physical database on the basis of the priority order registered in the above logical database dictionary.

Furthermore, in the above distributed database management system of the present invention, the above definition information which is registered in the logical database dictionary includes the access privilege information for the logical database and the above table location searching unit checks the access privilege of the application program user which is instructed from the above terminal device prior to access to the logical database.

Furthermore, in the above distributed database management system of the present invention, the above definition information which is registered in the logical database dictionary includes the account information of the physical database constituting the logical database and the above table location searching unit logs in the physical database constituting the logical database using the database account registered in the above logical database dictionary on the basis of the account information of the application program user which is instructed from the above terminal device.

Furthermore, in the above distributed database management system of the present invention, the above table location searching unit checks the account information which is received from the application program which is instructed from the above terminal device with the account of the above logical database prior to access to the logical database.

Furthermore, in the above distributed database management system of the present invention, the above definition information which is registered in the logical database dictionary includes the account information of the physical database constituting the logical database and the above table location searching unit logs in the physical database constituting the logical database using the account corresponding to the physical database registered in the above logical database dictionary on the basis of the account information of the application program user which is instructed from the above terminal device.

Furthermore, in the above distributed database management system of the present invention, the above definition information which is defined in the logical database defining unit consists of the identification information of the physical database constituting the logical database and the account information of the physical database.

On the other hand, the present invention provides a distributed database management system which is an information processor which is connected to at least one database (hereinafter called a physical database so as to distinguish from the logical database which will be described later) holding a table via a database management system (hereinafter called a physical database management system so as to distinguish from the distributed database management system of the present invention), is connected furthermore to the application program execution means for accessing the above physical database, receives an access statement for accessing physical databases which is issued by the above application program execution means, and transfers the above access statement to the physical database management system for managing the above physical database by selecting one of the above physical databases as an access object and which has the following configuration.

Namely, the distributed database management system of the present invention has a logical database dictionary for holding information on the logical database wherein at least one of the above physical databases is grouped, a logical database defining unit for registering information on the above logical database in the above logical database dictionary, a statement buffer for holding the above access statement, a logical database access controller for receiving an access statement from the above application program execution means and storing it in the above statement buffer, and a table location searching unit for transferring the above access statement held in the above statement buffer to the physical database management system for managing the above physical database by selecting one of the above physical databases as an access object.

The above table location searching unit has a means for receiving an access statement for instructing logging in the database, when the database which is instructed to be connected is registered in the above logical database dictionary as the above logical database, selecting one of the above physical databases belonging to the instructed logical database as an access object of the above access statement, when a response of access refusal is given to the transfer of the above access statement, selecting another one of the above physical databases belonging to the instructed logical database as an access object of the above access statement, and transferring the above access statement held in the above statement buffer once again.

According to the distributed database management system of the present invention, the logical database access controller receives a database access statement from the application program and informs the table location searching unit of it. The table location searching unit which is informed automatically logs in the database using the identification information and account information of the physical databases constituting the logical database in the logical database dictionary and issues the database access statement received from the application program. The table location searching unit repeats the aforementioned inquiry processing for at least one database constituting the logical database and decides the database which obtains a response indicating processing completion as a table location.

When the physical database account is stored in the logical database dictionary, the table location searching unit of the present invention logs in each physical database using the stored account. When no physical database account is stored, the table location searching unit logs in the physical database using the account received from the above application program execution means.

As mentioned above, according to the distributed database management system of the present invention, the user can access transparently tables stored in a plurality of physical databases constituting the logical database and tables which will be newly stored hereafter without being aware of the table location and physical database account.

In the distributed database management system of the present invention, by logging in each physical database using the account information stored in the logical database dictionary, tables having duplicated names which are prepared by different users can be excluded from the access objects. By doing this, there is no need to define another names for tables having duplicated names which are prepared by different users and to manage them.

BRIEF DESCRIPTION OF THE DRAWINGS

FIGS. 3(a) and 3(c) are illustrations showing statements used for definition, change, and deletion of the logical database in Embodiment 1.

FIG. 4 is an illustration showing database connection statement conversion processing of the table location searching unit in Embodiment 1.

FIG. 6 is a drawing showing the sequence of the information which is exchanged by the table location searching unit in Embodiment 1.

FIGS. 7(a) and 7(b) are illustrations showing the constitution of the logical database dictionary in Embodiment 2.

FIGS. 9(a) and 9(b) are illustrations showing the constitution of the logical database dictionary in Embodiment 4.

FIGS. 18(a) and 18(g) are illustrations showing statements used for definition, change, and deletion of the logical database and logical account in Embodiment 4.

DETAILED DESCRIPTION OF THE PREFERRED EMBODIMENTS

Figure 1:
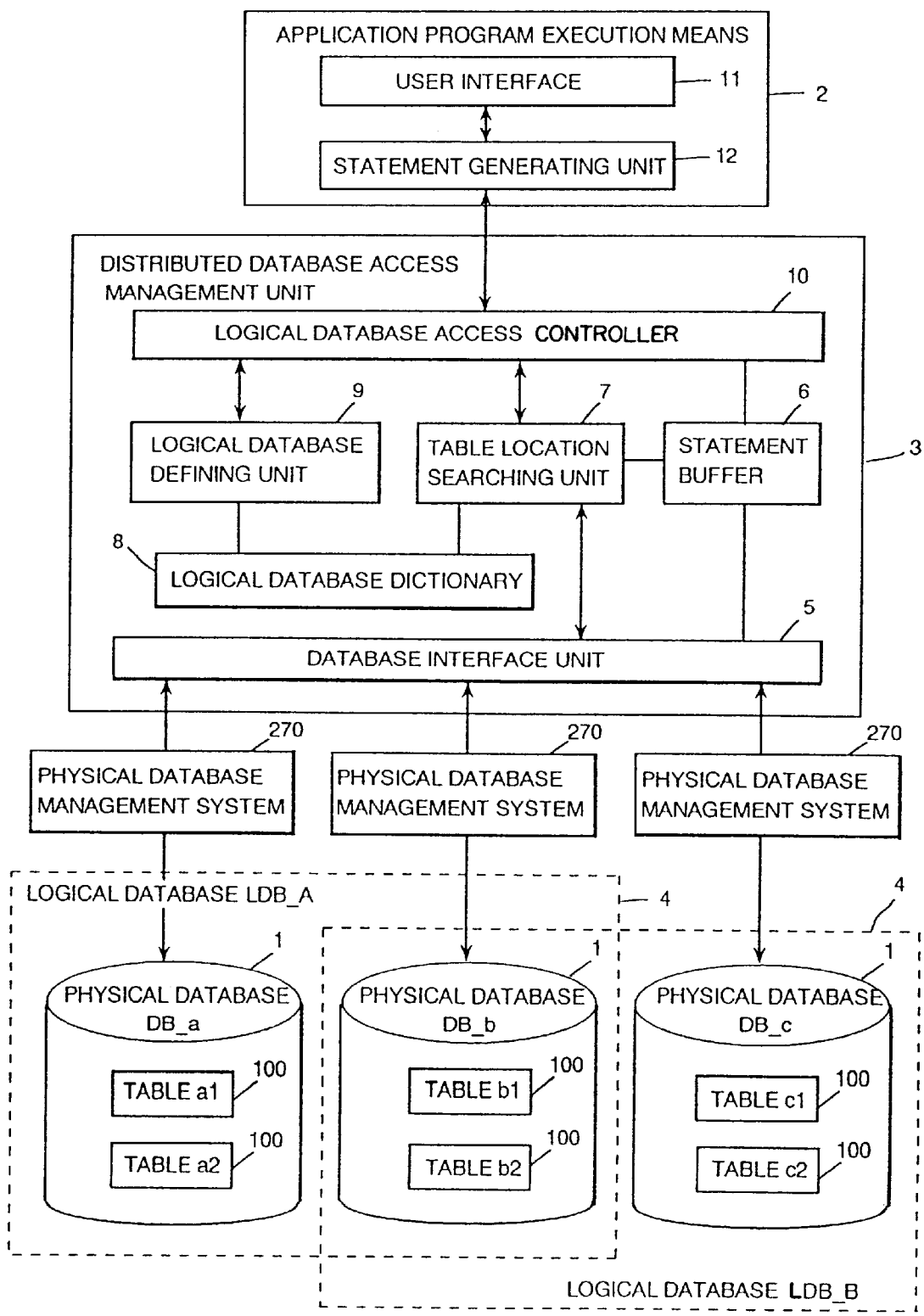
FIG. 1 is a block diagram of the distributed database management system in Embodiment 1.

The embodiments of the present invention will be explained hereunder with reference to the accompanying drawings. The same numbers are assigned to the same parts in the drawings.

Embodiment 1

Figure 27:
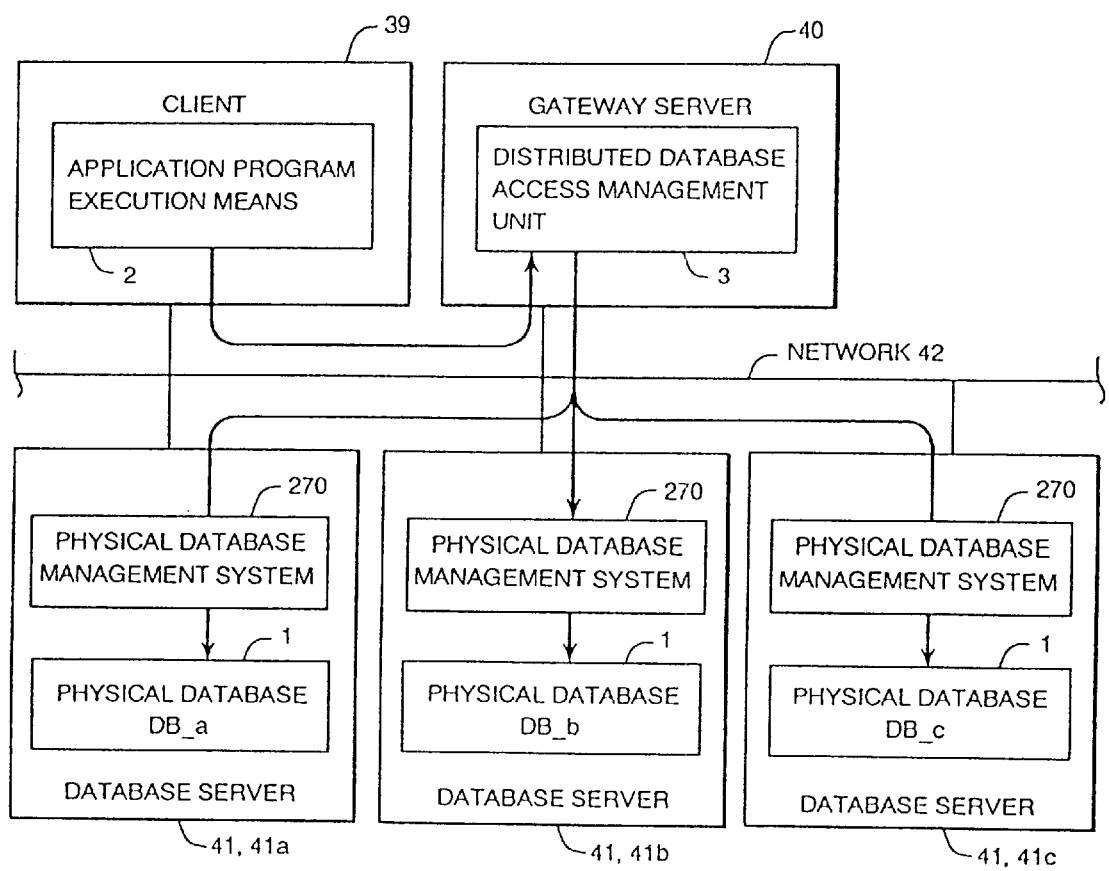
FIG. 27 is a hardware diagram showing a system configuration example to which the distributed database system of the present invention is applied.

A hardware block diagram of a client server system to which the distributed database management system in this embodiment is applied is shown in FIG. 27. The client server system in this embodiment consists of a network 42, three database servers 41 (41a, 41b, 41c) connected to the network 42, a client 39 connected to the network 42, and a gateway server 40. Each database server 41, the client 39, and the gateway server 40 are information processors having at least a central processing unit (CPU) and a main storage and each means (described later) which is installed in each database server 41, the client 39, and the gateway server 40 is realized when an instruction held in the main storage is executed by the CPU. Each unit is connected to the network 42 such as an LAN in a client server form.

Each database server 41 includes a physical database 1 and a physical database management system 270 for managing the physical database 1. The database server 41a has a physical database DB_a, and the database server 41b has a physical database DB_b, and the database server 41c has a physical database DB_c. Access to each physical database 1 is made via the physical database management system 270. In this embodiment, the three physical databases DB_a, DB_b, and DB_c are installed in different database servers 41 respectively. However, a plurality of physical databases 1 may be installed in a database server. Furthermore, in this embodiment, the three physical databases DB_a, DB_b, and DB_c are managed by different physical database management systems respectively. However, a plurality of physical databases 1 may be managed by a physical database management system.

The client 39 in this embodiment is a miniature information processor (terminal device) such as a personal computer in which an application program 2 is operated. The client 39 has an application program execution means 2 for executing the application program for updating or searching the databases and instructs to update or search each database.

Each database server 41 is an information processor (server) having a secondary storage such as a workstation or main frame in which the physical database 1 is operated.

Figure 28:
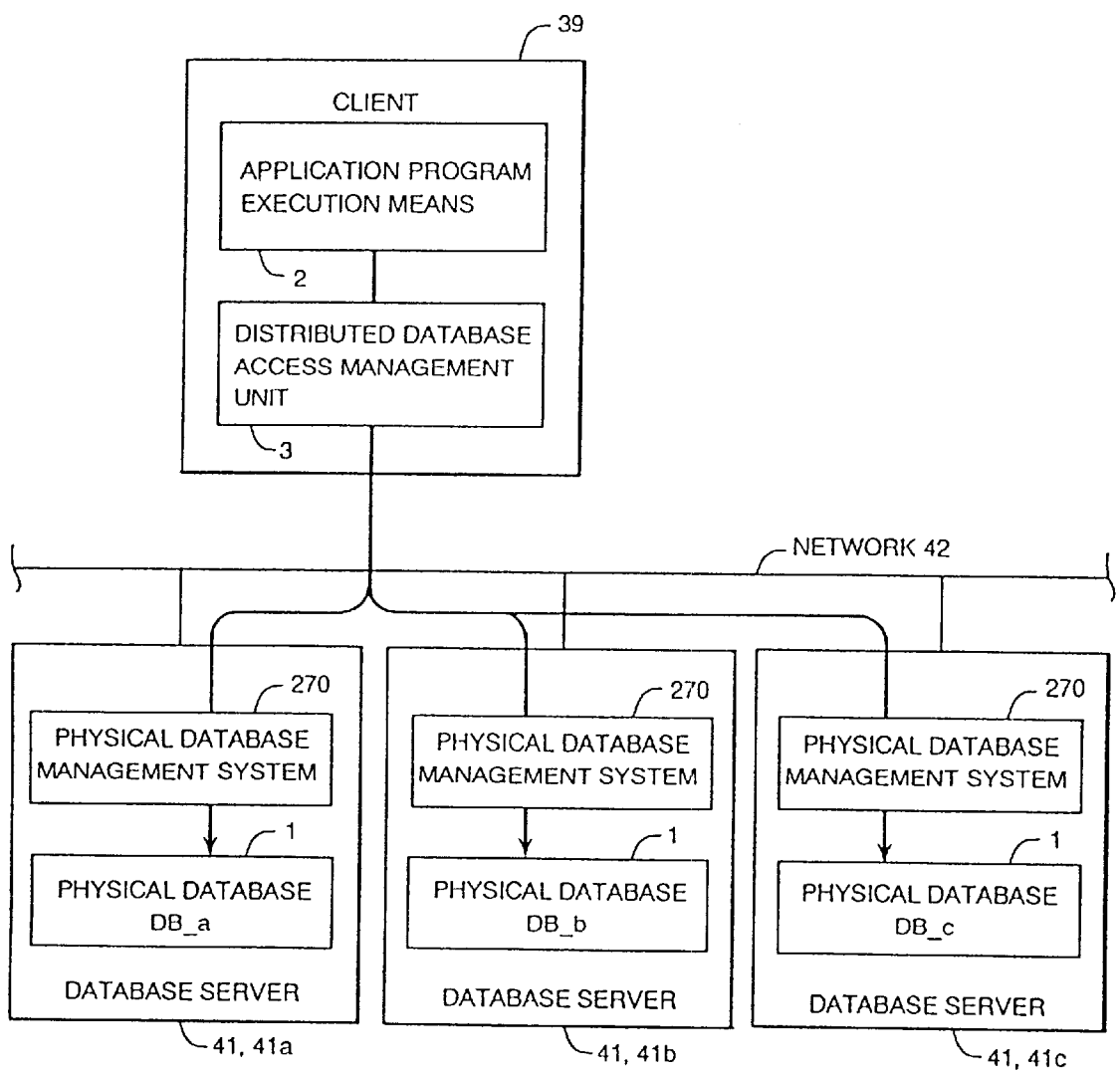
FIG. 28 is a hardware block diagram showing a system configuration example to which the distributed database system of the present invention is applied.
Figure 29:
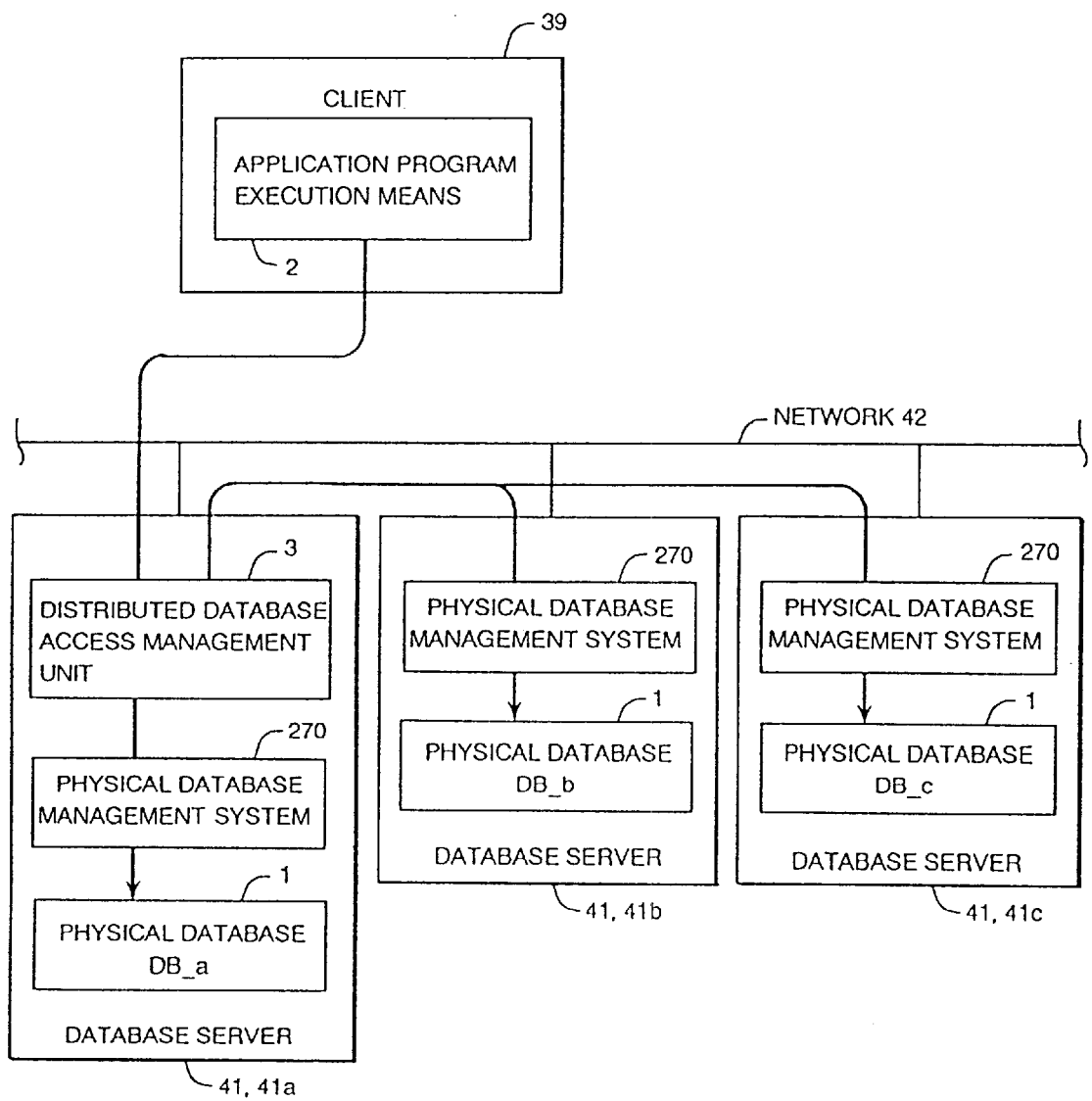
FIG. 29 is a hardware block diagram showing a system configuration example to which the distributed database system of the present invention is applied.

A distributed database access management unit 3 which is installed in the gateway server 40 is a mechanism which exists between the application program 2 and the physical database 1 and plays a role as a gateway between the client and server so that the application program execution means 2 can handle a plurality of distributed databases 1 in the same way as with a single physical database. In this embodiment, the distributed database access management unit 3 is installed in the gateway server 40. However, it may be installed in the client 39 as shown in FIG. 28 or it may be installed in the database server 41 as shown in FIG. 29. However, when the distributed database access management unit 3 is installed in the client 39 which is an application as shown in FIG. 28, it is undesirably necessary to install it in all the clients 39. Therefore, the embodiment shown in FIG. 29 or FIG. 27 is desirable.

The function constitution of a server client system to which the distributed database management system of this embodiment is applied is shown in FIG. 1. The distributed database management system of this embodiment consists of the distributed database access management unit 3.

In this embodiment, a plurality of physical databases 1 are combined so as to form logical databases 4 (LDB_A, LDB_B). The logical database LDB_A consists of physical databases DB_a and DB_b and the logical database LDB_B consists of physical databases DB_b and DB_c. The physical databases 1 in this embodiment store and manage a plurality of tables 100. The physical database DB_a holds a table a1 and a table a2. The physical database DB_b holds a table b1 and a table b2. The physical database DB_c holds a table c1 and a table c2.

The client 39 in this embodiment has input/output devices (not shown in the drawing) such as a display (not shown in the drawing), a keyboard (not shown in the drawing), and a mouse as pointing devices. The application program execution means 2 has a user interface 11 for controlling these input/output devices, receiving input on search and update of data held in the physical databases 1 from the user, and displaying the processing result and a statement generating unit 12 for creating an access statement for accessing the physical databases 1 according to the received input and informing the distributed database access management unit 3 of it.

The distributed database access management unit 3 in this embodiment has a logical database dictionary 8 for storing the identification information, account information, and control information of the physical databases 1 constituting the logical databases 4, a statement buffer 6 for temporarily storing at least one database access statement, a logical database access controller 10 for receiving a database access statement from the application program 2 and distributing processing to a logical database defining unit 9 or a table location searching unit 7, the logical database defining unit 9 for registering the definition information on the logical databases 4 in the logical database dictionary 8, the table location searching unit 7 for inquiring as to whether tables 100 exist in at least one physical database 1 constituting the logical databases 4 and deciding stored physical databases 1, and a database interface unit 5 for transferring the database access statement to the physical databases 1 and receiving the result. The database interface unit 5 stores the physical location information (network address, etc.) of each physical database 1, searches for the address corresponding to the physical database name instructed from the table location searching unit 7, and sends the statement held in the statement buffer 6 to physical database management systems 270 for managing the object physical database 1. In this Embodiment 1, access to the physical databases 1 from the table location searching unit 7 is all made via the database interface unit 5 and the physical database management systems 270.

The logical database access function is realized by the distributed database management unit (distributed database management system) in this embodiment.

A. Outline of the Logical Database Access Function

The logical database access function provided by the distributed database management system in this embodiment will be explained hereunder.

The logical databases 4 are virtual databases in which at least one physical database 1 is grouped. In FIG. 1, the physical databases DB_a and DB_b are defined as a logical database LDB_A and the physical databases DB_b and DB_c are defined as a logical database LDB_B. In this embodiment, the user of application program 2 can make location transparent access to the tables a1, a2, b1, and b2 by the logical database LDB_A and to the tables b1, b2, c1, and c2 by the logical database LDB_B.

The distributed database management system of this embodiment can set the priority order for search in a plurality of physical databases 1 constituting the logical databases 4. The table location searching unit 7 inquires about the existence of tables sequentially according to the priority order of each physical database 1 and decides the physical database 1 where the table to be accessed is stored. Namely, according to the distributed database management system in this embodiment, when there are tables with the same name in a plurality of physical databases 1 constituting the logical databases 4, the table 100 on the highest priority physical database 1 is accessed.

(1) Account Control

Next, the account control method of the logical database access function in this embodiment will be explained. The account consists of a user ID for identifying the user and a password.

The distributed database management system in this embodiment prevents the user from being aware of a difference in the account between the physical databases 1, so that it logs automatically in a plurality of physical databases 1 constituting the logical databases 4 using the account information of each physical database 1 which is registered in the logical database dictionary 8 beforehand. To prevent the table 100 having no access privilege which is stored in each physical database 1 from use, it is necessary that the legality of the user is certified. Therefore, prior to logging in each physical database 1, the table location searching unit 7 checks the account for the logical databases 4 (hereinafter called a logical database account). The logical database account consists of a user ID and password the same way as the account of the physical databases 1 and the table location searching unit 7 can grasp a plurality of account informations different for each physical database 1 which are registered in the logical database dictionary 8 as an account for using each physical database 1 without being aware of them.

(2) Access Privilege Management

Next, the access privilege management method of the logical database account function in this embodiment will be explained.

The distributed database management system in this embodiment also has a function for confirming the legality of a database access user as a user of the operating system (hereinafter called an OS user) corresponding to the multi-user environment in addition to the aforementioned logical database account.

When the application program 2 is operated on a general multi-user operating system, the user sets his own processing environment by logging in the operating system beforehand. Furthermore, a plurality of OS users are defined as a group and the same processing environment can be used in common. However, a normal physical database management system has a unique database account environment separately from the user account of the operating system. Therefore, the distributed database management system in this embodiment grasps the definition information on each logical database 4 registered in the logical database dictionary 8 as an object and sets an access privilege to the OS user in each logical database 4 so as to limit users of the logical databases 4.

The access privilege information consists of the ID of an OS user which permits access to the logical databases 4 or the group ID and the privilege kind such as use permission or change permission. In this embodiment, permission of use or change of the logical databases 4 is implicitly given to the OS user (owner of the definition information on the logical databases) who defines the logical databases 4. The owner of the definition information on the logical databases 4 can grant another OS user or group permission of use or change of the logical databases 4.

According to the access privilege management method in this embodiment, the statement generating unit 12 of the application program 2 informs the distributed database access management unit 3 of the ID of the OS user and the ID of the belonging group together with the created database access statement. Before logging in each physical database 1, the table location searching unit 7 of the distributed database access management unit 3 refers to the access privilege which is set in the requested logical database 4 and checks whether use of the logical database 4 is permitted for the informed OS user.

Figure 2A:
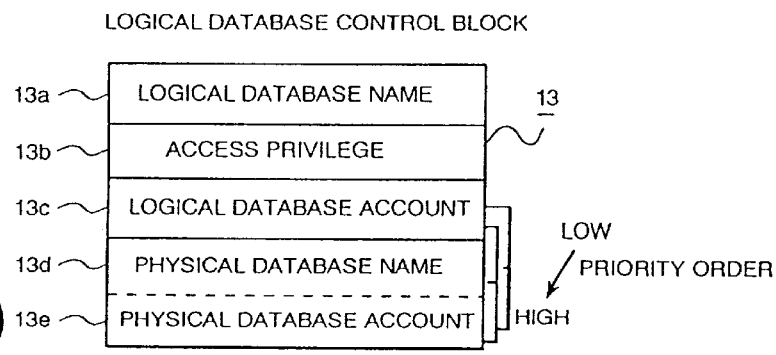
FIGS. 2(a) and 2(b) are illustrations showing the constitution of the logical database dictionary in Embodiment 1.

The information which is held by the logical database dictionary 8 is shown in 2(b). The logical database dictionary 8 has at least one logical database control block 13. Each logical database control block 13 holds the definition information on a logical database 4. As shown in FIG. 2(a), each logical database control block 13 has an area 13a for storing the name of each logical database 4, an area 13b for storing the access privilege to the logical databases 4, an area 13c for storing the account (user ID and password) for the logical databases 4, an area 13d for storing the name of each physical database 1 constituting the above logical databases 4, and an area 13e for storing the account (user ID and password) for the above physical database 1.

The logical database dictionary 8 in this embodiment is realized in the main storage of the gateway server 40 as a file which is managed by the operating system of the gateway server 40. However, it may be realized in one of the physical databases 1 as a database table 100.

The access privilege 13b can hold a plurality of OS users or the group ID and the privilege kind. The logical database account 13c can hold a plurality of sets of account. Furthermore, the physical database name 13d and the physical database account 13e have a link indicating the storing order. In this embodiment, the priority order of searching is decided by the order of this link.

Figure 2B:
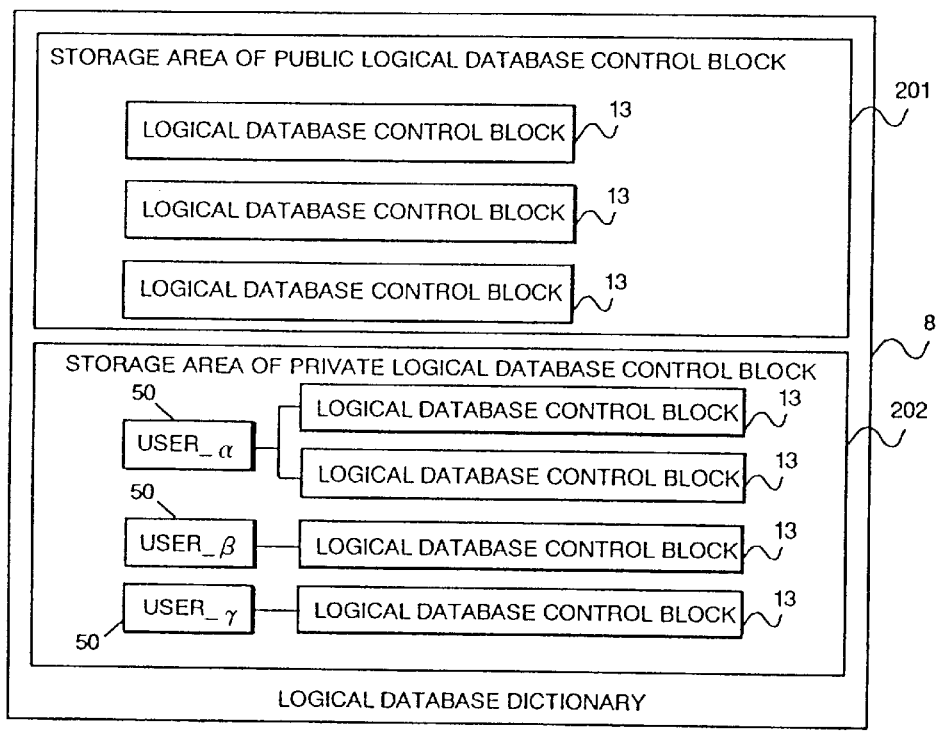

In the distributed database management system in this embodiment, two kinds of logical databases 4 such as a public logical database and private logical database can be defined. Therefore, as shown in FIG. 2(b), the logical database dictionary 8 has a storage area 201 of the logical database control block 13 holding the definition information on the logical database 4 which is a public logical database and a storage area 202 of the logical database control block 13 holding the definition information on the logical database 4 which is a private logical database. FIG. 2(b) shows that three logical database control blocks 13 are held in the storage area 201 of public logical database control block. However, the storage area 201 can hold an optional number of logical database control blocks 13 and the number of logical database control blocks 13 is not limited to 3. The same may be said with the storage area 202 of private logical database control block.

The public logical database is a database which can be used by all the OS users. The logical database control blocks 13 relating to the logical database 4 which is defined as public are managed by the system in a batch. Therefore, it is necessary to assign a unique logical database name to each logical database 4.

On the other hand, the private logical database is a database which can be used only by the defined OS user or another OS user who is permitted to use. In this embodiment, the logical database control blocks 13 correspond to user names 50 of usable OS users (they are shown as user_alpha, user_beta, and user_gamma in FIG. 2(b)) and are held in the storage area 202 of private logical database control block. Therefore, in this embodiment, a free logical database name can be assigned without duplication with a registered public logical database name or a private logical database name registered by another OS user being aware of.

When the logical database name to which an access request is given from the user is registered in both the logical database control block 13 which is registered in the storage area 201 of public logical database control block and the logical database control block 13 which is registered in the storage area 202 of private logical database control block in correspondence with the user name of the above OS user, the distributed database access management unit 3 in this embodiment performs processing using the information of the logical database control block 13 registered in the storage area 202 of private logical database control block. Namely, in this embodiment, when a logical database having the same name is registered in both the public logical database and usable private logical database, an access request to the logical database having the above same name of an OS user is handled as an access request to the logical database having the above same name which is registered as a private logical database.

B. Details of the Logical Database Access Function

Next, the logical database access function in this embodiment will be explained in detail.

In this embodiment, an SQL statement is used as a database access statement. In the SQL standard, a data definition language for a CREATE TABLE statement for creating a table 100 newly and a DROP TABLE statement for deleting a table 100 and a data manipulation language for a SELECT statement for searching for data in a table 100, an INSERT statement for adding a new row to a table 100, a DELETE statement for deleting a row from a table 100, and an UPDATE statement for changing data in a table 100 are regulated. In this embodiment, the data definition language and data manipulation language used for the tables 100 are called a table access statement. Each table access statement contains the table name to be accessed. Furthermore, in the SQL standard, a database connection statement such as a CONNECT statement for logging in the database and a DISCONNECT statement for logging out of the database is also regulated. In this embodiment, a table access statement created by the application program execution means 2 is informed to the table location searching unit 7 via the logical database access controller 10. The table location searching unit 7 interprets this table access statement as access to the logical database 4, creates a table access statement to the actual physical database 1, issues the created statement to the physical database 1 via the database interface unit 5, and receives the result.

In this Embodiment 1 (and the embodiments which will be described later), in the processing which is executed when the DROP TABLE statement, SELECT statement, INSERT statement, DELETE statement, or UPDATE statement is received from the application program execution means 2 and uses the table 100 existing in the physical database 1 as an object, the table location searching unit 7 automatically detects the physical database 1 where the table 100 to be processed exists actually and executes the access to the above physical database 1.

On the other hand, when the CREATE TABLE statement is received from the application program execution means 2, the table location searching unit 7 creates a table 100 newly and stores it in a newly reserved storage area. When the table location searching unit 7 receives the CREATE TABLE statement for the logical database 4 from the application program execution means 2, the unit transfers the statement to the highest priority physical database 1 among the physical databases belonging to the above logical database 4. Namely, the table location searching unit 7 attempts to store newly created tables for the logical database 4 all in the highest priority physical database 1.

Storing newly created tables 100 in the highest priority physical database 1 like this allows easy operation and management in the distributed database environment and effectively reduces the processing overhead of the table location searching unit 7. The reason is that in the processing for a table 100 which exists in the physical database 1 already, searching the physical database 1 where the table 100 to be processed exists actually is performed according to the priority order of the physical databases 1, so that when the table 100 to be searched is detected by the first try of access, the searching efficiency is improved.

(1) Definition Function of Logical Databases

Next, the definition function of the logical databases 4 in this embodiment will be explained.

For example, a general-purpose interactive database application program for instructing a table to be accessed or a search condition by an interactive operation and for indicating the search result often includes a function for issuing a database access statement which is inputted directly from the keyboard by the user to the physical database 1 as it is. Therefore, in the distributed database management system in this embodiment, the logical databases 4 can be defined by the database access statement shown in FIGS. 3(a) to 3(c) which is expanded partially. According to the distributed database management system in this embodiment, the user can define a unique logical database environment easily by using an interactive database application program on sale.

The logical database access controller 10 of the distributed database access management unit 3 identifies the definition statement of the logical database 4 which is informed of from the application program execution means 2 and informs the logical database defining unit 9 of it together with the OS user ID of the definition user and the group ID.

An example of a statement used to create the logical databases 4 is shown in FIG. 3(a). This logical database creating statement 14 contains description contents of the logical databases 4, description contents of at least one physical database 1 constituting the above logical databases, descriptors (CREATE, LOGICAL DATABASE, USER_ID, IDENTIFY, and DATABASE), and a continuation symbol (,) and furthermore, may contain a descriptor PUBLIC.

The description contents of the logical databases 4 are the name of each logical database, logical database user ID, and password. The description contents of the physical databases 1 constituting the logical databases are the name of each physical database 1 and the user ID and password of the above physical databases.

The descriptor CREATE and descriptor LOGICAL DATABASE mean a statement for instructing creation of a logical database having the name described behind the descriptor LOGICAL DATABASE. The descriptor PUBLIC means the definition of the public logical database. When the descriptor PUBLIC is omitted, the database is defined as a private logical database.

The descriptor USER_ID means that the name described behind the descriptor USER_ID is the user ID of the user who is permitted to use the logical database 4 or the physical database 1 which is described immediately before the descriptor USER_ID. The descriptor IDENTIFY means that the password of the user having the user ID described immediately before is the pass word described behind the descriptor IDENTIFY. A plurality of user IDs and passwords of the user who is permitted to use the logical databases 4 can be described. When a plurality of user IDs and passwords are described, they are delimited by a continuation symbol of ",".

The descriptor DATABASE means that the name described behind the descriptor DATABASE is a name of the physical databases 1 constituting the logical database to be defined. In the statement 14, the user who is permitted to use the physical database 1 is defined by the aforementioned descriptors USER_ID and IDENTIFY described behind this physical database name. A plurality of physical databases 1 can be described. When a plurality of physical databases are described, they are delimited by a continuation symbol of ",". In this embodiment, the physical databases 1 constituting the logical databases 4 which are described in the upper stages in the statement are given higher priority for searching.

The logical database defining unit 9 analyzes the logical database creating statement 14 which is informed of from the logical database access controller 10, stores the above information in the logical database name storage area 13a, the logical database account storage area 13c, the physical database name storage area 13d, and the physical database account storage area 13e of the logical database control block 13, and stores the ID of the OS user who issues the statement and the use or change permission kind in the access privilege storage area 13b.

Figure 31:
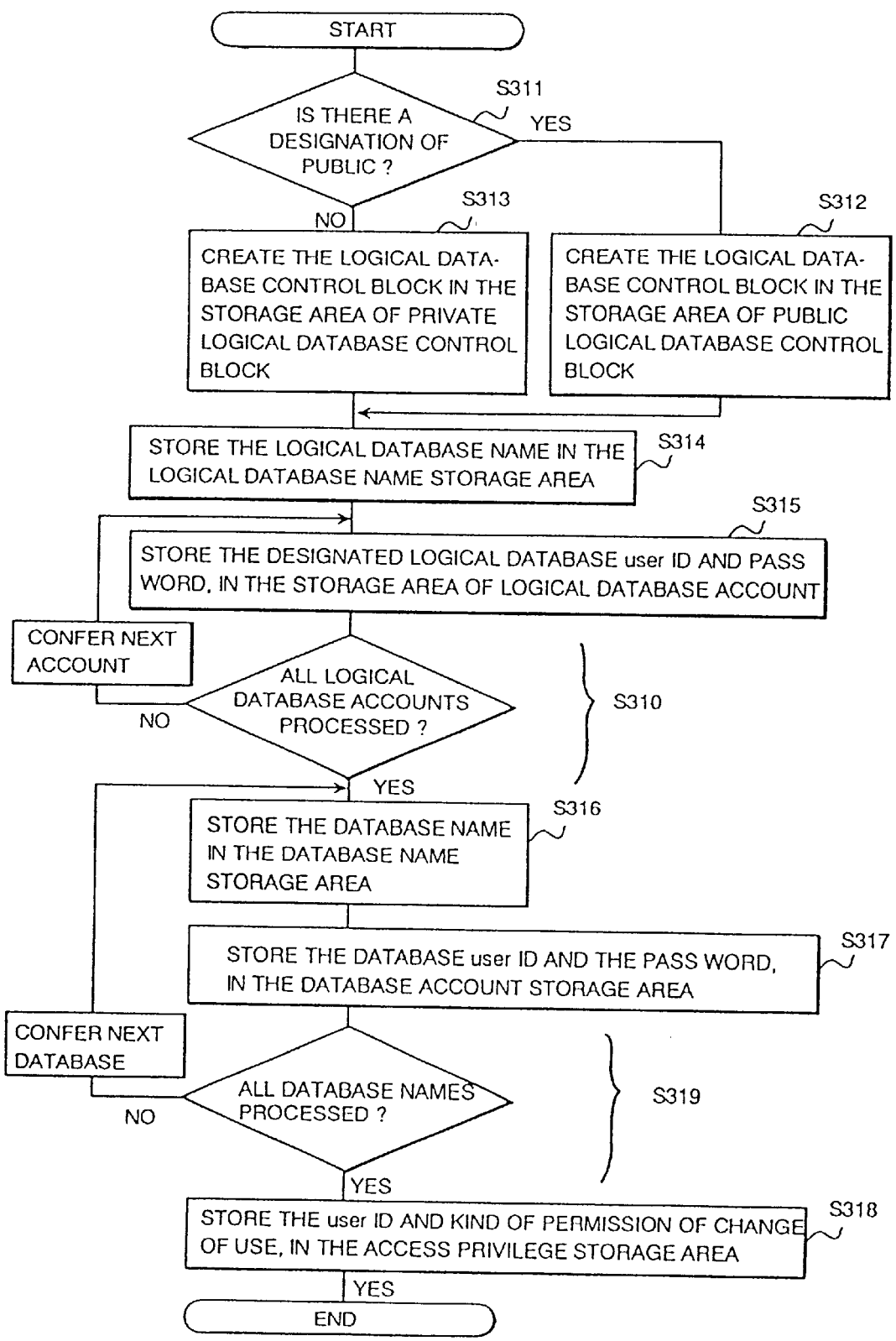
FIG. 31 is a flow chart showing the procedure of the logical database registration processing of the logical database defining unit in Embodiment 1.

The flow of the logical database registration processing of the logical database defining unit 9 is shown in FIG. 31.

When the logical database defining unit 9 receives the logical database creating statement 14 issued from the application program execution means 2 via the logical database access controller 10, the unit checks first whether there is a designation of PUBLIC (Step 311). When PUBLIC is designated immediately after the descriptor CREATE, the logical database defining unit 9 creates a logical database control block 13 newly in the storage area 201 of public logical database control block (Step 312). When PUBLIC is not designated, the logical database defining unit 9 creates a logical database control block 13 newly in the storage area 202 of private logical database control block (Step 313). Next, the logical database defining unit 9 stores the logical database name following LOGICAL DATABASE in the statement in the logical database name storage area 13a of the logical database control block 13 (Step 314) and stores the logical database user name following USER_ID and the logical database password following IDENTIFY sequentially (Step 310) in the logical database account storage area 13c (Step 315). Furthermore, the logical database defining unit 9 stores the physical database name described behind DATABASE sequentially (Step. 319) in the physical database name storage area 13d (Step 316) and stores the user ID of the USER-ID clause following the above physical database name and the password of the IDENTIFY clause in the physical database account storage area 13e corresponding to the above physical database name storage area 13d (Step 317). The logical database defining unit 9 connects the physical database name storage areas 13c with links and stores the above data so that the storage locations on the links are set in the description order. Finally, the logical database defining unit 9 stores the ID of the OS user who issues the statement and the use or change permission kind in the access privilege storage area 13b (Step 318).

Next, an example of a statement used to delete the logical databases 4 is shown in FIG. 3(b). This logical database 4 deleting statement 15 consists of a descriptor DROP LOGI- CAL DATABASE and a logical database name. The logical database defining unit 9 deletes the logical database control block 13 in which the name described immediately after the descriptor DROP LOGICAL DATABASE is held in the logical database name storage area 13*a*. The logical database defining unit 9 refers to the access privilege 13*b* prior to deletion of the logical database control block 13 and checks whether permission of change is given to the OS user who issues the statement. When no permission of change is given, the logical database defining unit 9 refuses deletion of the logical databases 4.

In this embodiment, the owner of the logical databases 4 can grant the access privilege to another user. An example of a statement used to grant the access privilege relating to the logical databases 4 is shown in FIG. 3(*c*). This access privilege granting statement 16 consists of descriptors GRANT, ON, and TO USE or TO GROUP or TO PUBLIC, the kind of access privilege to be granted (use permission or change permission), the logical database name which is the above access object, and the user ID of the OS user who is an granting object or the group ID.

The descriptor GRANT means a statement for granting the access privilege of the kind described immediately after it.

The descriptor ON means that the access privilege to be granted is the access privilege to the logical database having the logical database name which is described immediately after the descriptor ON. The descriptor TO USER means that the OS user having the user ID which is described immediately after it is a granting object. The descriptor TO GROUP means that the OS user belonging to the group having the group ID which is described immediately after it is a granting object. The descriptor TO PUBLIC means that the granting objects are all the OS users.

The logical database defining unit 9 analyzes the logical database access privilege granting statement 16 which is informed of from the logical database access controller 10 and adds the above information to the access privilege 13*b* of the logical database control block 13.

Furthermore, in this embodiment, by using another database access statement (for example, SELECT, UPDATE, INSERT, DROP, etc.), the contents of the logical database control block 13 which are registered in the logical database dictionary 8 can be searched or updated and the information relating to the physical databases 1 of the logical database control block 13 can be added or deleted. By doing this, the user can edit a unique logical database environment freely. SELECT means searching, UPDATE updating, INSERT addition, and DROP deletion.

(2) Processing of the Logical Database Access Controller

The logical database access controller 10 receives the CONNECT statement from the application program execution means 2 first, stores it in the statement buffer 6, and then informs the table location searching unit 7 of the above CONNECT statement, the ID of the OS user who issues the CONNECT statement, and the group ID. The logical database access controller 10 also stores a table access statement which is received from the application program execution means 2 after the CONNECT statement is received in the statement buffer 6 and then informs the table location searching unit 7 of it.

(3) Processing of the Table Location Searching Unit

FIG. 4 is an illustration showing the conversion processing of the CONNECT statement by the table location searching unit 7. In the SQL standard, the database name to be connected, the database account consisting of user ID, and password is defined as parameters of the CONNECT statement. However, in this embodiment, the database name of the CONNECT statement is interpreted as a name of the logical database 4 and the database account as an account to the logical database 4. In this embodiment, a specific physical database 1 can be accessed using the name and account of the physical database 1 in the same way as with the conventional method.

In this embodiment, as shown in FIG. 4, a CONNECT statement 45 prepared by the application program execution means 2 is received by the table location searching unit 7 via the logical database access controller 10. The table location searching unit 7 which receives the CONNECT statement 45 interprets the statement 45, replaces the logical database name and logical database account in the CONNECT statement 45 with the physical database name and physical database account for the physical database 1 which are registered in the logical database control block 13, creates a CONNECT statement 46 for actually accessing the physical database 1, and issues it to the physical database 1.

In the CONNECT statement 46 created by the table location searching unit 7, the name of the physical database 1 to be connected is described immediately after the descriptor CONNECT TO, and the user ID of the user to be connected is described immediately after the descriptor USER, and the password of the user to be connected is described immediately after the descriptor USING in the same way as with the SQL standard.

However, when the CONNECT statement 45 is interpreted, the described database is interpreted as a logical database. Namely, the table location searching unit 7 interprets the word (name of the physical database 1 to be connected in the SQL standard) following the descriptor CONNECT TO in the statement 45 as the name of the logical database to be connected, the word (user ID of the user to be connected in the SQL standard) following the descriptor USER as the user ID of the logical database, and the word (password of the user to be connected in the SQL standard) following the descriptor USING as the password of the logical database.

Figure 5:
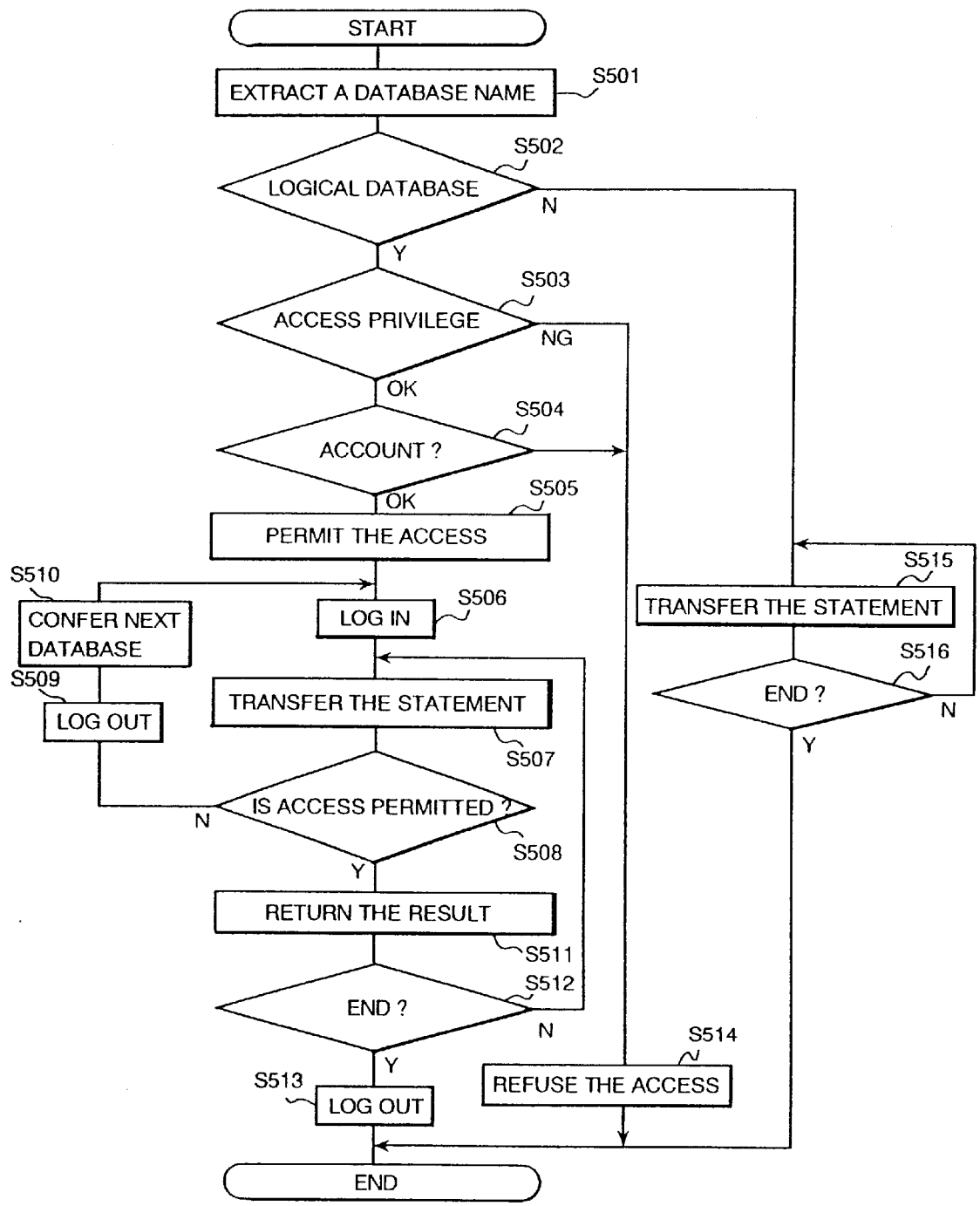
FIG. 5 is a flow chart showing the processing procedure of the table location searching unit in Embodiment 1.

FIG. 5 is a flow chart showing the processing procedure of the table location searching unit 7.

The table location searching unit 7 extracts the logical database name from the CONNECT statement stored in the statement buffer 6 (Step 501) and searches the logical database control block 13 in which the logical database name extracted at Step 501 is held in the logical database name storage area 13*a*(Step 502). This searching is executed in the storage area 202 of private logical database control block first. When the logical database name is not detected, the searching is executed in the storage area 201 of public logical database control block. The searching in the storage area 202 of private logical database control block is executed for the logical database control block 13 which is registered in correspondence with the OS user who is informed of from the logical database access controller 10 and with the group ID. When the table location searching unit 7 detects the logical database control block 13 in which the logical database name extracted at Step 501 is held in the logical database name storage area 13*a*, the unit goes to the processing at Step 503. When the logical database control block 13 having the designated name is not detected in both storage areas 201 and 202, the table location searching unit 7 goes to the processing at Step 515.

When the designated logical database control block 13 is detected in the storage area 202 of private logical database control block, the table location searching unit 7 checks whether use permission of the logical database 4 is given to the OS user who requests database access (Step 503). Whether use permission is given or not is judged with reference to the contents of the access privilege storage area 13b of the logical database control block 13 on the basis of the OS user ID and group ID which are informed of from the logical database access controller 10. When the searched logical database control block 13 relates to the public logical database, the table location searching unit 7 will not check the access privilege. When use permission of the private logical database is not given, the table location searching unit 7 informs the application program execution means 2 of refusal of access (Step 514) and ends the processing.

When the use permission of the private logical database is confirmed or the public logical database is a use object, the table location searching unit 7 extracts the logical database account from the CONNECT statement, confirms that it agrees with one of at least one logical database account registered in the logical database account storage area 13c of the detected logical database control block 13 (Step 504), and informs the application program execution means 2 of normal completion of logging in the logical databases 4 (Step 505). By doing this, the next statement is informed of from the application program execution means 2, so that the logical database access controller 10 stores the statement in the statement buffer 6. When the account does not agree with any one at Step 504, the table location searching unit 7 informs the application program execution means 2 of refusal of access (Step 514) and ends the processing.

When the above user confirmation processing ends, the table location searching unit 7 replaces the logical database name and logical database account in the CONNECT statement which are stored in the statement buffer 6 with the physical database name and physical database account for the physical database 1 assigned the highest priority (namely, registered at the top of the link) which is registered in the detected logical database control block 13, creates a CONNECT statement for access to the physical database 1, and then logs in the physical database 1 (Step 506). Next, the table location searching unit 7 reads the table access statement which is issued by the application program execution means 2 and stored in the statement buffer 6 by the logical database access controller 10 which receives it, issues it to the logged-in physical database 1 (Step 507), and waits for a response (Step 508).

The physical database management system 270 of the physical database 1 which receives the CONNECT statement and table access statement checks existence or nonexistence of the table to be accessed and the access privilege to the table to be accessed of the logged-in database user by using, for example, a system catalog which will be described later. When all the conditions are satisfied, the physical database management system 270 for managing the physical database 1 executes the processing corresponding to the received table access statement and returns the result. However, when one of the conditions is not satisfied, the physical database management system 270 returns information indicating refusal of access.

When the table location searching unit 7 receives information indicating refusal of access at Step 508, the unit judges that the table to be accessed is not stored in the physical database 1 which is under logging-in at present, creates and issues a DISCONNECT statement which is logged out of the physical database 1 (Step 509), and then repeats the table location searching processing at Steps 506 to 508 by using the physical database name and physical database account of the physical database 1 assigned the second-highest priority which is registered in the logical database control block 13 (Step 510). When the physical database 1 assigned the second-highest priority is not registered at Step 510, the table location searching unit 7 goes to the processing at Step 514 and informs the application program execution means 2 of refusal of access.

When the table location searching unit 7 receives the processing result from a certain physical database 1 at Step 508, the unit decides the table location as the physical database 1 which is under logging-in at present, returns the processing result to the application program execution means 2 via the logical database access controller 10 (Step 511), and waits for input of the next statement (Step 512). When the statement which is received from the application program execution means 2 next is a table access statement, the table location searching unit 7 repeats the processing at Step 507 and the subsequent steps. When a table access statement for accessing a table stored in the different physical database is received, refusal of access is judged at Step 508. Therefore, the table location searching unit 7 returns to Step 506 and inquires each physical database 1 about existence or nonexistence of the table.

When the received statement is a DISCONNECT statement for instructing logging out of the logical database 4 at Step 512, the table location searching unit 7 issues the DISCONNECT statement to the physical database 1 which is under logging-in at present (Step 513) and ends the processing.

On the other hand, when the database name in the CONNECT statement is different from the logical database name stored in any of the logical database control blocks 13 at Step 502, the table location searching unit 7 judges it as access to a specific physical database 1 and transfers all the statements to the physical database 1 as they are (Step 515) until the DISCONNECT statement is received (Step 516).

(4) Processing Sequence Example

FIG. 6 shows a sequence example of information which is exchanged between the application program execution means 2, the distributed database access management unit 3, and the physical databases 1 by the logical database access function in this embodiment. In the storage area 202 of private logical database control block, the logical database control block 13 relating to the private logical database LDB_A is held. In the physical database name storage area 13d of the logical database control block 13 relating to the logical database LDB_A, the names of the physical databases DB_a and DB_b are stored. In the access privilege storage area 13b of the logical database control block 13, permission of use and change is assigned to user_alpha who is an OS user and permission of use is assigned to group_ alpha which is an OS group. Furthermore, in the logical database control block 13, user_a is registered as a physical database account of the physical database DB_a and user_b is registered as a physical database account of the physical database DB_b in the physical database account storage area 13e respectively. As shown in FIG. 1, the physical database DB_a has tables a1 and a2 and the physical database DB_b has tables b1 and b2.

Firstly, the table location searching unit 7 of the distributed database access management unit 3 receives notification of the CONNECT statement (CONNECT (LDB_A, user_A) to the logical database LDB_A from the application program execution means 2. This CONNECT statement means an access request to the logical database LDB_A by the logical database account user_A. Therefore, the table location searching unit 7 checks the access privilege to the OS user (user ID: user_alpha, group ID: group_alpha) who issues the CONNECT statement (S503) and checks the logical database account user_A (Step 504). When the use privilege of the user is confirmed by the above check, the table location searching unit 7 informs the application program execution means 2 of permission of access (Step 505, D62). The application program execution means 2 which receives the notification of permission of access issues a table access statement (SELECT statement (SELECT (b1)) for the table b1 shown in the example in FIG. 6) (D63).

The table location searching unit 7 which receives the SELECT statement creates a CONNECT statement (CONNECT (DB_a, user_a), which is logged in by using the physical database account user_a, in the physical database DB_a assigned the highest priority among the physical databases 1 contained in the logical database LDB_A and logs it in the physical database DB_a (Step 506, D64). When the table location searching unit 7 receives a response of success of logging-in (D65) from the physical database DB_a, the unit issues the SELECT statement for the table b1 which is received from the application program execution means 2 to the physical database DB_a (Step 507, D66).

However, the physical database DB_a in which the table b1 is not stored returns information (D67) indicating refusal of access to this SELECT statement. Therefore, the table location searching unit 7 creates and issues a DISCONNECT statement for breaking the connection to the physical database DB_a (D68). When the table location searching unit 7 confirms breaking of the connection (D69), the unit creates a CONNECT statement (CONNECT (DB_b, user_b), which is logged in by using the physical database account user_b, in the physical database assigned the second-highest priority and logs it in the physical database DB_b (Step 506, D70). When a response of permission of access (D71) is returned to this CONNECT statement from the physical database management system for managing the physical database DB_b, the table location searching unit 7 issues the SELECT statement once again (Step 507, D72).

In accordance with this SELECT statement, the physical database management system for managing the physical database DB_b searches for the stored table b1 and returns the processing result (D73). The table location searching unit 7 which receives the result informs the application program execution means 2 of this response (D74). From this response, the table location searching unit 7 recognizes the physical database DB_b as a physical database 1 in which the table b1 is stored and issues the access statement (UPDATE statement (UPDATE (b1)) for the table b1) (D75) and DISCONNECT statement (D79), which are received from the application program execution means 2 thereafter, to the physical database DB_b (D76, D80). The table location searching unit 7 informs the application program execution means 2 of responses (D77, D81) of the physical database management system for managing the physical database DB_b to it.

C. Effect of Embodiment 1

(1) Realization of Logical Databases

As mentioned above, by using the distributed database management system (distributed database access management unit 3) in this Embodiment 1, at least one physical database 1 can be handled as a logical database 4, which is a virtual database, in a batch.

When the table location searching unit 7 in this Embodiment 1 receives an access instruction to the logical database 4, the unit automatically logs in at least one physical database 1 which is defined to constitute the logical database 4 and decides the table location by inquiring about existence or nonexistence of the table to be accessed by transferring the table access statement. Therefore, even if the table configuration in the physical database 1 is changed such as creation or deletion of tables, a user of the distributed database management system of this Embodiment 1 does not need to change the information relating to the logical database 4 which is stored in the logical database dictionary 8 and can access an optional table 100 transparently regardless of the table configuration in the physical database 1. Furthermore, a user of the distributed database management system of this Embodiment 1 can access the desired table 100 in the distributed database environment without being aware of differences in the account between the physical databases 1 only by knowing a single logical database account.

(2) Double Check of Use Qualification

According to this Embodiment 1 (and the embodiments which will be described later), permission of use of a user for accessing the logical database 4 is doubly checked by the logical database account and the access privilege on the OS user level. Therefore, for example, if the ID and password for logging in the operating system do not leak out though the logical database account is known by another person, illegal use of the logical database 4 can be prevented.

However, one of the check functions can be omitted. For example, when an operating system for a single user is used as an operation environment of the application program execution means 2, logging in the operating system is not necessary. When qualification check as an OS user is not necessary like this, in this Embodiment 1, by registering the logical database to be used as a public logical database, the check of the access privilege at Step 503 can be omitted. Since the legality of the user is confirmed by logging in the operating system, there is a user's need for simplification of account input at the time of logging in the database. When the qualification check as an OS user or the logical database account check is not necessary like this, by correcting the processing flow of the table location searching unit 7 and deleting Step 503 and/or Step 504, one of the double checks or both of them can be omitted. For example, when Step 504 is deleted, the user can access the logical database 4 without inputting the logical database account after logging in the operating system.

(3) Troubleshooting Function

Using the logical database access function in this Embodiment 1, by storing a copy of a table stored in a certain physical database 1 in a different physical database 1 assigned lower priority in the same logical database 4 under the same name beforehand, a user can cope with faults of the physical database 1.

Figure 12:
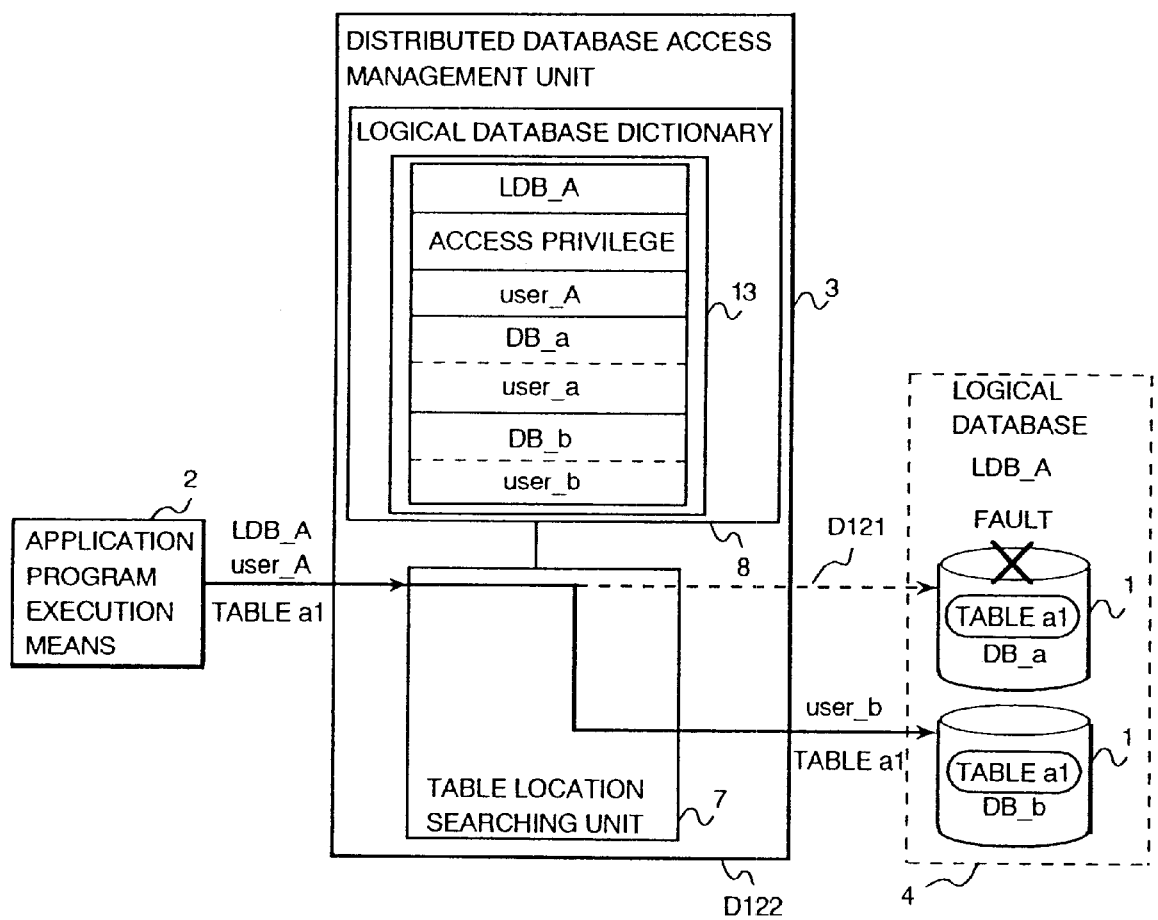
FIG. 12 is a drawing for explaining a countermeasure using the distributed database management system in Embodiment 1.

A database troubleshooting function applying the logical database access function in Embodiment 1 will be explained with reference to FIG. 12. In the example shown in FIG. 12, a copy of the table a1 stored in the physical database DB_a is stored in the physical database DB_b contained in the same logical database LDB_A under the same name so as to cope with faults. It is assumed that the physical database DB_a is stopped due to an occurrence of a fault.

The table location searching unit 7 receives an access request to the logical database LDB_A from the application program execution means 2 and tries to log in the physical database DB_a assigned highest priority first (Step 506, D121). The physical database DB_a which is a copy source and stores the table a1 cannot return a response to logging-in due to the occurrence of the fault. Therefore, the table location searching unit 7 logs in the physical database DB_b assigned the second-highest priority and issues the table access statement received from the application program execution means 2 to the table a1 in the physical database DB_b (D122).

As mentioned above, when a fault occurs in the physical database 1 in which the table to be accessed is stored, the table location searching unit 7 in this Embodiment 1 (and the embodiments which will be described later) automatically searches another physical database 1 constituting the logical database 4 for the above table. By doing this, when the physical database 1 assigned higher priority holding the above table cannot be accessed, the copied table stored in the physical database 1 assigned lower priority is accessed. Therefore, the user can access the desired table data without being aware of a fault in a certain physical database 1 in the distributed database environment.

Embodiment 2

In the case of the logical database access function in Embodiment 1 mentioned above, the logical database account is stored in each logical database control block 13. Namely, the logical database user is managed for each logical database 4. Therefore, when a different logical database 4 is accessed by the same logical database account, it is necessary to register the same account in the logical database account 13c of each logical database control block 13. Therefore, in the distributed database management system of the present invention, a second account management method which is different from the account management method used in Embodiment 1 may be used. According to the account management method in this embodiment, the whole distributed database management system manages the logical database user and assigns use permission of each logical database 4 to the user.

A. Constitution of the Logical Database Dictionary

According to the second account management method, as shown in FIG. 7(b), the storage area 203 of logical account control block is installed in the logical database dictionary 8. In Embodiment 1, all the accounts, that is, the user ID and password are held in the storage area 13c of logical database account of the logical database control block 13. In this Embodiment 2, however, as shown in FIG. 7(a), only the user ID is held in the storage area 17c of logical database account of the logical database control block 17. In this embodiment, all the accounts are stored in the logical account control block 18 which is held in the aforementioned storage area 203 of logical account control block instead of the storage area 17c of the logical database account.

According to the second account management method, the logical account control block 18 which is held in the storage area 203 of logical account control block of the logical database dictionary 8 is an area where the account information (user ID and password) of all the logical database users using the distributed database management system is stored. Furthermore, according to the second account method, the storage area 17c of logical database account of the logical database control block 17 is an area where the user ID of the logical database user who can use the logical database 4 indicated by the logical database control block 17 is held. A plurality of user IDs can be registered in the storage area 17c of logical database account. User IDs stored in the area 17c are a part of the set of user IDs which are stored in the logical account control block 18. In the public logical database which is permitted to be used by all users, "NULL" (a symbol meaning a null value) is registered in the area 17c.

B. Processing of the Logical Database Defining Unit

The logical database deleting processing and logical database access privilege granting processing of the logical database defining unit 9 in this Embodiment 2 and the logical database registering processing excluding Step 315 are the same as those in Embodiment 1. The processing at Step 315 in this Embodiment 2 is as shown below. Firstly, the logical database defining unit 9 stores the designated logical database user ID in the storage area 17c of logical database account. When "PUBLIC" is designated, the logical database defining unit 9 stores "NULL" in the storage area 17c of logical database account. Next, when the logical account control block 18 holding the designated logical database account is not in the storage area 203 of logical account control block, the logical database defining unit 9 reserves an area newly in the logical account control block 18 and stores the designated logical database user ID and logical database password in this area.

When the logical database defining unit 9 receives a logical account deleting statement, for example, as shown in FIG. 18(g), the unit may delete the logical account control block 18 which exists already.

C. Processing of the Table Location Searching Unit

In the logical database account confirmation processing (Step 504), the table location searching unit 7 in this Embodiment 2 extracts the logical database account from the CONNECT statement and confirms that the user ID of the extracted account agrees with one of the user IDs held in the logical database control block 17. However, this processing will not be executed when "NULL" is registered in the logical database account 17c of the logical database control block 17, that is, in the case of the public logical database. Next, the table location searching unit 7 searches the logical account control block 18 holding the logical database account which is extracted from the CONNECT statement in the storage area 203 of the logical account control block 18. When the logical account control block 18 to be desired is detected, the table location searching unit 7 goes to the processing at Step 505 and the subsequent steps. When one of the above conditions is not satisfied, the table location searching unit 7 refuses access to the logical database 4 (Step 514). The other processing of the table location searching unit 7 is the same as that shown in Embodiment 1.

D. Effect of this Embodiment 2

According to this embodiment using the second account management method, when the logical database account is registered in the logical account control block 18 once, there is no need to register the password in the storage area 17c of logical database account of each logical database control block and a plurality of logical databases 4 can be accessed by using a single logical database account.

Embodiment 3

There are physical database management systems on sale, which have an auditing function for acquiring records relating to access to physical databases for each user. If each user uses his unique logical database 4 in Embodiment 1 or 2, there is no problem imposed. However, if a plurality of users share one logical database 4, all the users log in a plurality of physical databases 1 belonging to one logical database 4 using the same account. The reason is that the account to be used for logging in the physical databases 1 is limited to the physical database account 13e or 17e of the logical database control block 13 or 17. Therefore, detailed access records for each physical database user cannot be obtained from the auditing function of the physical databases 1. To correspond to the auditing function of the physical databases 1, it is necessary to change the account for automatic logging in depending on the user. Therefore, in this Embodiment 3, a third account management method which is different from the account management method which is used in Embodiment 1 or 2 is used.

A. Processing of the Table Location Searching Unit

In this Embodiment 3, the account to be used for automatic logging in the physical databases 1 is changed depending on the user, so that the table location searching unit 7 is provided with a function for automatically logging in the physical databases 1 using a different account for each user. In this Embodiment 3, when "NULL" is registered in the physical database account 13e or 17e of the logical database control block 13 or 17, the table location searching unit 7 judges that the third account management method is used. The other processing of the table location searching unit 7 is the same as that of Embodiment 1.

B. Operation Example

Figure 8:
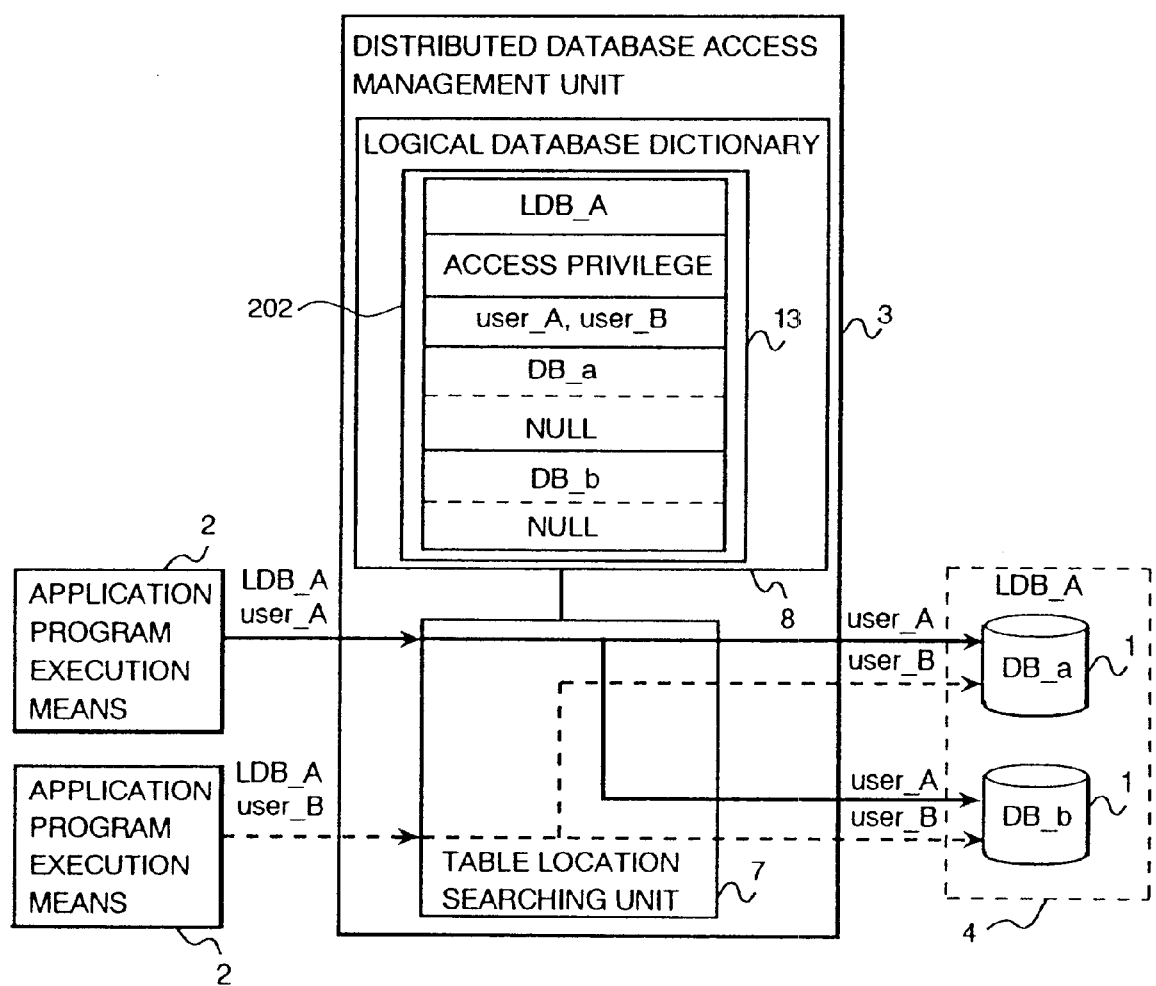
FIG. 8 is a drawing for explaining the operation in Embodiment 3.

The operation of the table location searching unit 7 so as to realize the third account management method will be explained with reference to FIG. 8.

When the logical database defining unit 9 receives the logical database creating statement 14 (shown in FIG. 3(a)) in which "NULL" indicating a null value is described in the locations of the logical database creating statement 14 shown in FIG. 3(a) where the physical database user ID and, e dare described, the defining unit registers "NULL" in the physical database account 13e or 17e of the logical database control block 13 or 17.

When "NULL" is registered in the physical database account 13e or 17e of the logical database control block 13 or 17, the table location searching unit 7 logs the logical database account in the CONNECT statement in each physical database 1 as it is without replacing it at Step 506. Namely, the table location searching unit 7 uses the logical database account user_A or user_B which is inputted by the user at the time of logging in the logical database LDB_A as it is as an account to be logged in the physical database DB_a or DB_b constituting the logical database LDB_A.

C. Effect of this Embodiment 3

According to this Embodiment 3, even in an environment that the logical databases 4 are shared by a plurality of users, the account to be used for logging in the physical databases 1 can be changed depending on the user. Furthermore, in Embodiment 1 or 2, to prevent each physical database account stored in the logical database dictionary 8. from illegal reference, it is desirable to protect these data by encryption. However, according to this Embodiment 3, it is not necessary to store the account in the logical database dictionary 8 and a means of encryption is not necessary.

In this Embodiment 3, the automatic logging-in function by the register account which is shown in Embodiments 1 and 2 can be included by use of one logical database 4. In this case, it is desirable to register "NULL" in the physical database account 13e or 17e of the physical database 1 in which it is necessary to change the account depending on the user and to register the desired account in the physical database account 13e or 17e of the physical database 1 in which it is not necessary to change the account.

Embodiment 4

According to Embodiment 3, the logical database account which is inputted by the user at the time of logging in the logical databases 4 is logged in some databases 1 among the databases 1 constituting the logical databases 4 in which "NULL" is registered as an account. Therefore, it is necessary that an account which is the same as the logical database account is registered in these databases 1. However, in a distributed database environment that each database 1 is uniquely operated in each department of enterprises, all the database accounts are not always standardized.

Therefore, in this Embodiment 4, by using a fourth account management method which is different from the account management methods used in Embodiments 1 to 3, the account at the time of logging in can be changed depending on the user also for a plurality of physical databases 1 in which different accounts are registered.

A. Constitution of the Logical Database Dictionary

According to the fourth account management method, as shown in FIG. 9(b), the storage area 204 of logical account control block is installed in the logical database dictionary 8. The logical database control block 19 in this Embodiment 4 is an area where the logical database constitution information which can be shared by a plurality of users is stored and the logical account control block 20 in this Embodiment 4 is an area where the account information for each user is stored.

In Embodiments 1 to 3, the logical database control block 13 or 17 in the storage area 202 of private logical database control block is held in correspondence with the OS user name. However, in this Embodiment 4, it is held in correspondence with the logical database user name.

However, in Embodiments 1 to 3, it may be held in correspondence with the logical database user name. In this Embodiment 4, it may be held in correspondence with the OS user name.

In this Embodiment 4, as shown in FIG. 9(a), the logical database control block 19 consists of a logical database name storage area 19a, a logical database account storage area 19b, and a physical database name storage area 19c but does not include the access privilege storage area 13b and the physical database account storage area 13e which are installed in the logical database control block 13 in Embodiment 1. The area 19a is an area for storing the name of logical database 4, and the area 19b is an area for storing the logical database user ID for permitting use of the logical database 4, and the area 19c is an area for storing the names of a plurality of physical databases 1 constituting the logical database 4.

In the logical database account storage area 13c in Embodiment 1, the user ID and password are stored. However, in the logical database account storage area 19b in this Embodiment 4, only the user ID is stored and no password is stored. A plurality of user IDs can be stored in the logical database account storage area 19b. However, in the above area of the logical database control block 19 relating to the logical database 4 which is defined as public, "NULL" is registered. In the physical database name storage area 19c, the physical databases 1 belonging to the logical database 4 to which the logical database control block 19 is assigned are stored.

In the aforementioned storage area 204 of logical account control block, the logical database account control block 20 which is created by the logical database defining unit 9 for each logical database account of the logical database is held. The logical database account control block 20 in this Embodiment 4 consists of a logical database account storage area 20a, an access privilege storage area 20b, a physical database name storage area 20c, and a physical database account storage area 20d. In this embodiment, all the physical database accounts are held in the physical database account storage area 20d but not in the logical database control block 19.

The area 20a of the logical account control block 20 is an area for storing the logical database account consisting of the user ID and and the area 20*b* is an area for storing the access privilege relating to the logical database account, and the area 20*c* is an area for storing the name of the physical database 1, and the area 20*d* is an area for storing the account of the physical database 1. In this Embodiment 4, it can be considered that a plurality of physical database accounts are assigned to a logical database account. Therefore, a plurality of sets of physical database name storage areas 20*c* and physical database account storage areas 20*d* are provided so that the physical database names and physical database accounts can be held in correspondence with a plurality of physical databases 1. For example, in a logical account control block 20, the logical database account for identifying a certain user uniquely, the names of all the physical databases 1 which can be accessed by the above user, and the account which is used by the user for logging in are registered beforehand. In this Embodiment 4, the storage order of this combination is used as a priority order at the time of searching of the table location.

B. Processing of the Table Location Searching Unit 7

Next, the processing of the table location searching unit 7 in this Embodiment 4 will be explained. The processing other than the one which is described hereunder is the same as that in Embodiment 2.

(1) Confirmation of the Logical Database Account (Step 504)

The table location searching unit 7 in Embodiment 2 confirms the account at Step 504 by searching the logical account control block 18 holding an account which agrees with the logical database account designated by the CONNECT statement in the storage area 203 of logical account control block. On the other hand, the table location searching unit 7 in this Embodiment 4 confirms the account at Step 504 by checking that the account which is held in the logical database account storage area 20*a* of the logical account control block 20 in the storage area 204 of logical account control block agrees with the logical database account which is designated by the CONNECT statement.

(2) Confirmation of the Access Privilege (Step 503)

The table location searching unit 7 in Embodiment 2 confirms the access privilege at Step 503 by using the contents of the access privilege storage area 13*b* of the logical database control block 13. On the other hand, the table location searching unit 7 in this Embodiment 4 confirms the access privilege at Step 503 by using the contents of the access privilege storage area 20*b* of the logical database control block 20 (when the user ID which agrees with the logical database user ID designated by the CONNECT statement is held in the logical database account storage area 20*a*).

In Embodiment 2, the access privilege as an OS user is not confirmed for the public logical database. However, in Embodiment 4, the access privilege is a privilege for accessing the logical account control block 20 and the access privilege as an OS user is checked regardless of the public and private logical databases. When the access privilege as an OS user is not necessary in the same way as with Embodiment 1, the processing at Step 503 may be deleted.

In this Embodiment 4, Step 504 is executed prior to Step 503. The reason is that in this Embodiment 4, the access privilege storage area 20*b* which is referred to at Step 504 exists in the logical account control block 20 which is detected at Step 504.

(3) Decision of an Object to be Logged In (Step 506)

When the table location searching unit 7 in this Embodiment 4 decides the physical database 1 to be logged in, the searching unit refers to both the logical database control block 19 and the logical account control block 20. Namely, the table location searching unit 7 logs in the physical database 1 which is registered in the physical database name storage area 19*c* of the logical database control block 19 and is registered in the physical database name storage area 20*c* of the logical account control block 20 (when the user ID which agrees with the logical database user ID described in the CONNECT statement is held in the logical database account storage area 20*a*) using the logical database account which is registered in the area 20*d* and searches the table location sequentially. Namely, in this Embodiment 4, the physical database 1 which is actually logged in is limited to the physical database 1 which is registered in both the logical database control block 19 corresponding to the logical database name described in the CONNECT statement and the logical account control block 20 corresponding to the logical database user ID described in the CONNECT statement.

(4) Processing of the CONNECT Statement to which a Physical Database is Directly Designated (Step 515)

Furthermore, in this Embodiment 4, even when the name of a physical database 1 is directly designated in the CONNECT statement instead of the name of a logical database, the account is changed to the physical database account registered in the logical account control block 20. Namely, when the table location searching unit 7 in this Embodiment 4 transfers the CONNECT statement for statement transfer at Step 515, the searching unit detects the logical account control block 20 which holds an account, which agrees with the account described in the CONNECT statement held in the statement buffer 6, in the logical database account storage area 20*a*, detects the physical database account of the logical account control block 20 which is recorded in correspondence with the physical database name described in the CONNECT statement, rewrites the description of the account in the CONNECT statement in the statement buffer 6 with this account, and transfers the statement. By doing this, also a user who directly accesses physical databases 1 instead of logical databases 4 can access a plurality of physical databases of different accounts using the same logical database account.

C. Operation Example

The operation of the distributed database access management unit 3 when the aforementioned fourth account management method is used will be explained with reference to FIG. 10.

The table location searching unit 7 which receives an access request 101 for the public logical database LDB__A using the logical database account user__A from the application program execution means 2 refers to the logical database control block 19 and the logical account control block 20*e*, logs in (102, 103) the common physical databases DB__a and DB__b using the physical database accounts user__a and user__b respectively (Step 506), and searches for the table location sequentially (Step 507). The logical database DB__c which is registered in the logical account control block 20*e* is not included in the logical database control block 19 of the logical database LDB__A, so that it will not be searched for.

The table location searching unit 7 which receives an access request 104 for the logical logical database LDB__A using the logical database account user__B from the application program execution means 2 logs in (105) the physical database DB__a which is registered in the logical database control block 19 and the logical account control block 20*f* in common using the physical database account user__d (Step 506) and inquires about existence or nonexistence of the table (Step 507). Since the physical database DB_b which is registered in the logical database control block 19 of the logical database LDB_A is not included in the logical account control block 20f of the logical database account user_B, it will not be searched for.

The table location searching unit 7 which receives an access request 106 for the physical database DB_c using the account user_A from the application program execution means 2 directly logs in (107) the physical database DB_c because the logical database control block 19 in which DB_c is stored in the logical database name storage area 19a does not exist in the logical database dictionary 8 (Step 515) and inquires about existence or nonexistence of the table (Step 515). The physical database account which is used in this case is not user_A which is described in the CONNECT statement but user_c which is held in the physical database account storage area 20d corresponding to the physical database storage area 20c holding DB_c of the physical account control block 20e in which user_A is held in the logical database account storage area 20a.

D. Definition of Logical Database

Next, the definition of logical database in this Embodiment 4 will be explained. Examples of database access statements which are used for registration, change, and deletion of information on logical databases and logical accounts are shown in FIGS. 18(a) to 18(g). The distributed database access management unit 3 in this Embodiment 4 receives a definition instruction of logical database from a user who logs in the distributed database access management unit 3 using the account as a logical database user prior to definition of the logical database 4 and creates or edits definition information (logical database control block 19 and logical account control block 20) of logical database corresponding to this instruction in the logical database dictionary 8.

(1) Registration of Logical Database

As shown in a statement example 26 in FIG. 18(a), a statement to be used to create the logical database 4 contains descriptors "PRIVATE" and "CONNECT TO" unlike the logical database creating statement in Embodiment 1. The meanings of the other descriptors are the same as those in Embodiment 1. The descriptor "PRIVATE" means that the defined logical database is a private logical database. The descriptor "CONNECT TO" means that the database name which is described next is the name of a physical database 1 constituting the logical database 4. A plurality of names of physical databases 1 can be described continuously via a continuation symbol ",". The priority order may be described immediately after the physical database name. Designation of the priority order can be omitted. If this occurs, in this Embodiment 4, the description order indicates the priority order (namely, it is assumed that the physical database 1 described at the top is assigned the highest priority).

Figure 30:
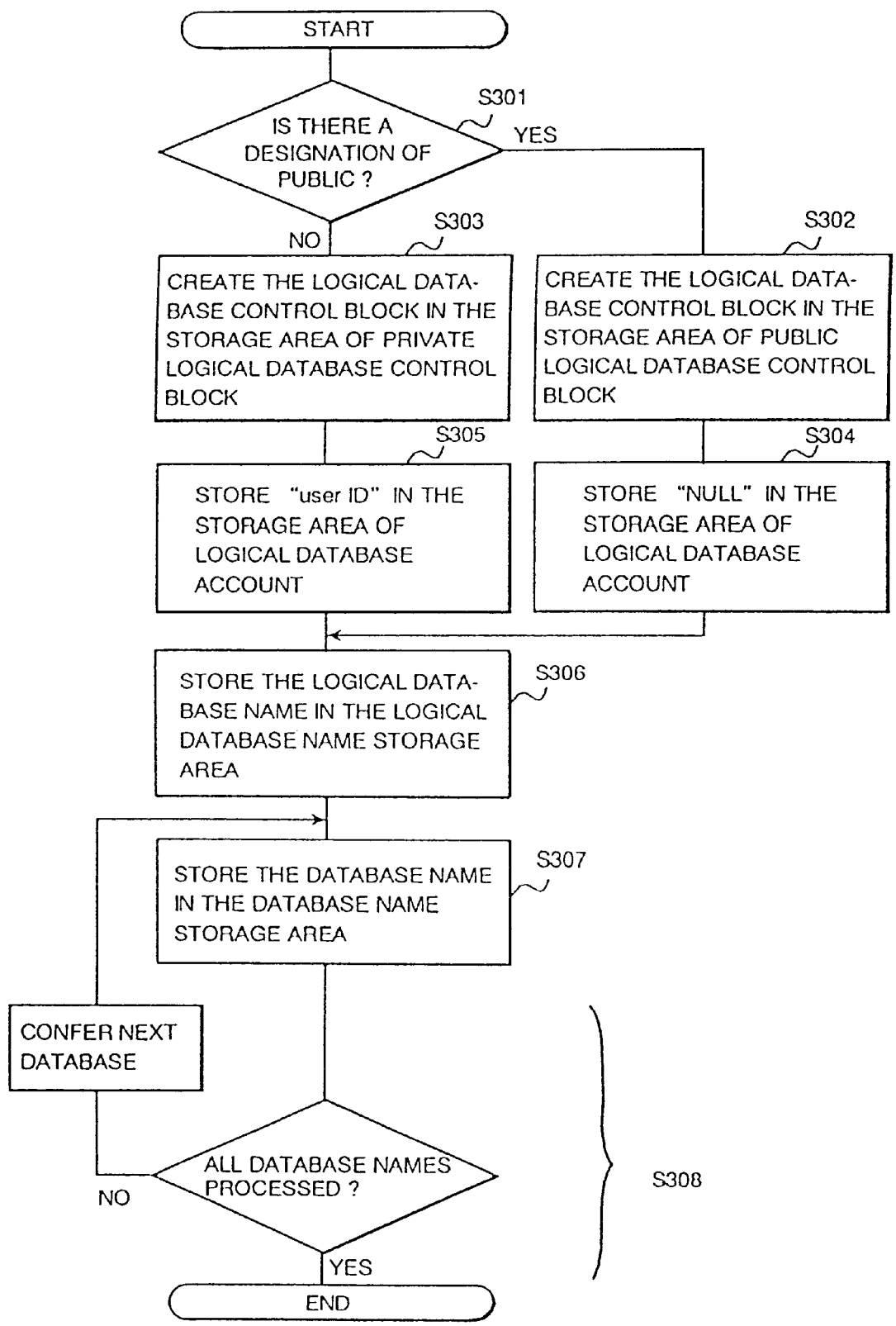
FIG. 30 is a flow chart showing the procedure of the logical database registration processing of the logical database defining unit in Embodiment 4.

The flow of the logical database registration processing of the logical database defining unit 9 in this Embodiment 4 is shown in FIG. 30. When the logical database defining unit 9 in this Embodiment 4 receives the logical database creating statement 26 which is issued by the application program execution means 2 via the logical database access controller 10, the defining unit checks whether there is a designation of "PUBLIC" first (Step 301). The logical database defining unit 9 creates a logical database control block 19 newly in the storage area 201 of public logical database control block when "PUBLIC" is designated immediately after the descriptor "CREATE" (Step 302) or in the storage area 202 of private logical database control block when "PUBLIC" is not designated (Step 303) and stores "NULL" in the logical database account storage area 19b when "PUBLIC" is designated (Step 304) or the user ID of the logical database user who issues the statement 26 when "PUBLIC" is not designated (Step 305). Next, the logical database defining unit 9 stores the logical database name following "LOGICAL DATABASE" in the statement in the logical database name storage area 19a of the logical database control block 19 (Step 306) and reserves and stores the physical database names described behind the descriptor "CONNECT TO" in the physical database name storage area 19c sequentially (Steps 307, 308). The logical database defining unit 9 connects the physical database name storage areas 19c with links. When the priority order is designated, the defining unit stores the logical database names so that the storage locations on the links are set in the priority order. When the priority order is not designated, the defining unit stores the logical database names so that the storage locations on the links are set in the description order.

(2) Changing of Logical Database

An example of a statement which is used so as to change the registration information of the logical database 4 is shown as a statement 27 in FIG. 18(b). In this Embodiment 4, physical databases 1 constituting the logical database 4 can be added or deleted or the priority order can be changed among the registration information of the logical database. The logical database changing statement 27 has a descriptor "ALTER". When there is a descriptor "ADD" in the statement, it means an instruction of addition of at least one physical database 1 which is described immediately after it. When there is a descriptor "DROP" in the statement, it means an instruction of deletion of at least one physical database 1 which is described immediately after it. When there is a descriptor "MODIFY" in the statement, it means an instruction of changing of the priority order of at least one physical database 1 which is described immediately after it. A designation of priority order in the ADD clause can be omitted. In this case, the logical database defining unit 9 registers the physical database 1 assigned the lowest priority among the physical databases 1 constituting the logical database 4 in the logical database control block 19. When "ALL" is designated in the DROP clause, the logical database defining unit 9 deletes the physical database names of all the physical databases 1 constituting the logical database 4 from the logical database control block 19. When there is a descriptor "NAME" in the statement, it means an instruction of changing of the name of the logical database control block to be processed to the name which is described immediately after "NAME".

Figure 32:
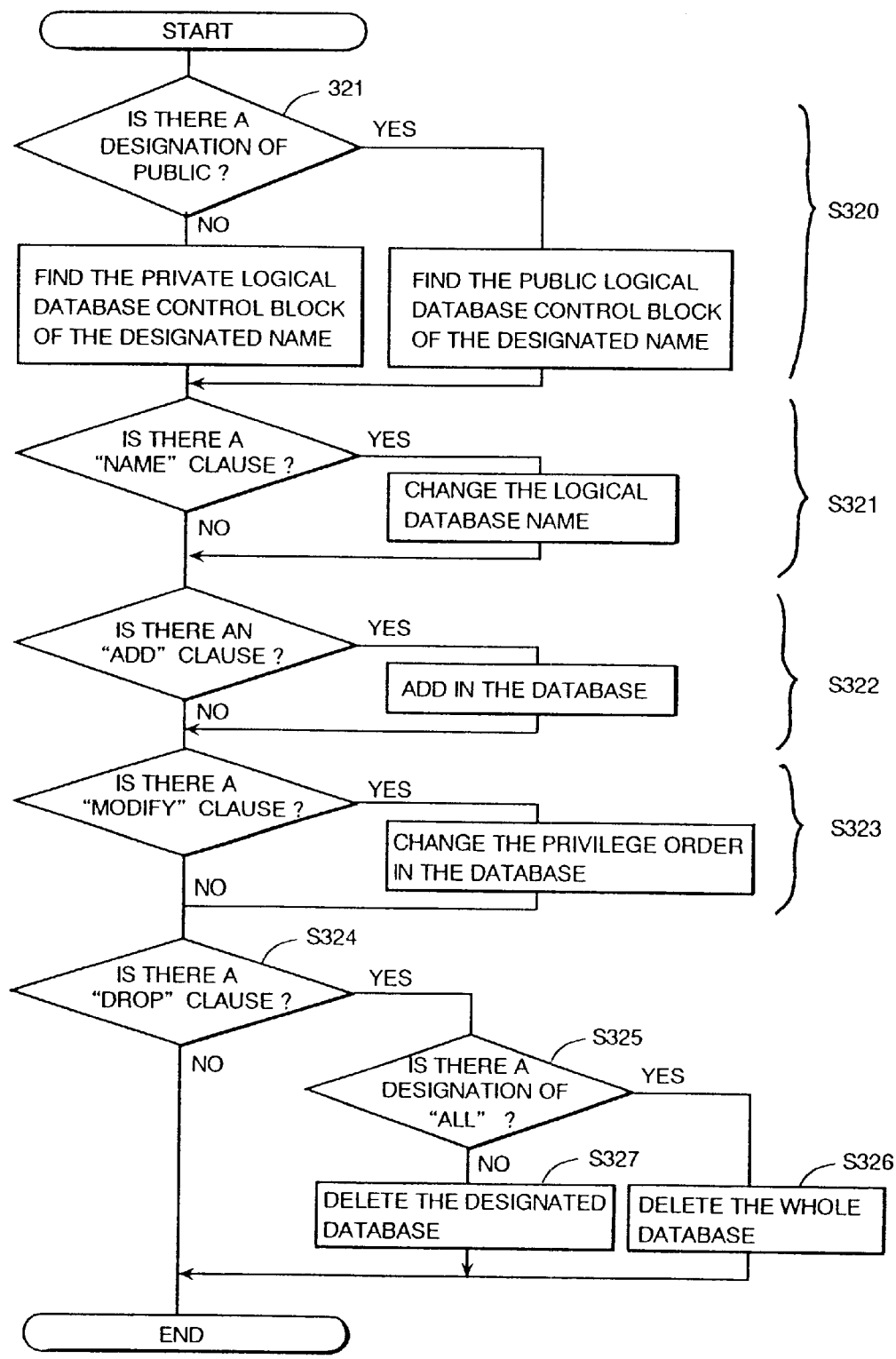
FIG. 32 is a flow chart showing the procedure of the logical database change processing of the logical database defining unit in Embodiment 4.

The flow of the logical database changing processing of the logical database defining unit 9 in this Embodiment 4 is shown in FIG. 32. When the logical database defining unit 9 in this Embodiment 4 receives the logical database changing statement 27 which is issued by the application program execution means 2 via the logical database access controller 10, the defining unit checks whether there is a designation of "PUBLIC" first and searches the logical database control block 19, which holds the logical database name following "LOGICAL DATABASE" in the statement in the logical database name storage area 19a, in the storage area 201 of public logical database control block when designated or in the storage area 202 of private logical database control block when not designated (Step 320).

When the designated logical database control block 19 is detected, the logical database defining unit 9 checks whether there is a descriptor "NAME" in the statement 27. When it is detected, the logical database defining unit 9 stores the name described immediately after "NAME" in the logical database name storage area 19a of the logical database control block 19 which is detected at Step 320 (Step 321).

Furthermore, the logical database defining unit 9 checks whether there is a descriptor "ADD" in the statement 27. When it is detected, reserving an area, theological database defining unit 9 stores the names described immediately after "ADD" sequentially in the physical database name storage area 19c of the logical database control block 19 which is detected at Step 320 (Step 322). The logical database defining unit 9 connects the physical database name storage area 19c which is newly reserved to the existing physical database name storage area 19c with a link. When the priority order is designated, the logical database defining unit 9 links the storage areas so that the storage locations on the links are set in the priority order. When the priority order is not designated, the logical database defining unit 9 links the storage areas so that they are located on the last link.

Next, the logical database defining unit 9 checks whether there is a descriptor "MODIFY" in the statement 27. When it is detected, the logical database defining unit 9 updates the link of the physical database name storage area 19c of the logical database control block 19 which is detected at Step 320 and changes the location on the link of the physical database name storage area 19c where the name which is described immediately after "MODIFY" is held to the location in correspondence with the priority order which is described immediately after the above name (Step 323).

Finally, the logical database defining unit 9 checks whether there is a descriptor "DROP" in the statement 27 (Step 324). When it is detected, the logical database defining unit 9 checks whether there is "ALL" immediately after "DROP" (Step 325). When there is "ALL", the logical database defining unit 9 disconnects all the physical database name storage areas 19c of the logical database control block 19 which are detected at Step 320 from the links and deletes them (Step 326). When there is not "ALL", the logical database defining unit 9 disconnects and deletes the physical database name storage area 19c of the logical database control block 19 which is detected at Step 320 and holds the name which is described immediately after "DROP" from the link (Step 327).

(3) Deletion of Logical Database

An example of a statement which is used so as to delete the logical database 4 is shown as a statement 28 in FIG. 18(c). The logical database defining unit 9 which receives the statement 28 detects the logical database control block 19 which holds the name described immediately after "DROP LOGICAL DATABASE" in the logical database name storage area 19a and deletes the name in the same way as with Embodiment 1.

(4) Access Privilege Granting of Logical Database

An example of a statement for giving use permission of a created private logical database to another logical database user is shown as a statement 29 in FIG. 18(d). The statement 29 has descriptors "GRANT LOGICAL DATABASE" and "TO". The descriptor "GRANT LOGICAL DATABASE" means that the name described immediately after it is the logical database name to which the access privilege is granted and the descriptor "TO" means that the name described immediately after it is an object to which the access privilege is granted. When "PUBLIC" is described immediately after the descriptor "TO", it means that the access privilege is given to all the users.

When the logical database defining unit 9 in this Embodiment 4 receives the logical database access privilege granting statement 29 which is issued by the application program execution means 2 via the logical database access controller 10, the defining unit detects the logical database control block 19 which holds the name described immediately after "GRANT LOGICAL DATABASE" in the logical database name storage area 19a first. Next, the logical database defining unit 9 checks whether "PUBLIC" is described immediately after "TO". When "PUBLIC" is described immediately after "TO", the logical database defining unit 9 changes the storage area of the detected logical database control block 19 to the storage area 201 of public logical database control block and registers "NULL" in the logical database account storage area 19b. When "PUBLIC" is not described immediately after "TO", the logical database defining unit 9 stores the name described immediately after "TO" in the logical database account storage area 19b of the detected logical database control block 19.

(5) Registration of Logical Account

An example of a statement which is used so as to register the logical account is shown as a statement 30 in FIG. 18(e). The logical account registering statement 30 has descriptors "GRANT USER" and "USING". The descriptor "USING" may be omitted.

The logical database defining unit 9 which receives the statement 30 creates a logical account control block 20 newly in the storage area 204 of logical account control block and stores the user ID which is described immediately after "GRANT USER" in the statement and the# password which is described immediately after "USING" in the logical database account storage area 20a of the created logical account control block 20. When "USING" is not described, the logical database defining unit 9 stores no password. If this occurs, the table location searching unit 7 does not check the password in the CONNECT statement at Step 504.

(6) Changing of Logical Account

An example of a statement which is used so as to change the logical account registration information is shown as a statement 31 in FIG. 18(f). In this Embodiment 4, physical database names and logical database accounts which are registered in the logical account control block can be added, changed, or deleted. Furthermore, passwords included in logical database accounts which are registered in the logical account control block can be changed.

The logical database changing statement 31 has a descriptor "ALTER USER". When there is a descriptor "ADD" in the statement, it means an instruction of addition of the physical database user ID and pass word which are described immediately after the physical database name as a physical database account having the physical database name which is described immediately after "ADD". When there is a descriptor "MODIFY" in the statement, it means an instruction of changing of the physical database account having the physical database name which is described immediately after "MODIFY" to the physical database user ID and pass word which are described immediately after the physical database name. When there is a descriptor "DROP" in the statement, it means an instruction of deletion of the physical database information having the physical database name which is described immediately after "DROP". When there is a descriptor "USING" in the statement, it means an instruction of changing of the passwords which is included in the logical database account of the logical account control block 20 which is designated as a processing object to the password which is described immediately after "USING".

A plurality of physical databases can be designated for addition, changing, and deletion. A designation of a physical database password in the "ADD" clause or "MODIFY" clause can be omitted. In the "DROP" clause, "ALL" may be designated in place of the physical database name. A designation of "ALL" means an instruction of deletion of all the physical database information from the designated logical account control block 20.

Figure 33:
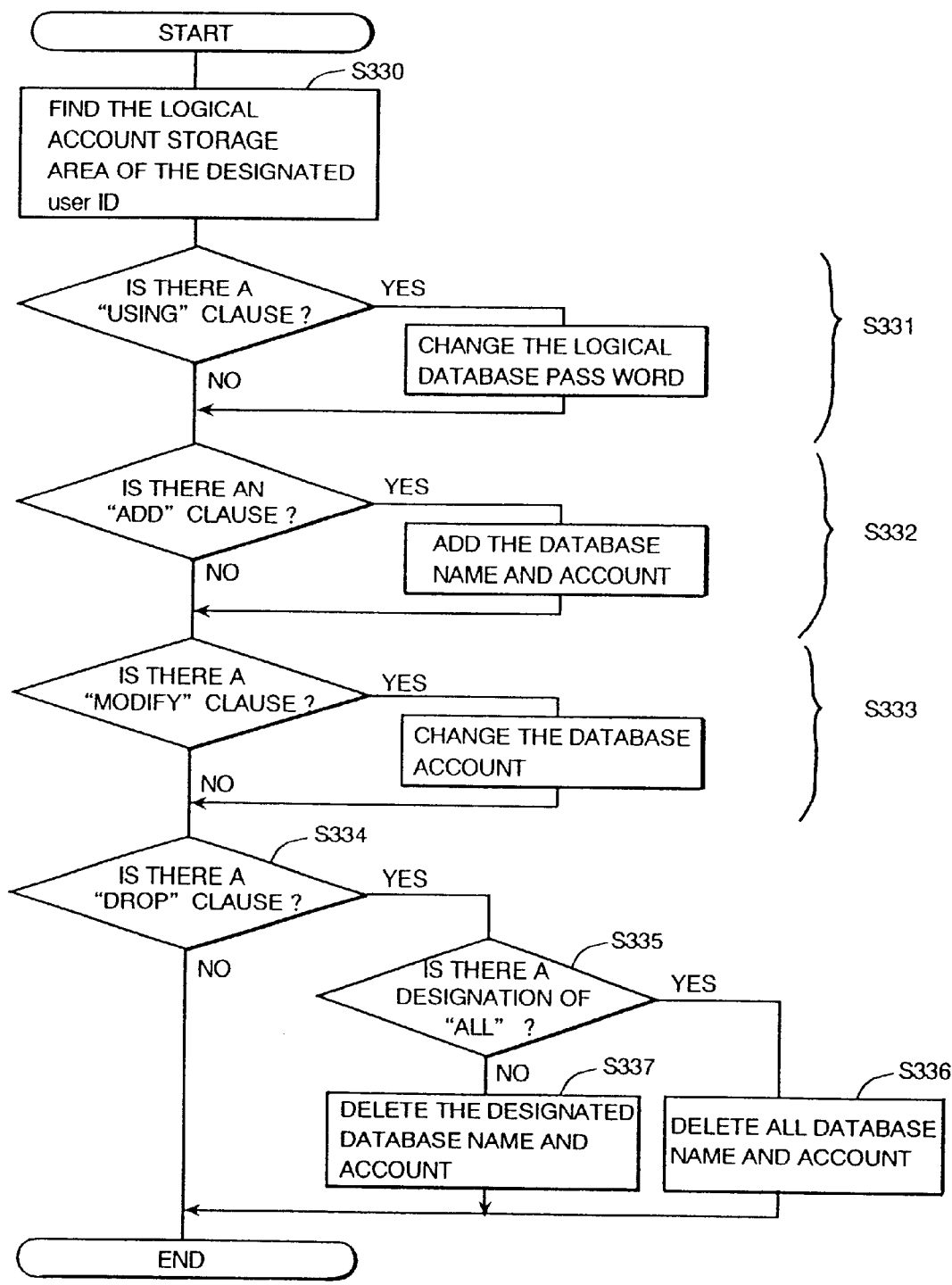
FIG. 33 is a flow chart showing the procedure of the logical account control block change processing of the logical database defining unit in Embodiment 4.

The flow of the logical account changing processing of the logical database defining unit 9 in this Embodiment 4 is shown in FIG. 33.

When the logical database defining unit 9 in this Embodiment 4 receives the logical access changing statement 31 which is issued by the application program execution means 2 via the logical database access controller 10, the defining unit searches for the logical account control block 20 which holds the logical database user ID following "ALTER USER" in the statement in the logical database account storage area 20a in the storage area 204 of logical account control block first (Step 330).

When the designated logical account control block 20 is detected, the logical database defining unit 9 checks whether there is a descriptor "USING" in the statement. When there is "USING", the logical database defining unit 9 stores the password which is described immediately after "USING" in password storage area of the logical database account storage area 20a of the logical account control block 20 which is detected at Step 330 (Step 331).

Furthermore, the logical database defining unit 9 checks whether there is a description "ADD" in the statement 31. When there is "ADD", the defining unit reserves the physical database name storage area 20c and the physical database account storage area 20d corresponding to the above storage area 20c in the logical account control block 20 which is detected at Step 330 sequentially for all the databases described in the statement 31, stores the physical database name which is described immediately after "ADD" in the physical database name storage area 20c in which an area is newly reserved, and furthermore stores the physical, database user ID and physical database password which are described behind the physical database name in the physical database account storage area 20d in which an area is newly reserved (Step 332). The logical database defining unit 9 connects the physical database name storage area 20c and physical database account storage area 20d which are newly reserved and the existing storage areas 20c and 20d with links by linking them so that the newly reserved storage areas are positioned on the last link.

Next, the logical database defining unit 9 checks whether there is a descriptor "MODIFY" in the statement 31. When there is "MODIFY", the defining unit stores the physical database user ID and physical database password which are described immediately after the physical database name in the physical database account storage area 20d corresponding to the storage area having the physical database name which is described immediately after "MODIFY" in the physical database name storage area 20c of the logical account control block 20 which is detected at Step 330 (Step 333).

Finally, the logical database defining unit 9 checks whether there is a descriptor "DROP" in the statement 31 (Step 334). When there is "DROP", the logical database defining unit 9 checks whether there is "ALL" immediately after "DROP" (Step 335). When there is "ALL", the logical database defining unit 9 disconnects and deletes all the physical database name storage areas 20c and physical database account storage areas 20d which are registered in the logical account control block 20 from the links (Step 336). When there is not "ALL", the logical database defining unit 9 disconnects and deletes the physical database name storage area 20c holding the name described immediately after "DROP" of the logical account control block 20 which is detected at Step 330 and the physical database account storage area 20d corresponding to the above storage area 20c (Step 337).

In this Embodiment 4, a designation of the physical database password in the "ADD" clause or "MODIFY" clause can be omitted. When no physical database password is described in the "ADD" clause in the inputted statement 31, the logical database defining unit 9 stores only the designated physical database user ID in a physical database account storage area 20d to be added but not the physical database password at Step 332. In this case, the physical database password storage area is left as a null value. When no physical database password is described in the "MODIFY" clause in the inputted statement 31, the logical database defining unit 9 returns the physical database password of the physical database account storage area 20d to be changed to the null value at Step 333. When the physical database password of the physical database account storage area 20d is left at the null value, the table location searching unit 7 deletes the USING clause from the CONNECT statement 46 for accessing to the physical database 1 at Step 506. Namely, the above user is logged in the physical database as a user whose password is not registered.

(7) Deletion of Logical Account

An example of a statement which is used so as to delete the logical account control block is shown as a statement 32 in FIG. 18(g). The logical account deleting statement 32 has a descriptor "REVOKE USER". This descriptor means that the word which is described immediately after it is the logical database user ID to be deleted. The logical database defining unit 9 which receives this logical account deleting statement 32 detects and deletes the logical account control block 20 which holds the logical database user ID which is described immediately after the descriptor "REVOKE USER" in the logical database account storage area 20a.

E. Effect of this Embodiment 4

As mentioned above, in this Embodiment 4, the table location searching unit 7 logs the physical database account registered for each user in the physical databases 1 constituting each logical database 4. Therefore, the account at the time of logging in can be changed also for a plurality of physical databases 1 where different accounts are registered depending on the user.

The account management method in Embodiment 3 can be applied to this Embodiment 4. In this case, the table location searching unit 7 logs the logical database account which is inputted by the user at the time of logging in the logical database 4 in the physical database 1 in which "NULL" is registered in the logical database account storage area 20d of the logical account control block 20.

Embodiment 5

In Embodiments 1 to 4, even when an account which is the same as the logical database account is registered in all physical databases 1 belonging to a certain logical database 4, it is necessary for the user to register an account which is the same as the logical database account or "NULL" in the logical database dictionary 8 as a physical database account. As a result, in a large scale distributed database environment, the account registration operation into the logical database dictionary 8 becomes complicated. Therefore, in this Embodiment 5, to make account registration into the logical database dictionary 8 unnecessary for a physical database 1 in which an account which is the same as the logical database account is registered, a fifth account management method is used.

A. Constitution of the Logical Database Dictionary

Figure 16A:
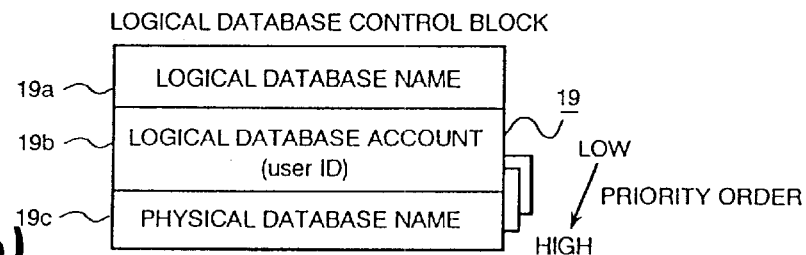
FIGS. 16(a) and 16(b) are illustrations showing the constitution of the logical database dictionary in Embodiment 5.

According to the fifth account management method, as shown in FIG. 16(*b*), the storage area 204 of logical account control block is installed in the logical database dictionary 8 and the logical account control block 20 is stored in it in the same way as with Embodiment 4. The logical database control block 19 in this Embodiment 5, as shown in FIG. 16(*a*), has a structure which is the same as that of the logical database control block 19 in Embodiment 4. In Embodiment 4, since the physical databases 1 are searched in accordance with the storage order of physical database names and physical database accounts in the logical account control block 20, the storage order is handled as a priority order. However, in this Embodiment 5, the storage order of physical database names in the logical database control block 19 is handled as a priority order.

B. Processing of the Table Location Searching Unit

Next, the processing of the table location searching unit 7 in this Embodiment 5 will be explained. The processing other than the one which is described hereunder is the same as that in Embodiment 4. The operations of the components other than the table location searching unit 7 are the same as those in Embodiment 4.

The table location searching unit 7 in this Embodiment 5 searches all the physical databases 1 which are registered in the logical database control block 19 relating to the designated logical database 4 for the table location.

At Step 506, in the same way as with Embodiment 4, the table location searching unit 7 in this Embodiment 5 refers to the physical database name storage area 20*c* and physical database account storage area 20*d* of the logical account control block 20, extracts the account of the physical database 1 for which the table location is to be searched for, and logs in it. When the name of the physical database 1 for which the table location is to be searched for is different from every name registered in the physical database name storage area 20*c* of the logical account control block 20, that is, when the account of the physical database 1 for which the table location is searched for does not exist in the logical account control block 20, the table location searching unit 7 logs the logical database account in the CONNECT statement which is designated by the application program execution means at Step 506 in the physical database 1 as it is without being replaced.

Furthermore, the table location searching unit 7 in this Embodiment 5 informs at Step 504 that the access request in processing is performed by an account (logical database account described in the CONNECT statement) which is different from every user ID registered in the logical database account storage areas 20*a* of all the logical account control blocks 20, that is, even if it is detected that the access request is an access request by a logical database user who is not registered in the logical database dictionary 8, the table location searching unit 7 does not refuse the access (namely, does not go to the processing at Step 514), goes to the processing at Step 504, and informs the application program execution means 2 of that the logging in the logical database 4 is completed normally. In this case, however, the table location searching unit 7 in this Embodiment 5 logs the logical database account in the CONNECT statement which is held in the statement buffer 6 and designated by the application program execution means 2 in all the physical databases 1 constituting the logical database 4 sequentially without being replaced at Step 506.

C. Operation Example

The operation of the automatic logging-in function using the account management method in this Embodiment 5 will be explained with reference to FIG. 17. In the example shown in FIG. 17, the definition information relating to the public logical database LDB__A and the definition information relating to the logical database users user__A and user__B are registered in the logical database dictionary 8.

The table location searching unit 7 which receives an access request 171 to the public logical database LDB__A by the logical database account user-A logs (172, 173) the physical-database accounts user-a and user-b which are registered in the logical account control block 20*e* of user-A in the physical databases DB__a and DB__b which are registered in the logical database control block 19 of LDB__A (Step 506) and searches for the table location sequentially (Step 507).

The table location searching unit 7 which receives an access request 174 to the public logical database LDB-A by the logical database account user-B logs (175) the physical database account user-d which is registered in the logical account control block 20*f* of user-B in the physical databases DB__a which is registered first in the logical database control block 19 of LDB__A (Step 506) and searches for the table location (Step 507). When the desired table cannot be detected, the table location searching unit 7 logs in (176) the physical database DB__b which is registered in the logical database control block 19 of LDB__A secondarily (Step 506) and searches for the table location (S507). In this case, the account of the physical database DB__b is not registered in the logical account control block 20 of user__B, so that the table location searching unit 7 logs in (176) the logical database account in the CONNECT statement without replacing it. Therefore, the logical database account user__B which is inputted by the user is used for this logging-in 176.

The table location searching unit 7 which receives an access request 177 to the public logical database LDB-A by the logical database account user-C logs in (178, 179) the physical databases DB__a and DB__b which are registered in the logical database control block 19 of LDB__A (Step 506) and searches for the table location sequentially (Step 507). In this case, the logical database account user__C is neither registered in the logical database account storage area 20*a* of any of the logical account control blocks 20 which are held in the storage area 204 of logical account control block. Therefore, the table location searching unit 7 logs in (178, 179) the logical database account user__C which is inputted by the user in the physical databases DB__a and DB__b without replacing the logical database account in the CONNECT statement which is held in the statement buffer 6.

D. Effect of this Embodiment 5

As mentioned above, according to this Embodiment 5, the account at the time of logging-in can be changed depending on the user for a plurality of physical databases 1 in which different accounts are registered for each user. For a physical database 1 in which an account which is the same as the physical database account which is registered in the logical account control block 20 is registered, there is no need to register the physical database name and account in the logical account control block 20. Furthermore, when the accounts of all the physical databases 1 are the same, there is no need to register theological database accounts in the logical database dictionary 8. Therefore, the registration operation into the logical database dictionary 8 can be simplified. Furthermore, leaking-out of the physical database accounts due to illegal reference to the logical database dictionary 8 can be minimized.

In Embodiment 4 or 5, when a specific symbol, for example, "ALL" is designated as a logical database name from the application program execution means 2, the table location searching unit 7 may control so as to search all the physical databases 1 which are registered in the logical account control block 20 for the table location. In this case, objects to be logged in by the table location searching unit 7 at Step 506 may be set to all the physical databases 1 which are registered in the logical account control block 20 when "ALL" is designated.

Furthermore, in Embodiment 4 or 5, even when a user accesses the physical database 1 which is designated directly by him by using an access statement in which the physical database 1 is directly designated, he can issue a CONNECT statement using the logical database account. By doing this, the user can directly designate and access one of a plurality of physical databases 1 by using an account without being aware of differences in account between the physical databases 1. The reason is that when the table location searching unit 7 in Embodiment 4 or 5 transfers a CONNECT statement having a database name which is not registered in the logical database control block (Step 515), the searching unit replaces the logical database account in the statement with the account which is registered in the logical account control block 20. It will be explained with reference to FIGS. 10 and 17.

Figure 10:
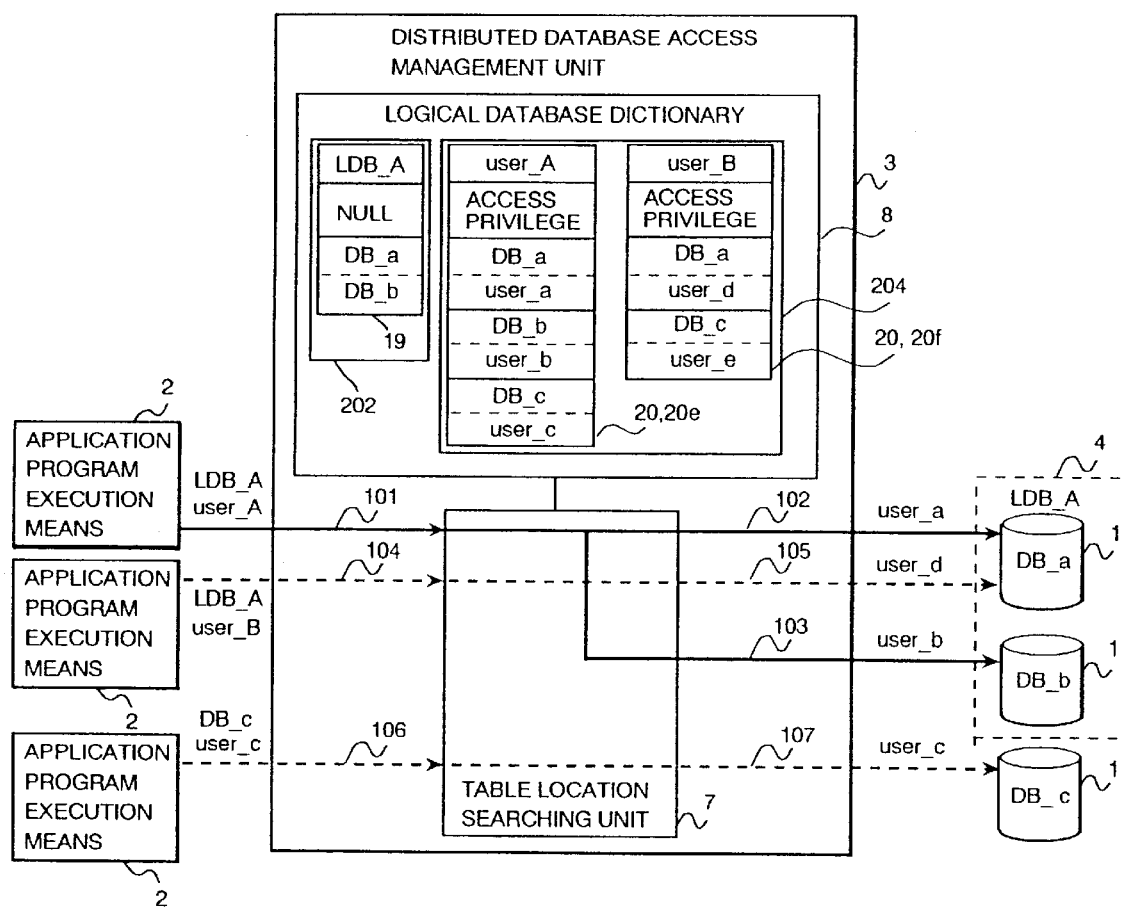
FIG. 10 is a drawing for explaining the operation in Embodiment 4.
Figure 17:
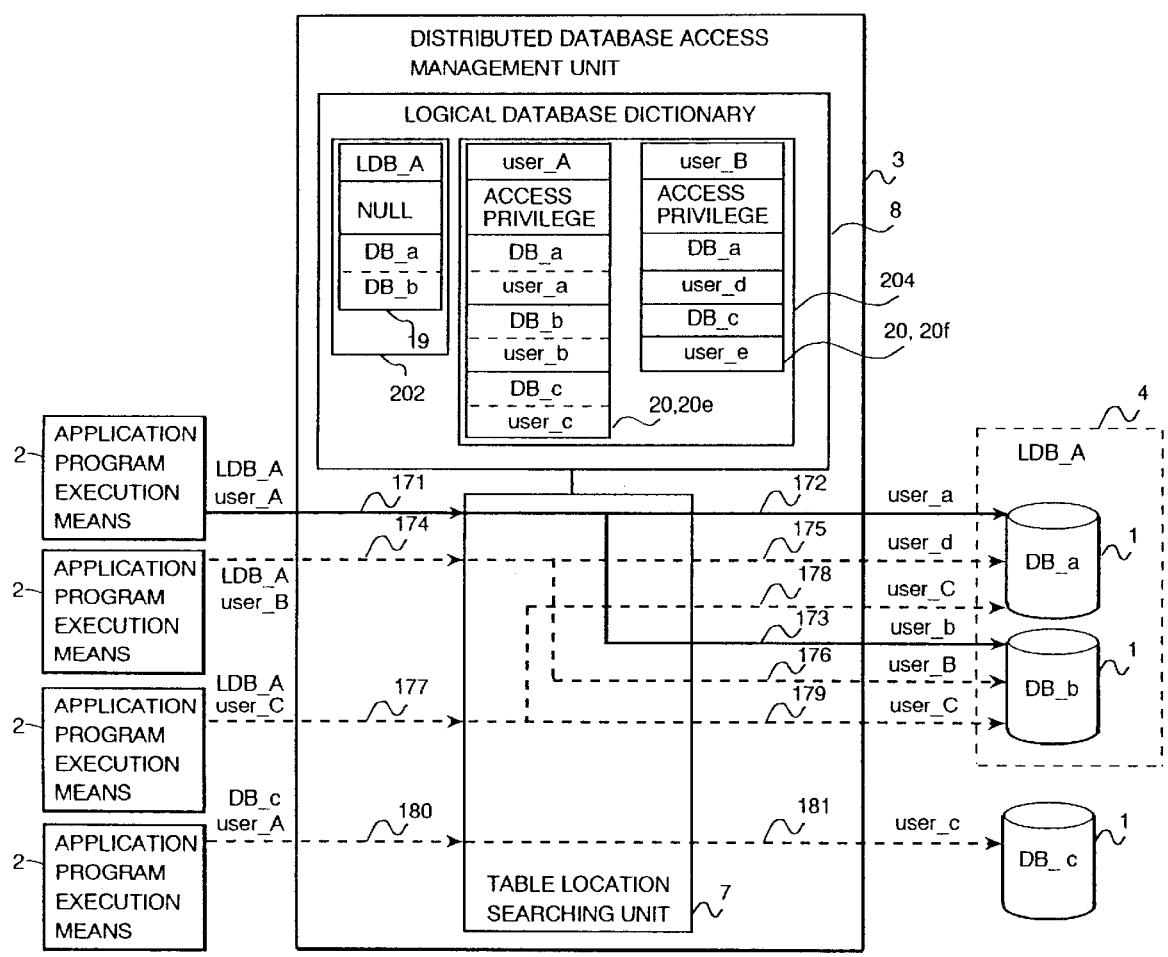
FIG. 17 is a drawing for explaining the operation of the distributed database access management unit in Embodiment 5.

In the operation example shown in FIG. 10 or 17, when the table location searching unit 7 receives a CONNECT statement 106 or 180 for requesting access to a single physical database DB_c (Step 502), the searching unit extracts the logical database account user_A in the statement and searches for logical account control blocks 20 with the same account registered at Step 515. Next, the table location searching unit 7 replaces the logical database account user_A in the CONNECT statement which is held in the statement buffer 6 with the physical database account user_c corresponding to the physical database DB_c which is registered in the logical account control block 20 and logs it in the physical database DB_c (Step 515).

Embodiment 6

In Embodiments 1 to 5 mentioned above, to automatically log in a plurality of physical databases 1, the account of each physical database 1 is stored in the logical database dictionary 8. The physical database account is an access key to the highly secret physical database information and strict secrecy protection is necessary particularly to stored physical database passwords. Therefore, the distributed database management system (distributed database access management unit 3) in this Embodiment 6 does not hold logical database passwords in the logical database dictionary 8 which is used by a plurality of users in common so as to ensure the secrecy and furthermore, encrypts the database passwords held in the logical database dictionary 8.

Figure 11:
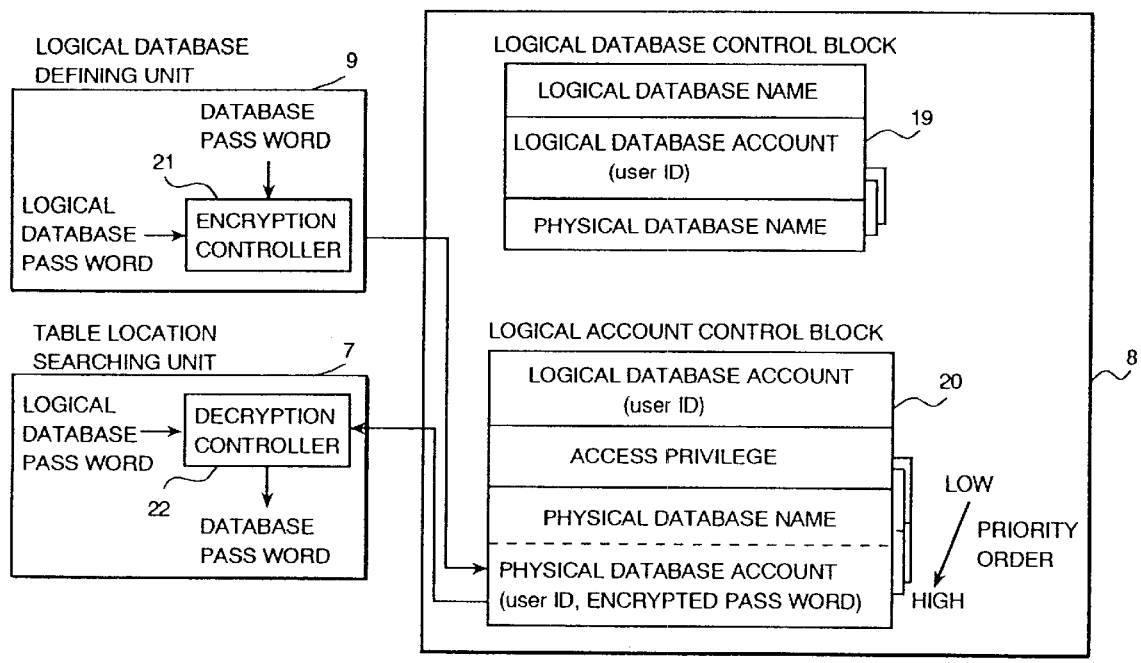
FIG. 11 is a drawing for explaining the pass word encripting function in Embodiment 6.

As shown in FIG. 11, the logical database defining unit 9 in this Embodiment 6 has an encrypting controller 21 for encrypting the password information included in each physical database account in addition to the constitution in Embodiment 5. Furthermore, the table location searching unit 7 in this Embodiment 6 has a decrypting controller 22 for decrypting the encrypted passwords in addition to the constitution in Embodiment 5. The encrypting controller 21 and the decrypting controller 22 encrypts and decrypts data respectively according to the predetermined algorithms thereof on the basis of the given key data. Any method which can ensure secrecy and encrypt or decrypt data uniquely may be used as an encrypting or decrypting method. In this Embodiment 6, the logical database password which is designated by the application program execution means 2 is used as a key so as to encrypt or decrypt physical database.

Furthermore, in the logical database account storage area 20a of the logical account control block 20 in this Embodiment 6, only logical database user IDs are held and logical database passwords are not stored.

The operations of the components other than the table location searching unit 7 and the database defining unit 9 and the constitution of the database dictionary 8 other than the logical database account storage area 20a of the logical account control block 20 are the same as those in Embodiment 5. The processing at the steps other than the steps of the table location searching unit 7 and the database defining unit 9 which are explained here is the same as that in Embodiment 5.

A. Processing of the logical Database Defining Unit 9

(1) Registration of Logical Account

The logical database defining unit 9 in this Embodiment 6 which receives the logical account registering statement 30 creates a logical account control block 20 newly in the storage area 204 of logical account control block and stores the user ID which is described immediately after "GRANT USER" in the statement in the logical database account storage area 20a of the created logical account control block 20. The defining unit does not store the password which is described immediately after "USING".

(2) Changing of Logical Account

In the changing processing of the logical account control block 20 which is instructed by the logical account changing statement 31, the logical database defining unit 9 encrypts the designated physical database password using the logical database password which is described immediately after "USING" in the CONNECT statement and stores it in the physical database account storage area 20d. Except encryption of physical database passwords, the logical account changing processing in this Embodiment 6 is the same as that in Embodiment 5.

Therefore, the logical database defining unit 9 in this Embodiment 6 allow the encrypting controller 21 to encrypt the password included in the physical database account at Step 331, 332, or 333 and stores the password after the encryption processing in the password storage area of the physical database account storage area 20d. In this Embodiment 6, the password in the logical database account may not be designated always. When no logical database password is designated (namely, when no "USING" clause is described in the CONNECT statement), the initial value (default value) which is decided beforehand is used for encryption as a key.

B. Processing of the Table Location Searching Unit 7

When the table location searching unit 7 in this Embodiment 6 confirms the logical database account at Step 504, the searching unit decrypts the password included in the account which is held in the physical database account storage area 20d at the top by the decrypting controller 22 using the logical database password which is designated in the CONNECT statement as a key.

When the decrypting controller 22 succeeds in decryption of the password, it informs the table location searching unit 7 of the decrypted password The table location searching unit 7 which receives this notification judges that the inputted logical database password is legal (Step 504) and uses the physical database user ID which is held in the physical database account storage area 20d and the password which is decrypted at Step 504 mentioned above so as to rewrite the CONNECT statement held in the statement buffer from the logical database account to the physical database account at Step 506.

When the decrypting controller 22 fails in decryption of the password, it informs the table location searching unit 7 of impossible decryption. The table location searching unit 7 which receives this notification judges, at Step 504 that the inputted logical database password is incorrect, goes to the processing at Step 514, and refuses access to the logical database 4.

At Step 515, the table location searching unit 7 uses the physical database user ID which is held in the physical database account storage area 20d and the password which is decrypted at Step 504 mentioned above so as to rewrite the CONNECT statement held in the statement buffer from the logical database account to the physical database account.

C. Effect of this Embodiment 6

As mentioned above, the security function in this Embodiment 6 encrypts all physical database accounts to be stored in the logical database dictionary 8 using the logical database password which is inputted by the user as a key.

The logical database password which is an encrypting key varies with each logical account control block 20 and is not stored in the logical database dictionary 8. The reason is that only logical database user IDs are stored in the logical database account storage area 20a of the logical account control block 20.

Therefore, users other than those who know the logical database password beforehand cannot decrypt the pass word which is stored in the physical database account 20d of the logical account control block 20 even if they are well aware of the encrypting algorithm.

In Embodiment 1, a plurality of logical database accounts can be registered for a defined logical database 4, so that the security function in this Embodiment 6 cannot be applied as it is. However, if the number of logical database accounts which can be registered is limited to 1, the security function in this Embodiment 6 can be applied.

There is an encrypting algorithm which cannot recognize whether encrypted data is correctly decrypted though it is done, that is, whether the encrypting key is correct. When such an encrypting algorithm is used, the password is stored in the logical database account storage area 20a of the logical account control block 20 in addition to the user ID. However, the logical database password is encrypted and stored. It is desirable to use an algorithm which cannot decrypt data for encryption of the logical database password. If this way is used, it is desirable that the encrypting controller 21 has two kinds of algorithms such as encryption using a key and encryption which is undecryptable. Furthermore, if this way is used, when the table location searching unit 7 confirms the logical database account at Step 504, the searching unit passes the logical database pass word which is designated in the CONNECT statement to the encrypting controller 21, requests encryption which is undecryptable, and then compares the encrypted logical database password with the password which password wich is stored in the logical database account storage area 20a. When the password matches with the stored one, the table location searching unit 7 judges that the logical database password described in the CONNECT statement is legal (Step 504) and requests the decrypting controller 22 decryption of the physical database password using the pass word as a key.

Embodiment 7

Figure 16B:
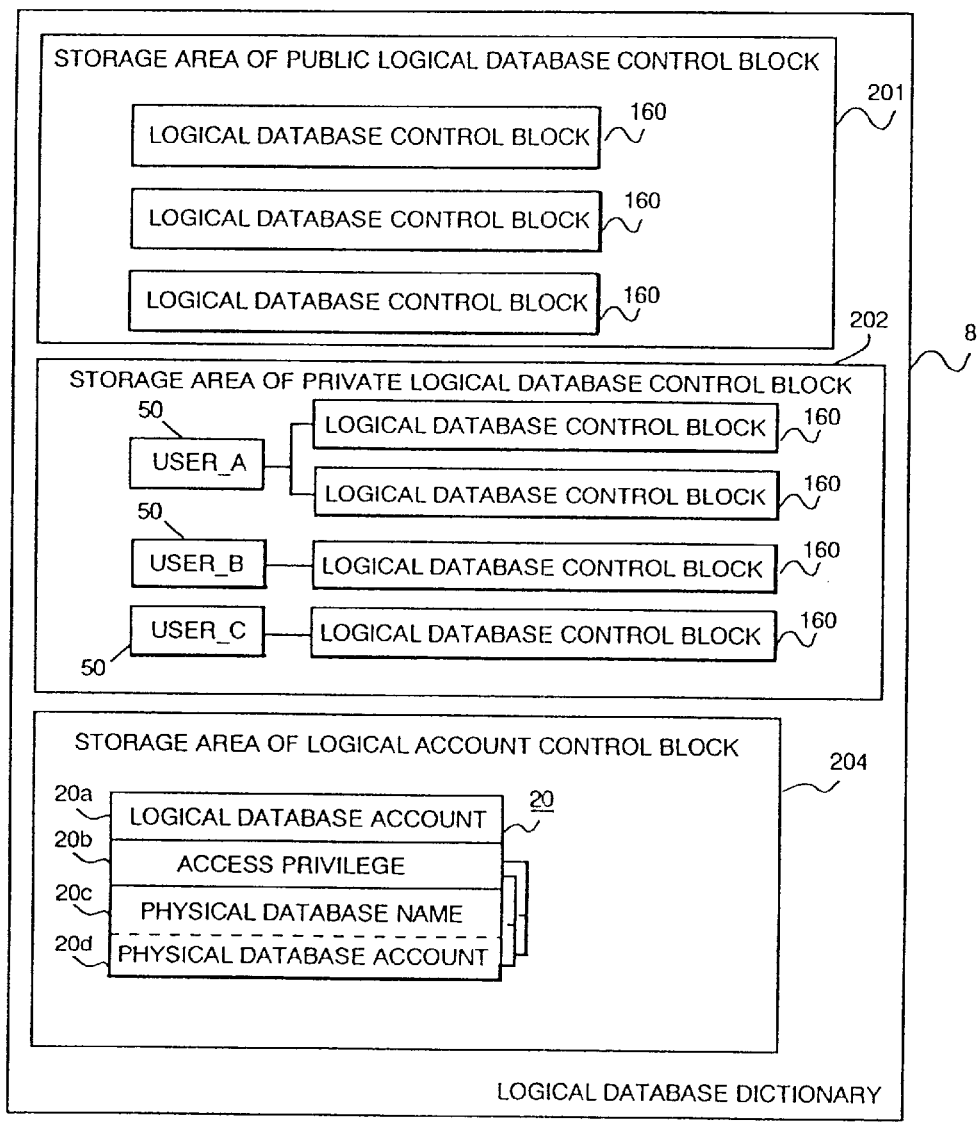

In the aforementioned Embodiments 1 to 6, the account information to be used for logging in the physical database 1 constituting the logical database 4 is stored in the logical database dictionary 8 of the distributed database access management unit 3. However, in this Embodiment 7, the account information is stored in the information processor (client 39) which executes the application program execution means 2. In this Embodiment 7, the storage area 204 of logical account control block of the logical database dictionary 8 shown in FIG. 16(b) is installed in the information processor (client 39) which is used by each user and the logical access control block 20 is held in it. It is possible to install logical account control blocks 20 of a plurality of users in an information processor 39.

The application program execution means 2 in this Embodiment 7 receives a database connection request from a user, refers to the logical account control block 20 corresponding to the inputted account, checks the logical database account and access privilege, and informs the distributed database access management unit 3 of the names and accounts of all the registered physical databases 1. The table location searching unit 7 of the distributed database access management unit 3 stores the information which is informed of from the application program execution means 2 temporarily in the logical database dictionary 8. Next, the table location searching unit 7 extracts the account of the target physical database 1 from the stored information and logs it in the physical database 1 constituting the logical database 4 which is registered in the logical database control block 19.

In this Embodiment 7, the account management method which is used in one of Embodiments 1 to 4 can be used. A case that the account management method in Embodiment 5 is used will be explained hereunder.

A. Processing of the Application Program Execution Means

When the application program execution means 2 in Embodiment 7 issues a database connection request, the execution means searches the logical account control block 20 (held in the external storage unit of the client 39) which holds the designated logical database account in the logical database account storage area 20a.

When the desired block 20 exists in the storage area 204 of logical account control block, as mentioned above, the application program execution means 2 informs the distributed database access management unit 3 of the access privilege kind held in the access privilege storage area 20b, all the physical database names (held in the physical database name storage area 20c) stored in the block 20, and the physical database accounts (held in the physical database account storage area 20d) together with the connection request to the logical database 4.

On the other hand, when the desired block 20 does not exist, the application program execution means 2 issues only a connection request to the logical database 4 to the distributed database access management unit 3 but does not inform of the physical database name and account belonging to the logical database which requests connection.

B. Processing of the Table Location Searching Unit

When the account information (access privilege, physical database name, physical database account) is informed of from the application program execution means 2, the table location searching unit 7 of the distributed database access management unit 3 which receives the connection request to the logical database 4 via the logical database access controller uses the access privilege kind information included in the above information for checking of the access privilege at Step 503. When the account information is not informed, in the same way as with Embodiment 5, the table location searching unit 7 searches the logical account control block storage area 20 which holds the logical database user ID designated in the CONNECT statement in the logical database account storage area 20a in the logical database dictionary 8 and uses the contents of the access privilege storage area 20b in this area 20.

If the account information of each physical database 1 is informed of from the application program execution means 2 when the table location searching unit 7 in this Embodiment 7 rewrites the access object and account information in the CONNECT statement which are held in the statement buffer 6 at Step 515, the searching unit rewrites the account information. If the account information is not informed of, in the same way as with Embodiment 5, the table location searching unit 7 searches the logical account control block storage area 20 which holds the logical database user ID designated in the CONNECT statement in the logical database account storage area 20a in the logical database dictionary 8 and rewrites the account information by using the contents of the access privilege storage area 20b in this area 20.

C. Effect of this Embodiment 7

As mentioned above, according to this Embodiment 7, the account information to each physical database 1 which is used so as to access the logical database can be held in the external storage unit such as a hard disk or floppy disk (flexible disk) connected to the information processor to be used by a user. By doing this, the account information is not held in a device which is shared by many users, so that the physical database account information can be prevented effectively from leaking out. When all account information is held in the logical database control block 13 like Embodiment 1, the account information held in the external storage unit of the client 39 cannot be automatically logged in like this Embodiment 7. However, in Embodiment 4 or 5, even when a specific physical database 1 is accessed without using the logical database access function (for example, Step 515 (shown in FIG. 5) or Step 1909 (shown in FIG. 19) which will be described later), the account information held in the external storage unit of the client 39 may be logged in.

Embodiment 8

Next, an embodiment using the second method for automatically logging in a physical database 1 constituting a logical database 4 will be explained.

In Embodiments 1 to 7 mentioned above, the table location searching unit 7 logs in each physical database 1 constituting the logical database 4 (Step 506), transfers the table access statement (Step 507), and judges the access result from each physical database 1 so as to decide the table location. In this case, the table location searching unit 7 logs out from each physical database 1 where no table to be accessed exists (Step 509).

However, when a table to which access is requested by a table access statement sent from the application program execution means 2 next exists in the physical database 1 which is logged out because the table requested at Step 509 does not exist, an access request may be issued to the physical database 1 after it is logged out already at Step 509.

Therefore, in this Embodiment 8, a means for processing physical databases 1 where no table to be accessed exists continuously in the logged-in state and for logging out from all the logged-in physical databases 1 when a DISCONNECT statement instructing logging-out from the logical database 4 is received from the application program execution means 2 is provided.

Namely, the table location searching unit 7 in this Embodiment 8 performs two kinds of automatic log-in processing such as processing (automatic log-in processing in the strict mode) for logging in all the physical databases 1 constituting the physical database 4 at the time of logging in the logical database 4 and processing (automatic log-in processing in the loose mode) for logging in the physical databases 1 for each table location searching processing according to the predetermined connection mode. In this Embodiment 8, the distributed database access management unit 3 has a configuration file (not shown in the drawing) and the configuration file in this Embodiment 8 has a connection mode information storage area for defining the connection mode. In this Embodiment 8, a symbol for indicating the connection mode is stored in this connection mode information storage area beforehand.

Next, the processing of the table location searching unit 7 in this Embodiment 8 will be explained. The constitution of the distributed database access management unit 3 in this Embodiment 8 is the same as that in Embodiment 5 and the flow of processing of each component is the same as that in Embodiment 5 except the processing of the table location searching unit 7 which will be explained hereunder.

A. Processing of the Table Location Searching Unit

Figure 19:
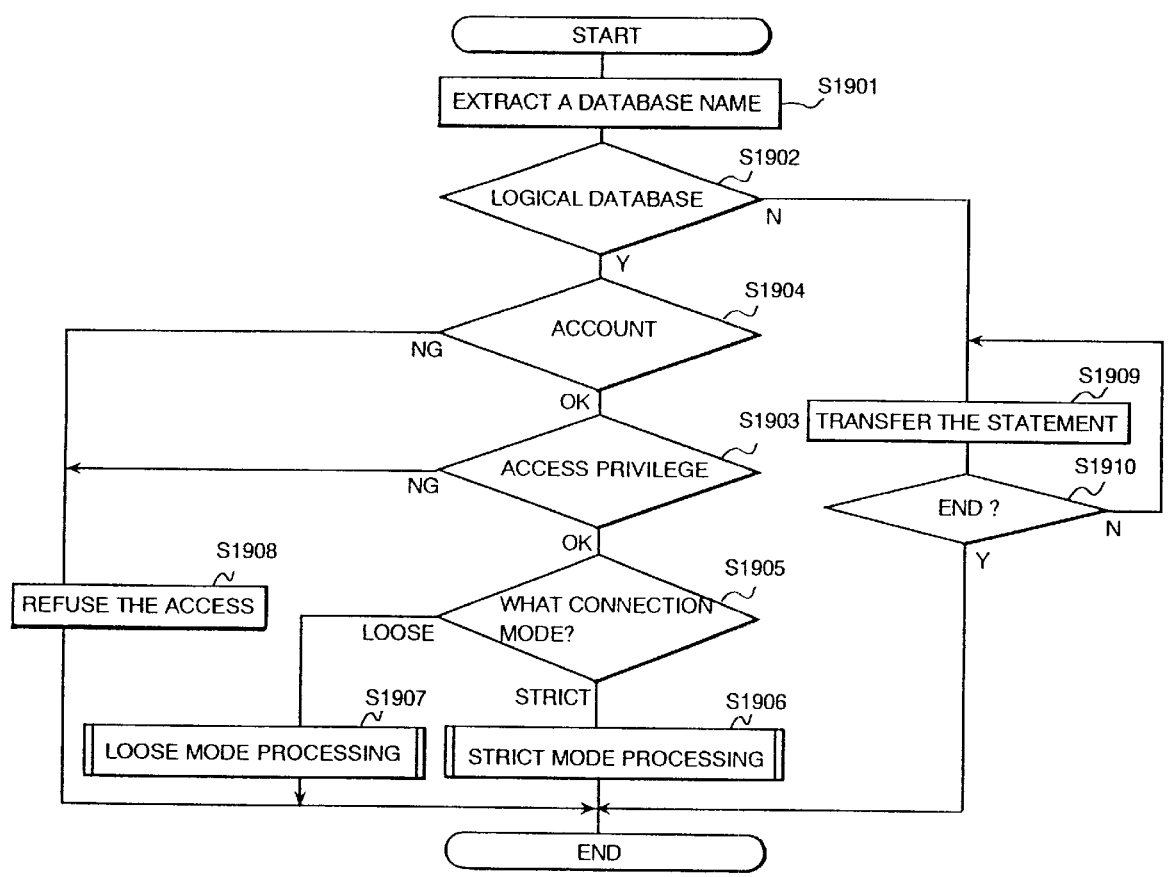
FIG. 19 is a flow chart showing the procedure of the whole automatic logging-in processing of the table location searching unit in Embodiment 8.

The processing procedure of the table location searching unit 7 in Embodiment 8 is shown in FIG. 19.

The processing at Steps 1901 to 1904 is the same as that at Steps 501 to 504 in Embodiment 5. The processing at Steps 1908 to 1910 is the same as that at Steps 514 to 516 in Embodiment 5. Namely, the table location searching unit 7 in this Embodiment 8 extracts the logical database name from the CONNECT statement stored in the statement buffer 6 first (Step 1901) and searches the logical database control block 19 to be processed (Step 1902). When the desired logical database control block 19 is detected, the table location searching unit 7 goes to the processing at Step 1903. When the desired logical database control block 19 is not detected, the table location searching unit 7 transfers all the statements to the physical databases 1 as they are (Step 1909) until the searching unit receives a DISCONNECT statement (Step 1910).

When the logical database control block 19 to be processed is detected, the table location searching unit 7 extracts the logical database account from the CONNECT statement and detects the logical account control block 20 which holds this account in the logical database account storage area 20a (Step 1904). When the logical account control block 20 cannot be detected, the table location searching unit 7 informs the application program execution means 2 of refusal of access (Step 1908) and ends the processing. Or, as explained in Embodiment 5, when the logical account control block 20 cannot be detected, the table location searching unit 7 may log the logical database account described in the CONNECT statement in all the physical databases 1 constituting the logical database 4 as it is without being rewritten.

When the logical account control block 20 is detected, the table location searching unit 7 checks whether permission of use of the logical database 4 is given to the OS user who requests database access with reference to the access privilege storage area 20b of the logical account control block 20 which is detected at Step 1904 (Step 1903).

When the access privilege is confirmed, the table location searching unit 7 in this Embodiment 8 refers to the connection mode information storage area of the configuration file. When the connection mode is the "strict mode", the table location searching unit 7 goes to the processing at Step 1906 and executes the automatic log-in processing in the strict mode. When the connection mode is the "loose mode", the table location searching unit 7 goes to the processing at Step 1907 and executes the automatic log-in processing in the loose mode.

(1) Automatic Log-in Processing in the Strict Mode (Step 1906)

Figure 20:
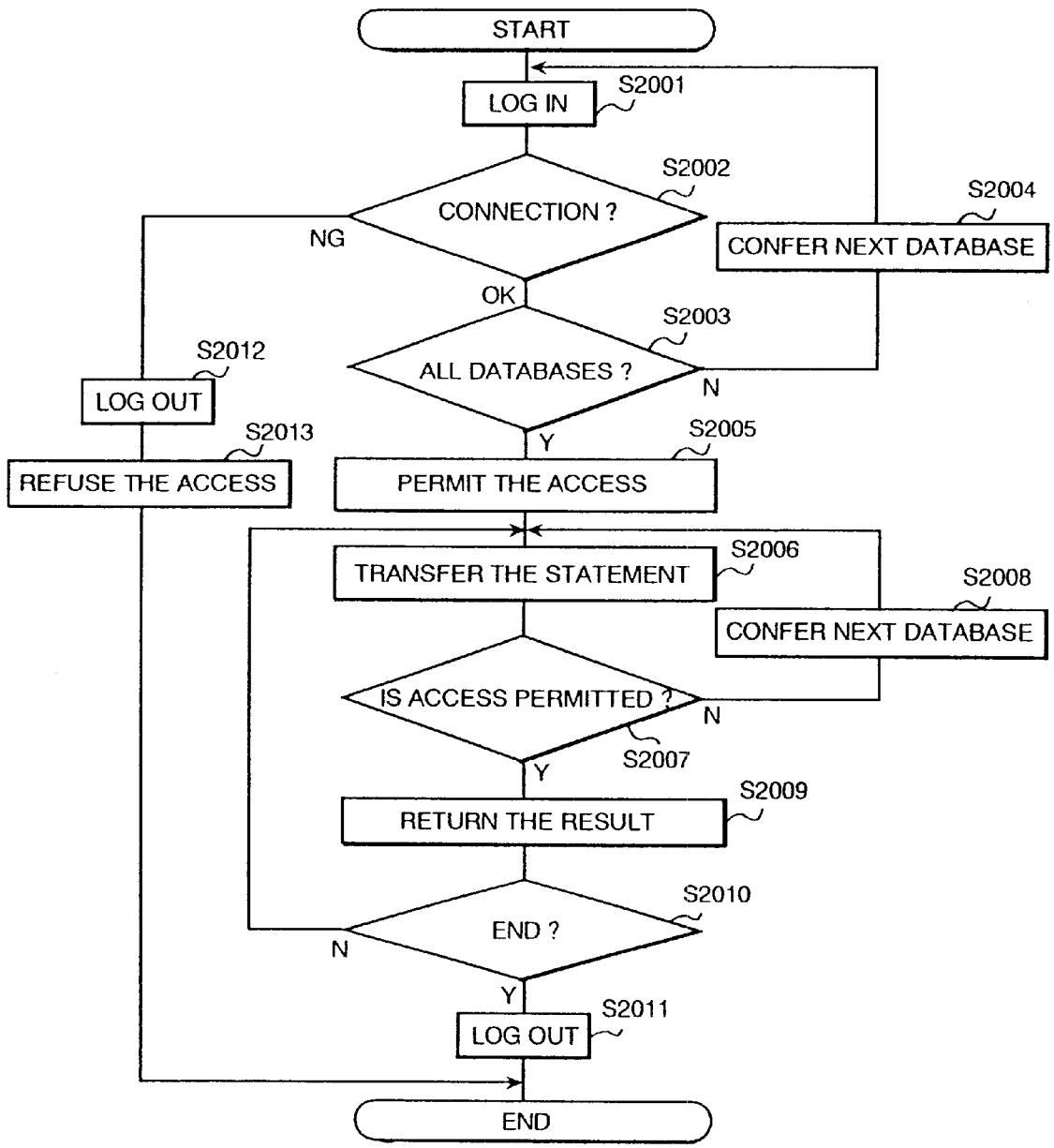
FIG. 20 is a flow chart showing the procedure of the automatic logging-in processing of the table location searching unit in the strict mode in Embodiment 8.

The strict mode process is processing for logging in all the databases 1 constituting the logical database 4 at the time of logging in the logical database 4. FIG. 20 shows the processing procedure.

In the automatic log-in processing in the strict mode (Step 1906), the table location searching unit 7 tries to log the physical database account stored in the logical database dictionary 8 in all the physical databases 1 constituting the logical database 4 beforehand (Steps 2001 to 2004).

When the log-in processing for all the physical databases 1 is performed normally, the table location searching unit 7 informs the application program execution means 2 of reception of logging-in for the logical database 4 (Step 2005) and executes the table location searching processing of the table access statement which is received from the application program execution means 2 next (Steps 2006 to 2010). The processing at Steps 2006, 2007, 2008, 2009, and 2010 is the same as that at Steps 507, 508, 510, 511, and 512 in Embodiment 5 respectively. However, unlike Embodiment 5, even if the table location searching unit 7 in this Embodiment 8 judges refusal of access at Step 2007 (namely, even if the table to which access is designated does not exist in the physical database 1 to be accessed), the searching unit does not execute the log-out processing (Step 509). The table location searching unit 7 in this Embodiment 8 selects the physical database 1 which is registered next as a processing object at Step 2008, does not perform the log-in processing (Step 506), and executes the statement transfer processing (Step 2006).

When the table location searching unit 7 ends the processing for all the table access statements and receives the DISCONNECT statement at Step 2010, the searching unit logs out from all the physical databases 1 which are being logged in (Step 2011) and ends the processing.

On the other hand, when the table location searching unit 7 detects that logging in one of the physical databases 1 constituting the logical database 4 fails, the searching unit logs out from all the physical databases 1 which are being logged in (Step 2012) and informs the application program execution means 2 of refusal of logging in the logical database 4 (Step 2013) and ends the processing.

In the log-in processing in Embodiment 5 (Step 506), the log-in processing in the strict mode in this Embodiment 8 (Step 2001), and the log-out processing in Embodiment 5 (Steps 509 and 513), a physical database 1 is selected as a processing object for one processing. However, in the log-out processing in the strict mode in this Embodiment 8 (Steps 2011 and 2012), all the physical databases 1 belonging to the logical database 4 to be processed are logged out.

Next, a sequence example of information which is exchanged between the application program execution means 2, the distributed database access management unit 3, and the physical-databases 1 in the automatic log-in processing (Step 1906) in the strict mode will be explained with reference to FIG. 21.

Figure 21:
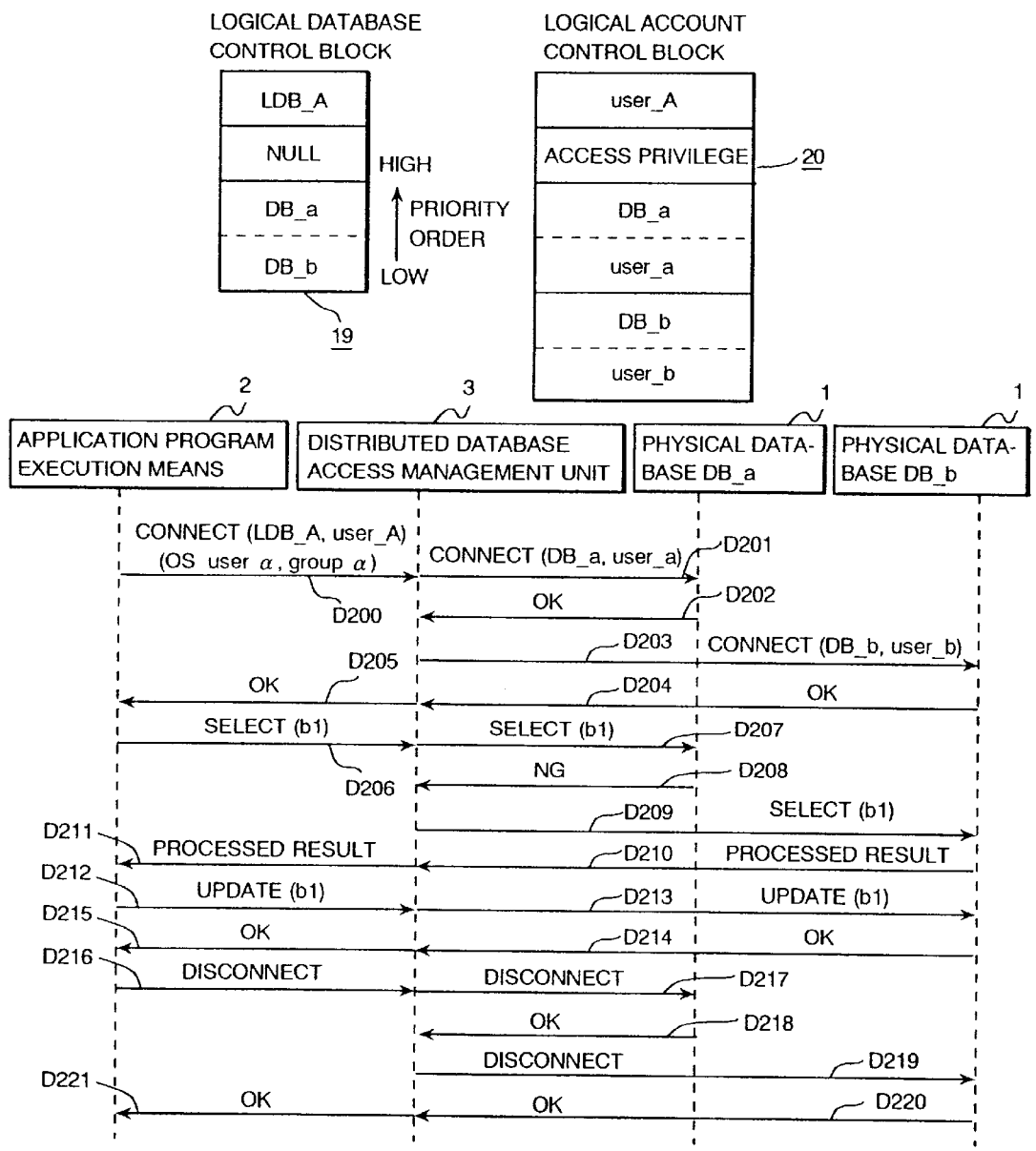
FIG. 21 is a drawing showing the sequence of the information which is exchanged by the table location searching unit by the automatic logging-in processing in the strict mode in Embodiment 8.

In the example shown in FIG. 21, the logical database control block 19 which holds the logical database name LDB_A in the logical database name storage area 19a is held in the storage area 201 of public logical database control block. NULL is stored in the logical database account storage area 19b of the logical database control block 19 and the names of physical databases DB_a and DB_b are stored in the physical database name storage area 19c. The link connection order in the physical database name storage area 19c is DB_a and DB_b.

In the storage area 204 of logical account control block, the logical account control block 20 which holds user_A in the logical database account storage area 20a is held. In the physical database name storage area 20c of the logical account control block 20, the physical databases DB_a and DB_b are stored. In the physical database account storage area 20d, user_a is stored as a physical database account of DB_a and user_b is stored as a physical database account of DB_b. As shown in FIG. 1, the physical database DB_a has tables a1 and a2 and the physical database DB_b has tables b1 and b2.

Firstly, the table location searching unit 7 of the distributed database access management unit 3 is informed of a CONNECT statement (CONNECT (LDB_A, user_A)) for the logical database LDB_A from the application program execution means 2 (D200). Then, the table location searching unit 7 searches and detects the logical account control block 20 in which the logical database account is user_A (Step 1904). Next, the table location searching unit 7 confirms the access privilege for the OS user (user ID: user1, group ID: group1) who issues this CONNECT statement (Step 1903).

Next, the table location searching unit 7 creates a CONNECT statement (CONNECT (DB_a, user_a)) for logging in using the physical database account user_a in the highest priority physical database DB_a among the physical databases 1 included in the logical database LDB_A and logs it in DB_a (Step 2001, D201). When the table location searching unit 7 receives a response (D202) of success of logging-in from DB_a, the searching unit creates a CONNECT statement (CONNECT (DB_b, user_b)) for logging in using the physical database account user_b in the physical database DB_b assigned the second-highest priority and logs it in DB_b (Step 2001, D203).

When the table location searching unit 7 receives a response (D204) of success of logging-in from the physical database management system 270 for managing DB_b, the searching unit issues a notification of permission of access to the application program execution means 2 (Step 2005, D205). Upon receipt of it, the application program execution means 2 issues a table access statement (SELECT statement (SELECT (b1)) for the table b1 in the example shown in FIG. 21) to the table location searching unit 7 (D206). The table location searching unit 7 which receives the table access statement issues it to the physical database DB_a (Step 2006, D207). However, the physical database DB_a in which the table b1 is not stored returns information (D208) indicating refusal of access for the SELECT statement. Therefore, the table location searching unit 7 issues a SELECT statement (SELECT (b1)) to the physical database DB_b assigned the second-highest priority (Step 2006, D209). The physical database management system for managing the physical database DB_b searches for the stored table b1 and returns the processing result (D210) according to this SELECT statement. The table location searching unit 7 which receives it informs the application program execution means 2 of the response (D211). From this response, the table location searching unit 7 recognizes the physical database DB_b as a physical database 1 where the table b1 is stored and issues the access statement (UPDATE statement (UPDATE (b1) for updating the table b1 in the example shown in FIG. 21)) (D212) which is received from the application program execution means 2 thereafter to the physical database DB_b (D213). The response (D214) of the physical database management system for managing the physical database DB_b to it is informed of the application program execution means 2 (D215).

When the table location searching unit 7 receives an issue (D216) of a DISCONNECT statement for instructing cutting of the connection with the logical database 4 from the application program execution means 2, the searching unit issues the DISCONNECT statement to the physical database DB_a (D217), and furthermore, when the searching unit confirms the cutting of connection (D218), the searching unit issues the DISCONNECT statement to the physical database DB_b (D219), and when the searching unit confirms the cutting of connection by it (D220), the searching unit informs the application program execution means 2 of it (D221).

(2) Automatic Log-in Processing in the Loose Mode (Step 1907)

Figure 22:
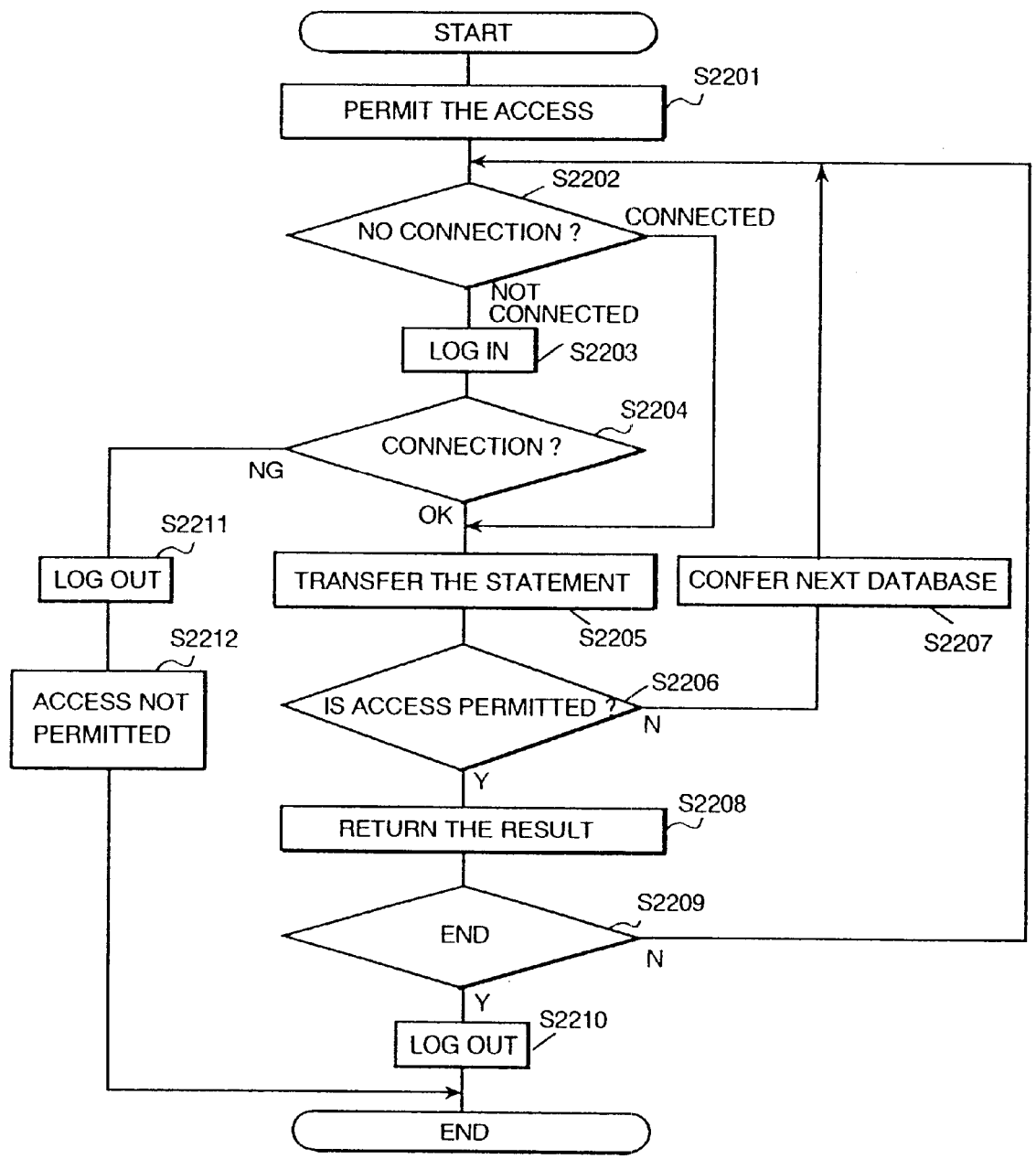
FIG. 22 is a flow chart showing the procedure of the automatic logging-in processing of the table location searching unit in the loose mode in Embodiment 8.

The loose mode process is processing for logging in the physical databases 1 at the time of table location searching. FIG. 22 shows the processing procedure.

In the automatic log-in processing (Step 1907) in the loose mode, the table location searching unit 7 in this Embodiment 8 informs the application program execution means 2 of reception of logging-in the logical database 4 first (Step 2201). Next, the table location searching unit 7 receives a table access statement from the application program execution means 2 and confirms whether the physical database 1 is connected already (Step 2202). When the physical database 1 is not connected, the table location searching unit 7 logs the physical database account which is held in the physical database account storage area 20d of the logical account control block 20 in a higher-priority physical database 1 (DB_a in FIG. 23 which will be described later) (Step 2203). When the connection succeeds (Step 2204), the table location searching unit 7 issues the received table access statement (Step 2205).

When the connection is confirmed at Step 2202, the table location searching unit 7 goes to the processing at Step 2205 directly and issues the table access statement. By doing this, the log-in processing for the physical database 1 which is logged in already at Step 2203 can be omitted.

When the connection fails at Step 2203, the table location searching unit 7 logs out from all the physical databases 1 which are being logged in (Step 2211), informs the application program execution means 2 of failure in access to the table (Step 2212), and ends the processing.

When the table location searching unit 7 receives information indicating refusal of access from the physical database 1 as a result of statement transfer at Step 2205 (Step 2206), the searching unit selects the physical database 1 assigned the second-highest priority as a processing object (DB_b in FIG. 23 which will be described later) (Step 2207) and returns to the processing at Step 2202.

The table location searching unit 7 executes the aforementioned table location searching processing for all the table access statements. When the table location searching unit 7 receives the DISCONNECT statement at Step 2209, the searching unit logs out from all the physical databases 1 which are being logged in (Step 2210) and ends the processing.

A physical database 1 is selected as a processing object for one log-in processing (Step 2201) in the loose mode. However, in the log-out processing (Steps 2210 and 2211), all the physical databases 1 belonging to the logical database 4 to be processed are logged out.

Figure 23:
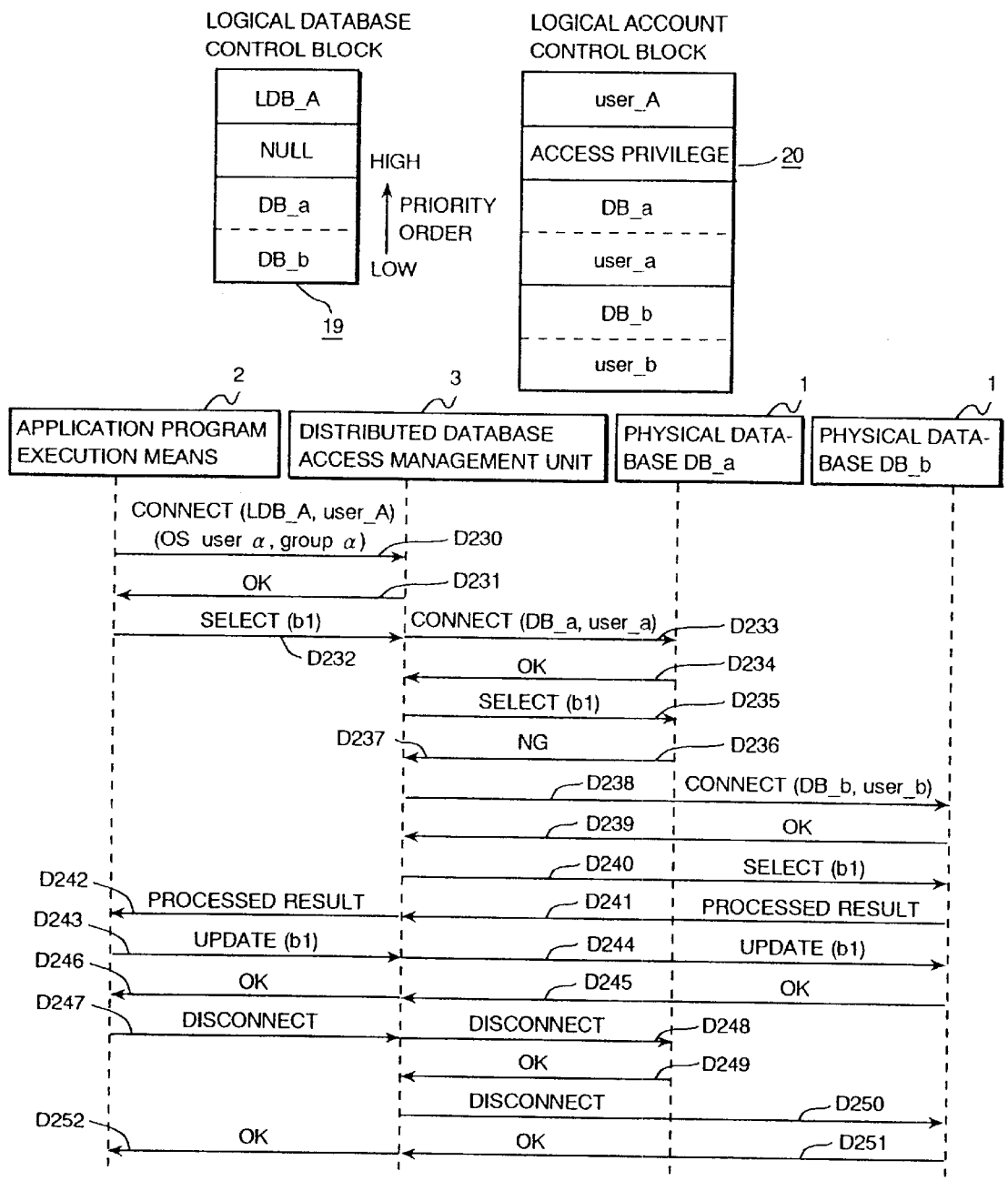
FIG. 23 is a drawing showing the sequence of the information which is exchanged by the table location searching unit by the automatic logging-in processing in the loose mode in Embodiment 8.

Next, a sequence example of information which is exchanged between the application program execution means 2, the distributed database access management unit 3, and the physical databases 1 in the automatic log-in processing (Step 1906) in the loose mode will be explained with reference to FIG. 23. The logical database dictionary 8 in the example shown in FIG. 23 is the same as that in the example shown in FIG. 21.

The table location searching unit 7 of the distributed database access management unit 3 which is informed (D230) of the CONNECT statement (CONNECT (LDB_A, user_A) for the logical database LDB_A from the application program execution means 2 executes the processing at Steps 1901 to 1905 in the same way as with the automatic log-in processing in the strict mode shown in FIG. 21. Thereafter, the table location searching unit 7 informs the application program execution means 2 of permission of access (Step 2201, D231). The application program execution means 2 which receives it issues a table access statement (SELECT statement (SELECT (b1) for the table b1 in the example shown in FIG. 23) to the table location searching unit 7 (D232).

The table location searching unit 7 which receives the table access statement confirms that the highest priority physical database DB_a among the physical databases 1 included in the logical database LDB_A is not connected (S2202), creates a CONNECT statement (CONNECT (DB_a, user_a) for logging in using the physical database account user_a in DB_a, and logs it in DB_a (Step 2203, D233). When the table location searching unit 7 receives a response (D234) of success in logging-in from DB_a (Step 2204), the searching unit issues the table access statement of D232 to the physical database DB_a (Step 2205, D235). However, the physical database DB_a where the table b1 is not stored returns information (D236) indicating refusal of access for this SELECT statement. Therefore, the table location searching unit 7 confirms that the physical database assigned the second-highest priority DB_b is not connected (Step 2202), creates a CONNECT statement (CONNECT (DB_b, user_b)) for logging in using the physical database account user_b in the physical database DB_b, and logs it in DB_b (Step 2203, D238).

When the table location searching unit 7 receives a response (D239) of success in logging-in from DB_b, the searching unit issues a SELECT (SELECT (b1)) which is a table access statement of D232 to the physical database DB_b (Step 2205, D240). The physical database management system for managing the physical database DB_b searches for the stored table b1 and returns the processing result (D241) according to this SELECT statement. The table location searching unit 7 which receives it informs the application program execution means 2 of the response (D242). When the application program execution means 2 which receives this response issues a table access statement (UPDATE statement (UPDATE (b1) for updating the table b1 in the example shown in FIG. 23) (D243), the table location searching unit 7 issues it to the physical database DB_b (D244). The response (D245) of the physical database management system for managing the physical database DB_b to it is informed of the application program execution means 2 (D246).

When the table location searching unit 7 receives the DISCONNECT statement (D247) of the application program execution means 2, the searching unit issues the DISCONNECT statement to the higher-priority physical database DB_a first (D248). When the table location searching unit 7 confirms cutting of the connection (D249) by this, the searching unit issues the DISCONNECT statement to the physical database DB_b (D250). When the table location searching unit 7 confirms cutting of the connection (D251) by this, the searching unit informs the application program execution means 2 of it (D252).

B. Effect of this Embodiment 8

In Embodiments 1 to 7 mentioned above, when an incorrect physical database account is registered in the logical database control block 13 or 17 or the logical account control block 20, the automatic log-in processing by the table location searching unit 7 fails due to connection refusal of the physical database 1. Even when an incorrect physical database name is registered in the logical database dictionary 8 or the physical database 1 is not in operation, the automatic log-in processing fails. In Embodiments 1 to 7 mentioned above, the table location searching unit 7 logs in or out for each execution of each table access statement. Therefore, when access to a physical database 1 which is not in operation when a series of processing including a plurality of table access statements is in execution or in which the registered account information is incorrect is made, the processing is stopped due to a failure in the log-in processing during the processing.

On the other hand, in the automatic log-in processing in the strict mode in this Embodiment 8, when a notification of access permission (Step 2005) is issued from the distributed database access management unit 3, various information of all the physical databases 1 belonging to the designated logical database 4 which is registered in the dictionary 8 is not incorrect and there are not physical databases 1 which are not operated and the log-in processing succeeds. The reason is that since the statement transfer processing is executed after connection is reserved for all the physical databases 1 belonging to the logical database 4 which requests access, when there is a physical database 1 which cannot be accessed or operated because only one account information is incorrect, it is informed of the application program execution means 2 before the statement transfer processing is executed. Therefore, in the strict mode in this Embodiment 8, when a series of processing including a plurality of table access statements to a plurality of physical databases 1 belonging to the same logical database 4 is in execution, no error will occur due to a failure in the log-in processing.

In the automatic log-in processing in the loose mode, only a physical database 1 which is necessary for searching the table location is logged in and the log-in processing is not executed for a physical database 1 assigned a priority lower than that of the physical database 1 which is decided as a table location. Therefore, the overhead is small compared with the automatic log-in processing in the strict mode. In this loose mode, a user knows incorrect information registered in the logical database dictionary 8 or the nonoperation status of a physical database 1 by return of the result of the table access statement.

When the table location searching unit 7 in this Embodiment 8 fails in connection to one of the physical databases 1 at Step 2204 during execution of the automatic log-in processing in the loose mode, the searching unit stops the processing (Steps 2211, 2212). However, for example, even when there is a physical database 1 among the physical databases 1 constituting the logical database 4 which is not operated, there is a user need for continuing the table location searching by ignoring it. To deal with it, it is desirable that even if the table location searching unit 7 fails in connection to one of the physical databases 1 at Step 2204, the searching unit does not end the processing, goes to Step 2207, and controls so as to continue the table location searching process starting with the physical database 1 assigned the second-highest priority.

Embodiment 9

In this Embodiment 9, the distributed system catalog function is provided.

The system catalog is control information for the physical database management system such as physical database account information, access privilege information, information relating to stored table names and structure, view information, and index information which are registered in each physical database 1 and it is called a data dictionary. The physical database management system stores and manages the system catalog as a physical database table only for the system and there are many physical database management systems which have a function for informing of the contents of a SELECT statement which is received from the application program execution means 2.

According to this Embodiment 9, the application program execution means 2 which logs in the logical database 4 and issues the SELECT statement intended for the system catalog can be informed of the contents of the system catalogs of the logical database 4 which instructs logging in and all the physical databases 1 belonging to it. The reason is that when the table location searching unit 7 in Embodiment 9 receives the SELECT statement intended for the system catalog from the application program execution means 2 which logs in the logical database 4, the searching unit logs in all the physical databases 1 constituting the logical database 4 and then issues the received SELECT statement (Steps 506 to 510), combines the processing results from all the physical databases 1, and returns the combined result to the application program execution means 2 (Step 511, 2009, or 2208).

Namely. when the statement held in the statement buffer 6 is a SELECT statement intended for the system catalog at Step 508 and the main storage or gateway server 40 has an external storage, the table location searching unit 7 in this Embodiment 9 reserves an area in the external storage, stores the response in it it will not store the response in it in case of refusal of access), and goes to the processing at Step 509. When the table location searching unit 7 in this Embodiment 9 processes all the physical databases 1 belonging to the logical database 4 to be processed at Step 508, the searching unit goes to the processing at Step 511.

When the statement held in the statement buffer 6 is a SELECT statement intended for the system catalog at Step 511, the table location searching unit 7 in this Embodiment 9 combines the responses (contents of the system catalog of each physical database 1) which are stored at Step 508, creates system catalog information indicating the whole information of the logged-in logical database 4, and informs the application program execution means 2 which issues the SELECT statement of it.

Figure 13:
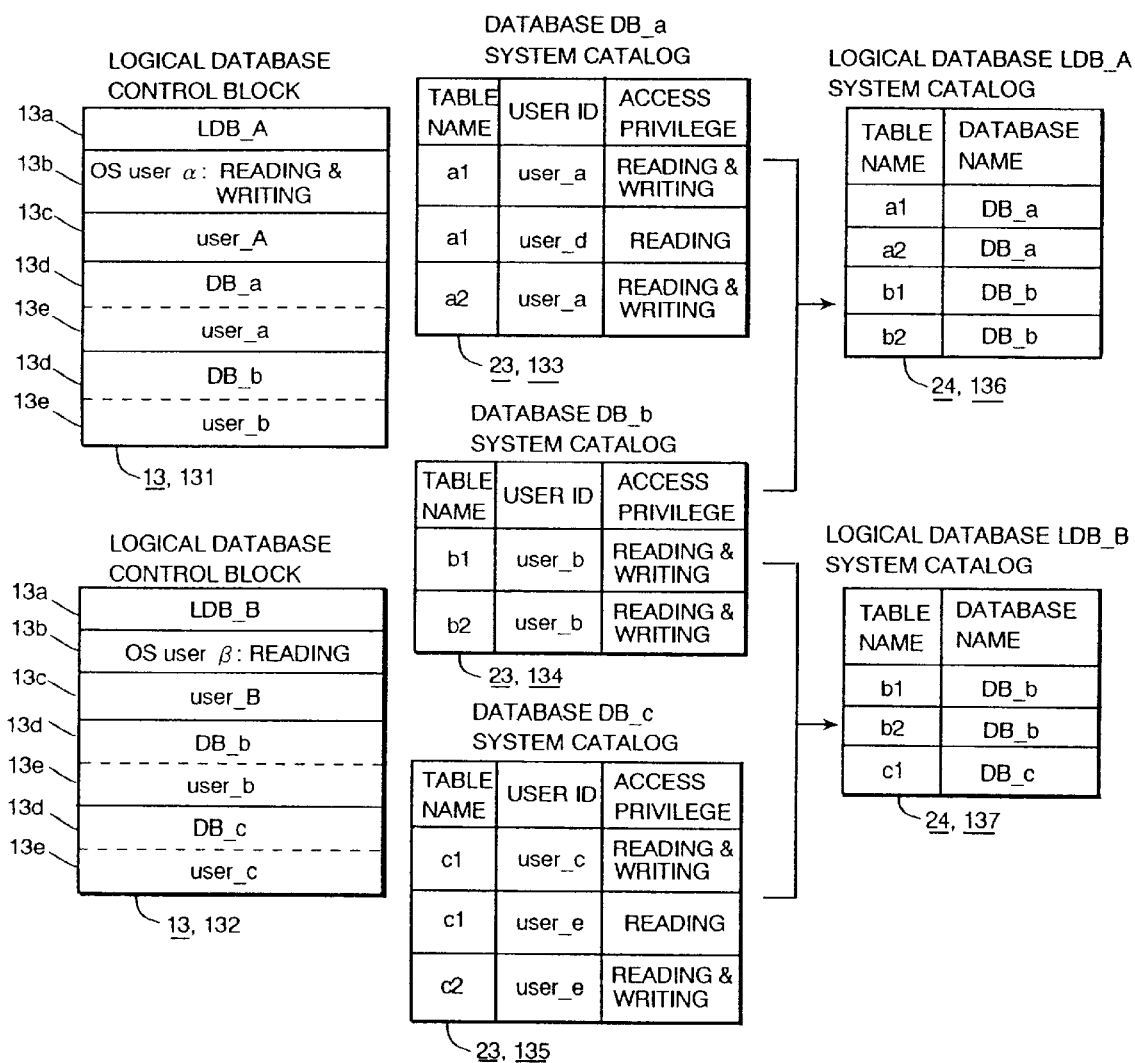
FIG. 13 is a drawing for explaining the distributed system catalog function in Embodiment 9.

A combination of the information stored at Step 508 and the system catalog information at Step 511 will be explained using the actual example shown in FIG. 13. In the example shown in FIG. 13, the information relating to the tables held by each physical database 1 is managed by the system catalog 23.

For example, when the application program execution means 2 issues a SELECT statement for requesting to refer to the system catalog relating to the table name list to the logical database LDB__B, the table location searching unit 7 refers to the logical database control block 132 of LDB__B, logs the physical database accounts user-b and user__c sequentially in the physical databases DB__b and DB__c which are registered in it (Step 506) and issues the received SELECT statement (Step 507). On the other hand, the physical database management system 270 for managing the physical database DB__b refers to the system catalog 134 which is a system catalog 23 of DB__b and returns b1 and b2 as table names which can be accessed by user_b. The physical database management system 270 for managing the physical database DB_c refers to the system catalog 135 which is a system catalog 23 of DB_c and returns c1 as a table name which can be accessed by user_c. The table location searching unit 7 refers to the system catalog 134 which is a system catalog 23 of DB_a, stores the results in a storage area which is newly reserved (Step 508), combines the processing results of the physical databases DB_b and DB_c when all the physical databases 1 are processed, adds the name of the stored physical database 1, and informs the application program execution means 2 of the table 137 as a system catalog 24 of the logical database LDB_B (Step 511).

When the application program execution means 2 issues a SELECT statement for requesting to refer to the system catalog relating to the table name list to the logical database LDB_A, the table location searching unit 7 refers to the logical database control block 131 of LDB_A, logs the physical database accounts user-a and user_b sequentially in the physical databases DB_a and DB_b which are registered in it (Step 506) and issues the received SELECT statement (Step 507). On the other hand, the physical database management system 270 for managing the physical database DB_a refers to the system catalog 133 which is a system catalog 23 of DB_a and returns a1 and a2 as table names which can be accessed by user_a. The physical database management system 270 for managing the physical database DB_b refers to the system catalog 134 which is a system catalog 23 of DB_b and returns b1 and b2 as table names which can be accessed by user_b. The table location searching unit 7 stores the results in a storage area which is newly reserved (Step 508), combines the processing results of the physical databases DB_a and DB_b when all the physical databases 1 are processed, adds the name of the stored physical database 1, and informs the application program execution means 2 of the table 136 as a system catalog 24 of the logical database LDB_A (Step 511). The processing other than the one which is explained here is the same as that in Embodiment 1. Furthermore, the components other than the table location searching unit 7 of the distributed database access management unit 3 and the processing thereof are the same as those in Embodiment 1. When Step 508 (Step 2007 or 2206 in Embodiment 8) and Step 511 (Step 2009 or 2208 in Embodiment 8) are changed as shown in this Embodiment 9, the table location searching unit 7 in one of Embodiments 1 to 8 mentioned above can output the contents of the system catalogs of all the physical databases belonging to the logged-in logical database as contents of the system catalog of the logical database according to the SELECT statement.

As mentioned above, according to this Embodiment 9, it is possible to combine the contents of the system catalog 23 stored in a plurality of physical databases 1 constituting the logical database 4 and to compose the logical database system catalog 24 as if they are a single substantial physical database for a user.

Embodiment 10

According to this Embodiment 10, an auditing function intended for the logical database 4 is realized.

The components of the distributed database access management unit 3 in this Embodiment 10 and the contents thereof are the same as those in Embodiment 9. Differences are as shown below. Firstly, in addition to the components which are the same as those shown in Embodiment 9, the logical database dictionary 8 in this Embodiment 10 has a logical database access log buffer 25 (shown in FIG. 14) which is a log information retention area for storing access history information relating to the logical database 4. The logical database access log buffer 25 in this Embodiment 10 is a table having an area for storing each data of a logical database name, logical database user ID, table name, physical database name, physical database user ID, and access date.

Secondarily, when the table location searching unit 7 in this Embodiment 10 receives a logical database access request from the application program execution means 2, the searching unit stores various history information relating to logical database access, for example, the name of the logical database 4, the logical database user ID at the time of logging-in, the accessed table name, the name of the physical database 1 which is decided as a table location, the physical database user ID at the time of logging-in, and the access date sequentially in the logical database access log buffer 25. When the logical database 4 is logged in (the CONNECT statement which designates the logical database 4 is executed) and a SELECT statement intended for the system catalog is inputted, the table location searching unit 7 in this Embodiment 10 outputs the information saved in the logical database access log buffer 25 in addition to the logical database system catalog information 24.

According to this Embodiment 10, a user refers to the information saved in the logical database access log buffer 25 and can know information such as the name of the physical database 1 which is actually accessed in addition to the access record relating to the logical database 4.

Embodiment 11

According to this Embodiment 11, the distributed searching process by the logical database access function is realized. The distributed database access management unit 3 in this Embodiment 11 can realize joining (distributed searching) intended for a plurality of tables which are stored in different physical databases 1 without being aware of the table location.

A. Processing of the Table Location Searching Unit

Figure 35:
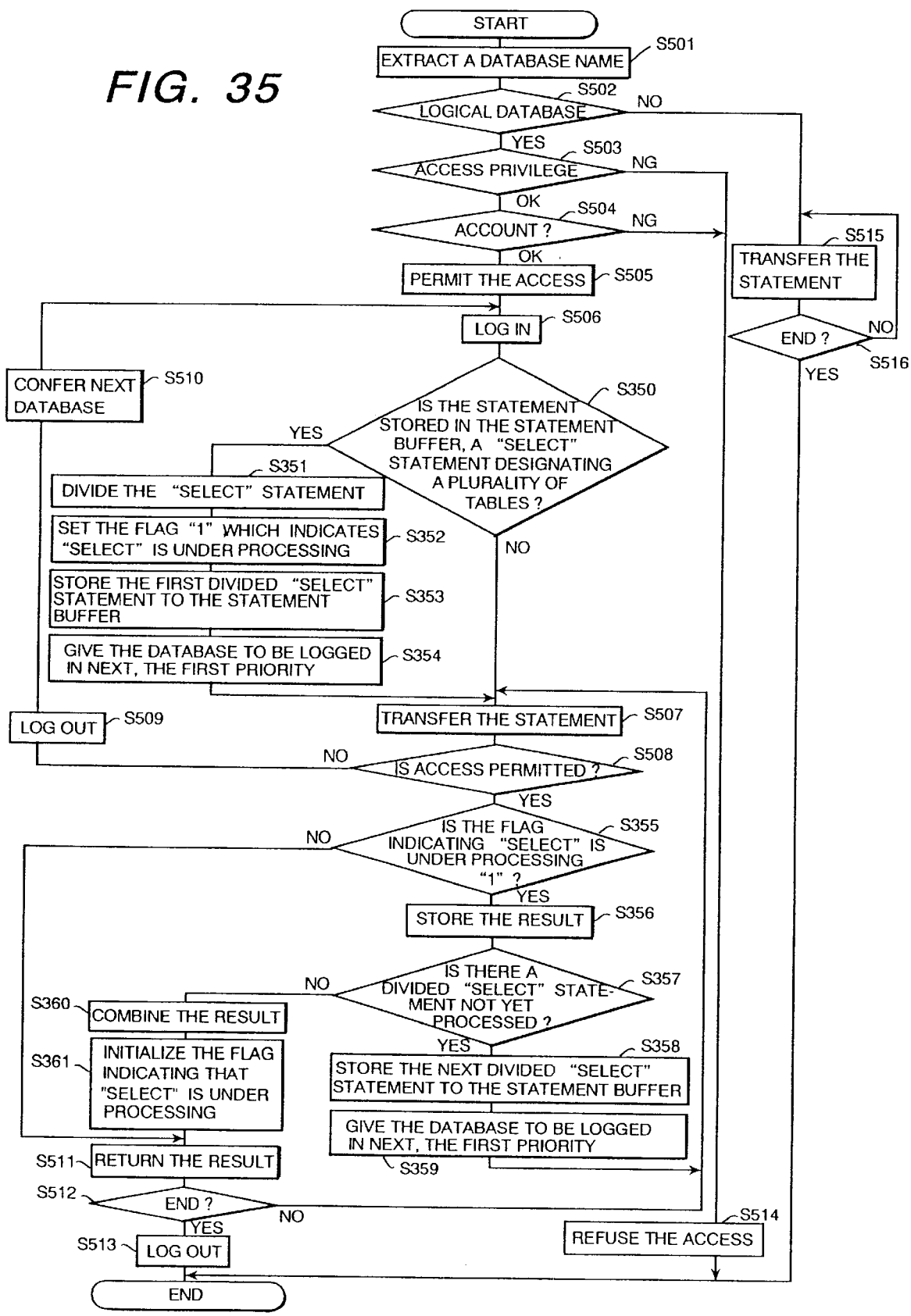
FIG. 35 is a flow chart showing the processing procedure of the table location searching unit in Embodiment 11.

The constitution of the distributed database access management unit 3 in this Embodiment 11 is the same as that in Embodiment 1 and the processing flow of each component is the same as that in Embodiment 1. However, the distributed database access management unit 3 has a SELECT statement storage area (not shown in the drawing) which can hold a plurality of SELECT statements, a SELECT statement result storage area (not shown in the drawing) which can hold a plurality of processing results of SELECT statements, and a SELECT statement under-processing flag storage area (not shown in the drawing) for holding a flag indicating whether the SELECT statement is being divided furthermore. The initial value of the SELECT statement under-processing flag storage area is 0. The processing of the table location searching unit 7 is different from that in Embodiment 1. The processing flow of the table location searching unit 7 in this Embodiment 11 is shown in FIG. 35. The processing at the steps assigned with the same symbols as those in Embodiment 1 is the same as that in Embodiment 1.

(1) Dividing of SELECT Statement (Steps 350 to 354)

A SELECT statement in which a plurality of table names are described is used generally as a join. Therefore, the table location searching unit 7 in this Embodiment 11 executes the first log-in processing using a CONNECT statement (Step 506) and then checks whether the table access statement which is held in the statement buffer 6 and is to be executed next is a SELECT statement in which a plurality of tables are designated (Step 350). When the table access statement is a SELECT statement in which a plurality of tables are designated, the table location searching unit 7 interprets and divides the SELECT statement, creates a SELECT statement for accessing each of a plurality of designated tables, stores it in the SELECT statement storage area (Step 351), stores "1"in the SELECT statement under-processing flag storage area (Step 352), reads one of the divided SELECT statements (SELECT statement in which a table is described) from the above SELECT statement storage area, stores it in the statement buffer 6 as a statement which is to be processed next (Step 353), selects the highest priority physical database 1 belonging to the physical database 4 which is under processing as a physical database 1 to be logged in next (Step 354), and goes to the statement transfer processing (Step 507). When the processing object is not a SELECT statement in which a plurality of tables are designated, the table location searching unit 7 in this Embodiment 11 goes to the statement transfer processing (Step 507) at it is.

(2) Storing of Result (Steps 355 to 359)

When the table location searching unit 7 in this Embodiment 11 receives a response of success of access as a result of statement transfer (Step 507), the searching unit checks whether the value (SELECT statement under-processing flag) which is held in the SELECT statement under-processing flag storage area is 1 (Step 355). When the value is not 1, the table location searching unit 7 goes to the processing at Step 511 as it is. When the SELECT statement under-processing flag is 1, the table location searching unit 7 in this Embodiment 11 stores the informed processing result in the SELECT statement result storage area (Step 356).

Next, the table location searching unit 7 in this Embodiment 11 checks whether there is a divided SELECT statement which is not processed in the SELECT statement storage area (Step 357). When there is a divided SELECT statement which is not processed, the table location searching unit 7 reads the divided SELECT statement to be processed next from the SELECT statement storage area, stores it in the statement buffer 6 (Step 358), selects the highest priority physical database 1 belonging to the logical database 4 which is under processing as a physical database 1 to be logged in next (Step 359), and returns to the processing at Step 507.

(3) Combining of Results (Steps 360 to 361)

When there is not a divided SELECT statement which is not processed in the SELECT statement storage area at Step 357, the table location searching unit 7 in this Embodiment 11 combines the processing results stored in the SELECT statement result storage area (Step 360), stores 0 in the SELECT statement under-processing flag storage area (Step 361), and goes to the processing at Step 511.

B. Effect of this Embodiment 11

As mentioned above, according to the logical database access function in this Embodiment 11, by a SELECT statement which is similar to a join for tables stored in a single physical database 1, a plurality of tables stored in different physical databases 1 in the same logical database can be joined.

Embodiment 12

The distributed database management system in this Embodiment 12 provides a view function and a synonym function relating to the logical database 4. According to the distributed database access management unit 3 in this Embodiment 12, the view or synonym extending a plurality of physical databases 1 can be handled as if it is stored in one database without being aware of the existence of the physical databases 1 by designating and accessing the logical database 4.

A. Constitution of Logical Database Control Block

Figures 14, 15:
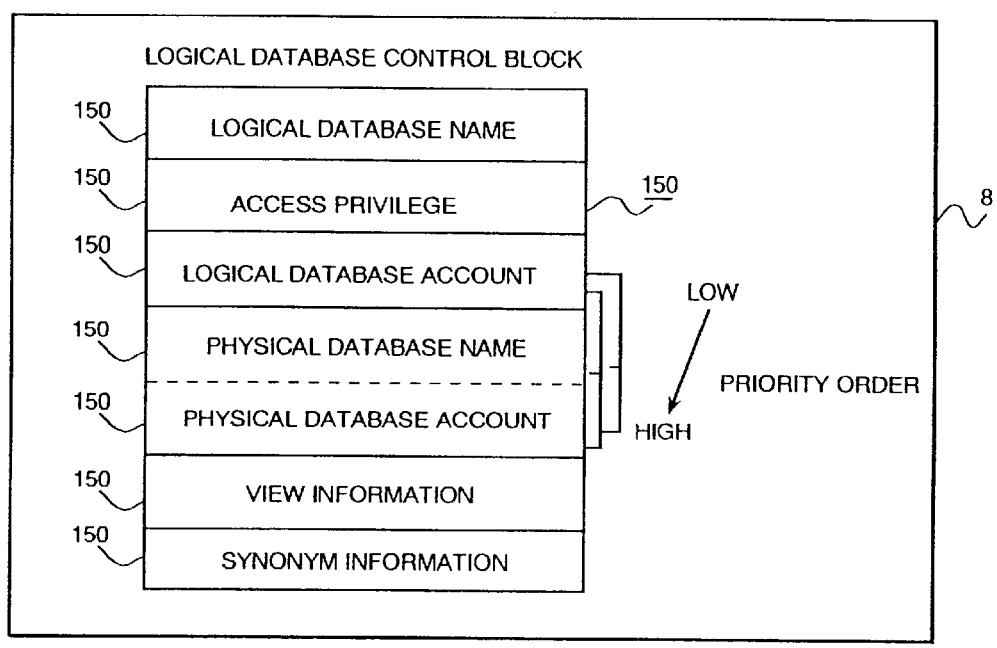
FIG. 14 is an illustration showing the constitution of the logical database access log buffer in Embodiment 10.
FIG. 15 is a drawing for explaining the view information and synonym information in Embodiment 12.

A logical database control block 150 in this Embodiment 12 is shown in FIG. 15. In the same way as with Embodiment 1, the logical database control block 150 in this Embodiment 12 has a logical database name storage area 150*a*, an access privilege storage area 150*b*, a logical database account storage area 150*c*, a physical database name storage area 150*d*, and a physical database account storage area 150*e* and furthermore an area 150*f* for storing view information and an area 150*g* for storing synonym information. The distributed database access management unit 3 in this Embodiment 12 has a constitution which is the same as that in Embodiment 1 except the items explained hereunder.

B. Processing of the Logical Database Defining Unit 9

When the logical database defining unit 9 in this Embodiment 12 receives a CREATE VIEW statement (statement for defining view) or a CREATE SYNONYM statement (statement for defining synonym) for the logical database 4 from the application program execution means 2, the defining unit stores the information in the statement in the view information storage area 150*f* or the synonym information storage area 150*g* of the logical database control block 13. The view information consists of the view name and an area for storing a SELECT statement for a real table and the synonym information consists of the synonym name and an area for storing the corresponding clause.

C. Processing of the Table Location Searching Unit 7

The table location searching unit 7 in this Embodiment 12 extracts the table name from the table access statement received from the application program execution means 2 and checks whether it coincides with the name registered in the view information storage area 150*f* or the synonym information storage area 150*g*. When the extracted table name coincides with the registered name, the table location searching unit 7 converts the table access statement on the basis of the registered information and issues it to the physical database 1 which is logged in (Step 507).

D. Effect of this Embodiment 12

For example, when a SELECT statement intended for each table stored in a plurality of physical databases 1 is defined as a view of the logical database 4, distributed searching can be realized by an access method which is the same as that for searching for a single table.

The distributed database access management unit 3 in each of Embodiments 1 to 11 mentioned above may be provided with the view function and/or the synonym function relating to the logical database 4 in this Embodiment 12. In this case, in the same way as with this Embodiment 12, it is desirable to install the view information storage area 150*f* and/or the synonym information storage area 150*g* in the logical database control block 13, 17, or 19 or in the logical account control block 18 or 20 in each of Embodiments 1 to 11, to install a means for receiving the view information and/or synonym information and for storing it in the view information storage area 150*f* and/or the synonym information storage area 150*g* in the logical database defining unit 9, and to install a means for converting the table access statement using the registered view information and/or synonym information in the table location searching unit 7.

Embodiment 13

Next, an embodiment using a control method which can reduce the processing overhead relating to the logical database access function will be explained. The table location searching unit 7 in each of Embodiments 1 to 12 mentioned above inquires each physical database 1 constituting the logical database 4 about the existence of tables sequentially according to the priority order. Therefore, when the table to be accessed is stored in the lowest priority physical database 1, the overhead of the table location searching process increases.

Therefore, the table location searching unit 7 in this Embodiment 13 predicts the table location beforehand using one of three kinds of table location predicting means which will be explained hereunder and bypasses the table location searching process.

A. Constitution of the Table Location Searching Unit 7

Figure 24:
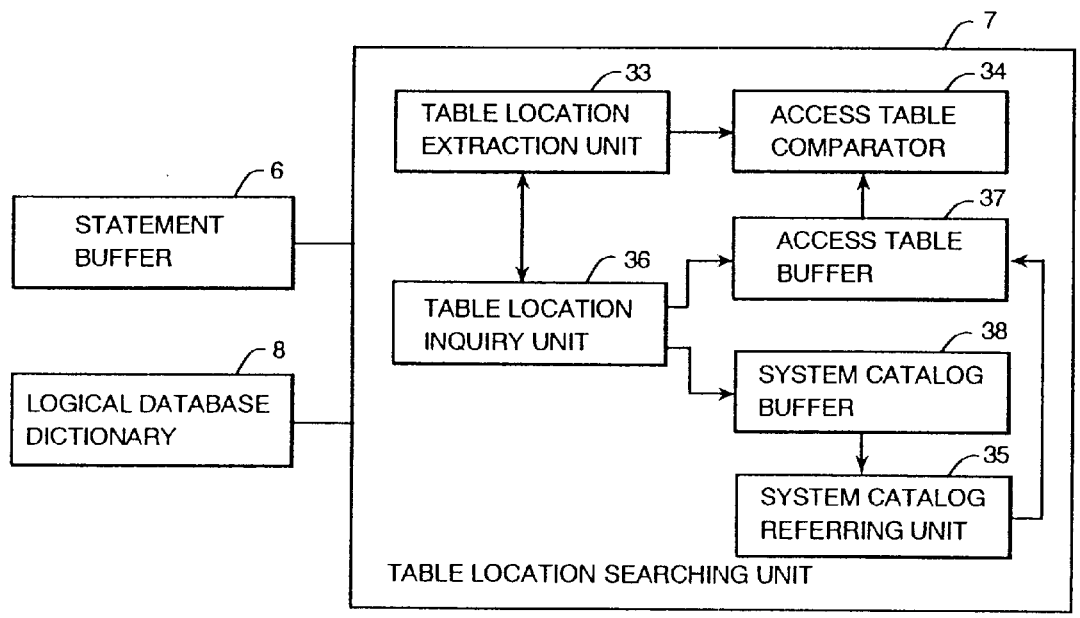
FIG. 24 a block diagram of the table location searching unit in Embodiment 13.

The constitution of the table location searching unit 7 in this Embodiment 13 is shown in FIG. 24. The table location searching unit 7 in this Embodiment 13 has a table location inquiry unit 36, a table location extraction unit 33, an access table buffer 37, an access table comparator 34, a system catalog buffer 38, and a system catalog referring unit 35.

In the same way as with the table location searching unit 7 in each of Embodiments 1 to 12 mentioned above, the table location inquiry unit 36 transfers a table access statement to each physical database 1 and decides the table location from the access result.

The table location extraction unit 33 extracts the name of the physical database 1 in which the table 100 to be accessed is stored from the table access statement and issues the table access statement to the physical database 1.

The access table buffer 37 is a storage area which holds the name of the table 100 which was accessed in the past and the name of the physical database 1 in which the table 100 is stored and the access table comparator 34 confirms the physical database 1 in which the table to be accessed is stored in the access table buffer 37 and issues the table access statement to the physical database 1.

The system catalog buffer 38 is a storage area which holds the name of the table 100 stored in each physical database 1 constituting the logical database 4 and the system catalog referring unit 35 confirms the physical database 1 in which the table to be accessed is stored in the above system catalog buffer 38 and issues the table access statement to the physical database 1.

B. Changing the Table Access Statement by the Table Location Extraction Unit

Figure 25:
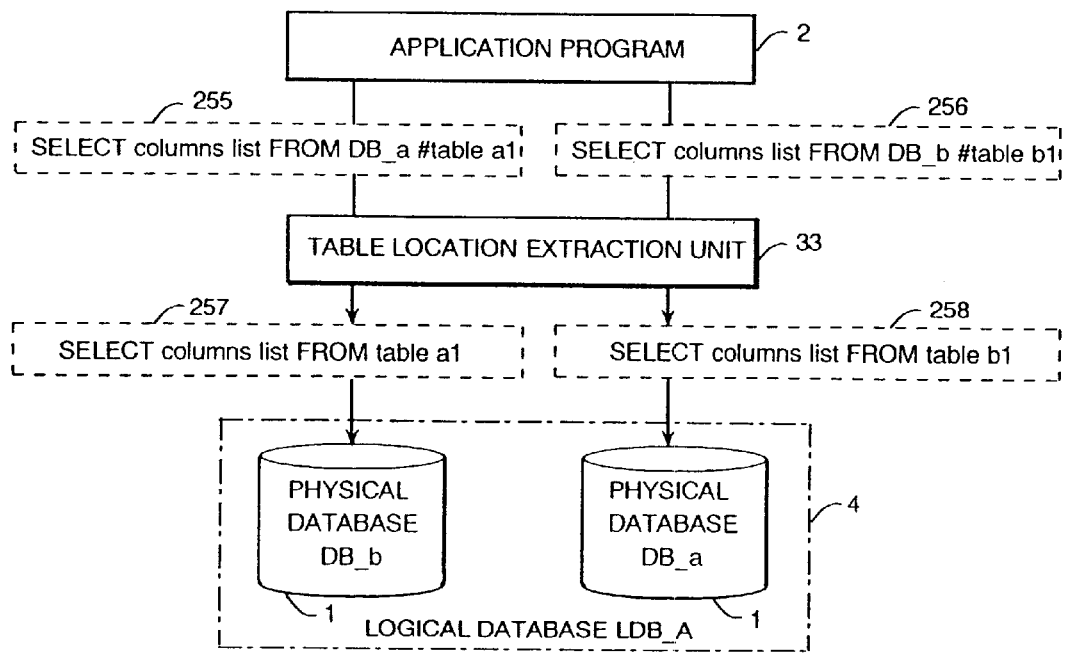
FIG. 25 is an illustration showing the database connection statement conversion processing by the table location extraction unit in Embodiment 13.

A processing example of the table location extraction unit 33 is shown in FIG. 25. In this Embodiment 13, the application program execution means 2 which knows the table location beforehand can omit searching of the table location by inserting the name of the physical database 1 in which the table 100 to be accessed is stored into the table access statement. However, in this Embodiment 13, the physical database name is added before a separator (# in FIG. 25) which is located before the table name so as to keep the statement within the frame of the SQL standard. Namely, from a standpoint of the syntax of the SQL standard, the added physical database name and separator are interpreted as a part of the table name.

When the table location extraction unit 33 in this Embodiment 13 receives a table access statement 255 or 256 in which the physical database name holding the table 100 to be accessed is directly designated, the extraction unit deletes the designation of the physical database name from the table access statement 255 or 256 held in the statement buffer 6, creates a statement 257 or 258, and informs the table location inquiry unit 36 of the physical database 1 (DB_a or DB_b) which is designated in the statement 255 or 256 as an access object.

C. Processing of the Table Location Searching Unit

Figure 26:
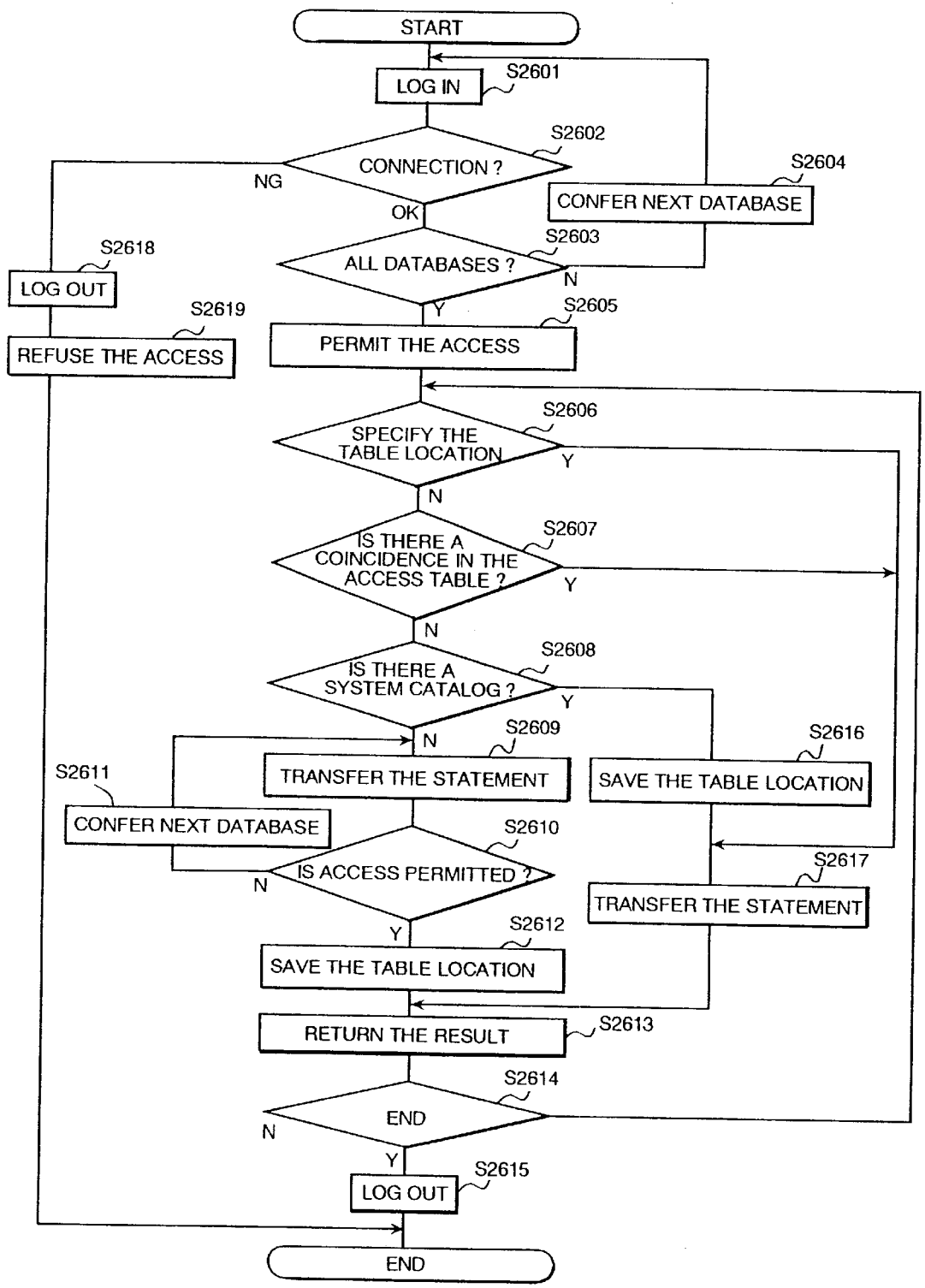
FIG. 26 is a flow chart showing the procedure of the automatic logging-in processing in the strict mode in Embodiment 13.
Figure 34:
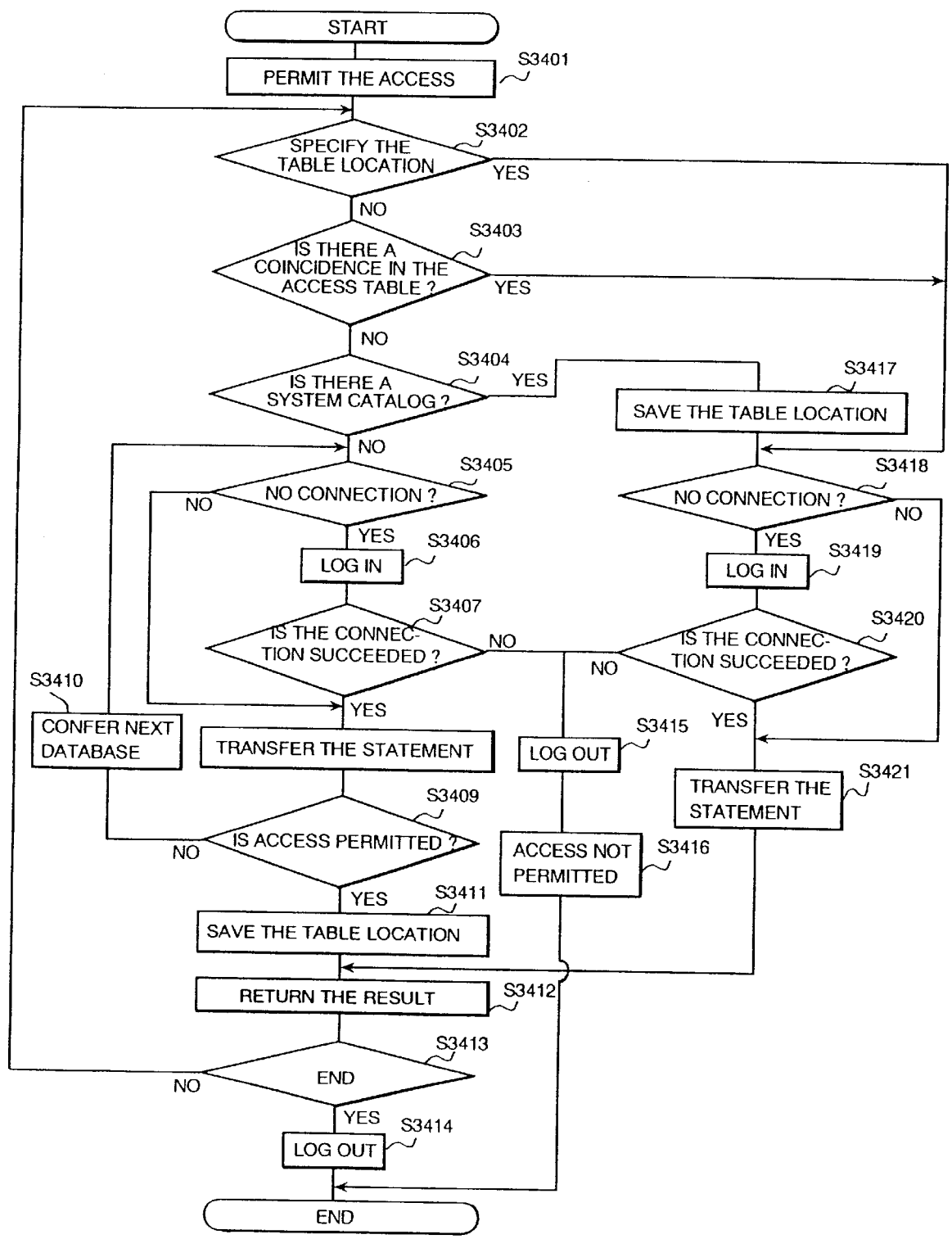
FIG. 34 is a flow chart showing the procedure of the automatic logging-in processing in the loose mode in Embodiment 13.

The components of the distributed database access management unit 3 in this Embodiment 13 other than the table location searching unit 7 are the same as those in Embodiment 8. The processing of the table location searching unit 7 in this Embodiment 13 is almost the same as that in Embodiment 8. However, the strict mode process (shown in FIG. 20) and the loose mode process (shown in FIG. 22) of the table location searching unit 7 are different from those in Embodiment 8. The strict mode process in this Embodiment 8 is shown in FIG. 26 and the loose mode process is shown in FIG. 34. The distributed database access management unit 3 in this Embodiment 13 has a constitution for realizing a system catalog function which is the same as that in Embodiment 9 in the same way as with Embodiment 9. When the distributed database access management unit 3 creates a logical database system catalog 24 (shown in FIG. 13), the management unit informs the application program execution means 2 of it and stores it in the system catalog buffer 38.

(1) Automatic Log-in Processing in the Strict Mode (Step 1906)

In the automatic log-in processing in the strict mode, the table location searching unit 7 in this Embodiment 13 logs in all the physical databases 1 belonging to the designated logical database 4 by the table location inquiry unit 36 first. Namely, in the same way as with the table location searching unit 7 in Embodiment 8, when the table location inquiry unit 36 in this Embodiment 13 tries to log the physical database account stored in the logical database dictionary 8 in all the physical databases 1 constituting the logical database 4 beforehand (Steps 2601 to 2604) and detects that logging in one of the physical databases 1 constituting the designated logical database 4 fails, the inquiry unit logs out from all the physical databases 1 which are being logged in (Step 2618), informs the application program execution means 2 of refusal of logging in the logical database 4 (Step 2619), and ends the processing. When the logging in all the physical databases 1 can be processed normally, the table location inquiry unit 36 informs the application program execution means 2 of reception of logging in the logical database 4 (Step 2605) and passes control to the table location extraction unit 33.

The table location extraction unit 33 analyzes the table access statement stored in the statement buffer 6 and checks whether there is a separator (# in this Embodiment 13) in the character string indicating the table name. When a separator is detected, as shown in FIG. 25, the table location extraction unit 33 removes the character string indicating the physical database name and separator from the table name in the statement which is held in the statement buffer 6, informs the table location inquiry unit 36 of the physical database name, and passes control to the table location inquiry unit 36 (Step 2606). The table location inquiry unit 36 transfers the statement to be processed in the statement buffer 6 to the physical database 1 equivalent to the informed name (Step 2617) and informs the application program execution means 2 of the result (Step 2613). When the statement to be processed next is not a DISCONNECT statement, the table location inquiry unit 36 passes control to the table location extraction unit 33 and returns to the processing at Step 2606. When the statement to be processed next is a DISCONNECT statement (Step 2614), the table location inquiry unit 36 logs out from all the logged-in physical databases 1 (Step 2615) and ends the processing.

When no separator is detected at Step 2606, the table location extraction unit 33 passes control to the access table comparator 34. The access table comparator 34 is a means for deciding the table location with reference to the access table buffer 37. The access table buffer 37 is an area where the table location inquiry unit 36 and the system catalog referring unit 35 of the table location searching unit 7 store the table name which is accessed before and the name of the physical database 1 in which it is stored by associating them with each other.

The access table comparator 34 to which control is passed refers to the access table buffer 37 and checks whether there is a table name which coincides with the table name in the table access statement which is stored in the statement buffer 6. When there is an incident table name, the access table comparator 34 extracts the physical database name corresponding to the table name from the access table buffer 37, informs the table location inquiry unit 36 of the name, passes control to the table location inquiry unit 36, and goes to the processing at Step 2617 mentioned above (Step 2607).

When there is not an incident table name in the access table buffer 37 at Step 2607, the access table comparator 34 passes control to the system catalog referring unit 35. The system catalog referring unit 35 is a means for deciding the table location with reference to the system catalog buffer 38. The system catalog buffer 38 is an area where information of a logical database system catalog 24 (shown in FIG. 13) created by a system catalog function which is the same as that in Embodiment 9 is stored and the table names and physical database names of all the tables stored in each physical database 1 constituting the logical database 4 are associated with each other and stored.

The system catalog referring unit 35 to which control is passed checks whether the system catalog 24 relating to the logical database 4 which is under processing at present is stored in the system catalog buffer 38 (Step 2608). When the system catalog is stored, the system catalog referring unit 35 finds a table name which coincides with the table name in the table access statement which is stored in the statement buffer 6 from the system catalog buffer 38, extracts the physical database name corresponding to the designated table name, registers it in the access table buffer 37 together with the table name (Step 2616), informs the table location inquiry unit 36 of this physical database name, passes control to the table location inquiry unit 36, and goes to the processing at Step 2617 mentioned above.

When the system catalog 24 relating to the logical database 4 which is under processing at present is not stored in the system catalog buffer 38 at Step 2608, the system catalog referring unit 35 passes control to the table location inquiry unit 36 as it is.

In the same way as with the processing of the table location searching unit at Steps 2006 to 2008 in Embodiment 8, the table location inquiry unit 36 to which control is passed transfers the table access statement sequentially to each physical database 1 (Steps 2609 to 2611) and decides the table location from the access result. In Embodiment 8, when success of access is informed after statement transfer (Step 2006), the table location searching unit 7 informs the application program execution means 2 of the result immediately (Step 2009). However, when success of access is informed, the table location inquiry unit 36 in this Embodiment 13 registers the name of the accessed physical database 1 and the table name in the access table buffer 37 as a table location at Step 2612, informs the application program execution means 2 of the access result (Step 2613), and goes to the processing at Step 2614 mentioned above.

(2) Automatic Log-in Processing in the Loose Mode (Step 1907)

In the automatic log-in processing in the loose mode, the table location searching unit 7 in this Embodiment 13 passes control to the table location inquiry unit 36 first. In the same way as with Step 2201 in Embodiment 8, the table location inquiry unit 36 informs the application program execution means 2 of reception of logging in the logical database 4 (Step 3401) and passes control to the table location extraction unit 33.

The table location extraction unit 33 to which control is passed analyzes the table access statement stored in the statement buffer 6 and checks whether there is a separator in the character string indicating the table name. When a separator is detected, as shown in FIG. 25, the table location extraction unit 33 removes the character string indicating the physical database name and separator from the table name in the statement which is held in the statement buffer 6, informs the table location inquiry unit 36 of the physical database name, and passes control to the table location inquiry unit 36 (Step 3402). The table location inquiry unit 36 checks whether it is connected to the physical database 1 equivalent to the informed name already (Step 3418). When the table location inquiry unit 36 is not connected to the physical database 1, the table location inquiry unit 36 logs in the physical database 1 (Step 3419). When the connection is succeeded (Step 3420), the table location inquiry unit 36 transfers the statement to be processed in the statement buffer 6 to the logged-in physical database 1 (Step 3421). Next, the table location inquiry unit 36 informs the application program execution means 2 of the processing result from the physical database 1 (Step 3412). When the statement to be processed next is not a DISCONNECT statement, the table location inquiry unit 36 passes control to the table location extraction unit 33 and returns to the processing at Step 3402. When the statement to be processed next is a DISCONNECT statement (Step 3413), the table location inquiry unit 36 logs out from all the logged-in physical databases 1 (Step 3414) and ends the processing.

When the table location extraction unit 33 does not detect a separator at Step 3402, the extraction unit passes control to the access table comparator 34. The access table comparator 34 refers to the access table buffer 37 and checks whether there is a table name which coincides with the table name in the table access statement which is stored in the statement buffer 6. When there is an incident table name, the access table comparator 34 extracts the physical database name corresponding to the table name from the access table buffer 37, informs the table location inquiry unit 36 of the name, passes control to the table location inquiry unit 36, and goes to the processing at Step 3418 mentioned above (Step 3403). When there is not an incident table name in the access table buffer 37 at Step 3403, the access table comparator 34 passes control to the system catalog referring unit 35. The system catalog referring unit 35 checks whether the system catalog 24 relating to the logical database 4 which is under processing at present is stored in the system catalog buffer 38 (Step 3404). When the system catalog is stored, the system catalog referring unit 35 finds a table name which coincides with the table name in the table access statement which is stored in the statement buffer 6 from the system catalog buffer 38, extracts the physical database name corresponding to the designated table name, registers it in the access table buffer 37 together with the table name (Step 3417), informs the table location inquiry unit 36 of this physical database name, passes control to the table location inquiry unit 36, and goes to the processing at Step 3418 mentioned above.

When the system catalog 24 relating to the logical database 4 which is under processing at present is not stored in the system catalog buffer 38 at Step 3404, the system catalog referring unit 35 passes control to the table location inquiry unit 36 as it is and goes to the processing at Step 3405. The table location inquiry unit 36 to which control is passed checks whether it is connected to a higher priority physical database already (Step 3405). When the inquiry unit is not connected to a higher priority physical database, the table location inquiry unit 36 logs in the physical database 1 (Step 3406). When the connection is succeeded (Step 3407), the table location inquiry unit 36 transfers the statement to be processed which is held in the statement buffer 6 to the logged-in physical database 1 (Step 3408). When the table location inquiry unit 36 receives information indicating refusal of access from the physical database 1 as a result of transfer (Step 3409), the inquiry unit selects the physical database 1 assigned the second-highest priority as a processing object (Step 3410) and returns to the processing at Step 3405.

When the access is succeeded as a result of transfer, the table location inquiry unit 36 registers the name of the accessed physical database 1 in the access table buffer 37 as a table location (Step 3411) and goes to the processing at Step 3412 mentioned above.

When the connection to the physical database 1 fails at Step 3407 or 3420, in the same way as with Steps 2211 and 2212 in Embodiment 8, the table location inquiry unit 36 logs out from all the physical databases 1 under logging in (Step 3415), informs the application program execution means 2 of failure of access (Step 3416), and ends the processing.

I.D. Effect of this Embodiment 13

As mentioned above, when the table access statement which is issued by the application program execution means 2 is one of a table access statement which specifies the physical database name in which the table is stored, a table access statement for a table which is the same as that which is accessed before, and a table access statement which is received after creation of the logical database system catalog 24, the table location searching unit 7 in this Embodiment 13 decides the table location before inquiring each physical database 1 constituting the logical database 4 about the existence or nonexistence of the table and transfers the table access statement to the decided physical database 1. By doing this, the overhead of the table location searching process can be reduced.

When the table location searching unit 7 in this Embodiment 13 receives a CREATE TABLE statement for creating a table newly from the application program execution means 2, the searching unit transfers the statement to the highest priority physical database 1 among the physical databases 1 constituting the logical database 4. In this case, the table location searching unit 7 may control so as to register the table name and the name of the physical database 1 which transfers the statement in the access table buffer 37 and the system catalog buffer 38. Furthermore, when the table location searching unit 7 in this Embodiment 13 receives a DROP TABLE statement for deleting a table from the application program execution means 2, the searching unit transfers the statement to the physical database 1 in which the table to be deleted is stored and then may control so as to delete the table name and the name of the physical database 1 which transfers the statement from the access table buffer 37 and the system catalog buffer 38. By controlling as mentioned above, the table location information which is registered in the access table buffer 37 and the system catalog buffer 38 in this Embodiment 13 can be kept always latest.

The table location searching unit 7 in this Embodiment 13 may delete the information which is registered in the access table buffer 37 or the system catalog buffer 38 for each logging out from the logical database 4 or may save it in a secondary storage always or for a given period.

Other states of Embodiments 1 to 13

In Embodiments 1 to 13 mentioned above, it is explained that in the logical database creating statement 14 shown in FIG. 3, the description order of information relating to each physical database 1 constituting the logical database 4 implicitly represents the priority order. However, a parameter describing the priority order may be added to the information relating to the physical database 1 in the statement 14 so that the priority order value can be designated explicitly regardless of the description order. It is also explained that in the logical database control blocks 13, 17, and 19 shown in FIGS. 2, 7, 15, and 16 and the logical account control block 20 shown in FIG. 9, the storage order of information relating to each physical database 1 represents the priority order. However, an area for storing the priority order value may be added to the information relating to each physical database 1.

Effects of Embodiments 1 to 13

The embodiments of the distributed database management system of the present invention are explained above. A conventional distributed database management system refers to the table location information which is registered by a user beforehand and decides the physical database 1 in which the table to be accessed is stored. Therefore, a table which is not registered in the dictionary cannot be accessed in a transparent location basis. On the other hand, in the distributed database management system in Embodiments 1 to 13 mentioned above, the table location is decided by inquiring each physical database 1 constituting the logical database 4 about the existence or nonexistence of the target table at the time of table access. Therefore, all the tables stored in each physical database 1 can be handled transparently.

In the distributed database management system in Embodiments 1 to 13 mentioned above, a user can log in the desired physical database 1 in the distributed database environment only by knowing a single logical database account without being aware of differences in account between the physical databases 1.

The distributed database management system in Embodiments 1 to 13 mentioned above logs the physical database account stored in the logical database dictionary 8 in each physical database 1 and then issues a table access statement. The physical database management system 270 for managing the physical database 1 which receives the table access statement confirms the table to be accessed and furthermore checks the access privilege of the physical database user which is set in the table. When the access privilege to the table is not assigned to the logged-in physical database user, the physical database management system 270 for managing the physical database 1 refuses access. According to these embodiments as mentioned above, even if there is a table under the same name which is created by a different user in the physical database 1 constituting the logical database 4, it can be excluded automatically from the access object.

However, when a table access privilege is granted to a table under the same name which is created by a different user, there are tables under the same name which can be accessed in a logical database 4. However, in the distributed database management system in Embodiments 1 to 13 mentioned above, by assigning the priority order to each physical database 1 constituting the logical database 4, a table to be accessed can be specified among tables under duplicated names which are stored in different physical databases 1.

Furthermore, in the distributed database management system in Embodiments 1 to 13 mentioned above, not only a table but also a view which is a virtual table and a synonym which defines another name for a long clause which are registered in a physical database 1 can be accessed without being aware of the stored physical database 1.

In the distributed database management system of the present invention, only by registering minimum information, a user can access tables stored in a plurality of physical databases constituting the logical database and tables which will be stored newly hereafter transparently without being aware of the table location and account.

What is claimed is:

1. A distributed database management system comprising:
    a communication network;
    at least a terminal device including application program execution means connected to said communication network;
    a plurality of information processors connected to said communication network;
    a plurality of physical databases installed in at least one of said information processors;
    at least a logical database grouping a plurality of said physical databases, said logical database being defined by logical database information is stored in at least one of said terminal device and said plurality of information processors;
    at least a table stored in at least one of said physical databases; and
    table location searching means installed in at least one of said terminal device and said plurality of information processors, for searching a table stored in at least one of said physical databases, when said table is requested from said application program execution means, by searching a group of physical databases defined in said logical database information.

2. A distributed database management system according to claim 1, wherein said logical database information includes a priority order of each physical database constituting the logical database; and
    wherein said table location searching means searches for a database stored in the desired table on the physical database on the basis of the priority order of said logical database information.

3. A distributed database management system according to claim 1, wherein said logical database information includes access privilege information for the logical database; and
    wherein said table location searching means checks an access privilege of an application program user instructed from said terminal device prior to access to the logical database.

4. A distributed database management system according to claim 1, wherein said logical database information includes account information for identifying whether to approve said request or not, of the physical database constituting the logical database; and
    wherein said table location searching means logs in the physical database constituting the logical database based on the account information of said logical database information for identifying account information issued from an application program in said terminal device.

5. A distributed database management system according to claim 4, wherein said table location searching means checks the account information received from the application program in said terminal device with the account information of said logical database information prior to access to the logical database.

6. A distributed database management system according to claim 1, wherein said logical database information includes account information for identifying whether to approve said request or not, of the physical database constituting the logical database; and
    wherein said table location searching means logs in the physical database constituting the logical database using account information corresponding to the physical database of said logical database information on the basis of account information issued from an application program in said terminal device.

7. A distributed database management system according to claim 1, wherein said logical database information includes identification information of a physical database constituting the logical database and a password as account information of the physical database.

8. A distributed database management system according to claim 1, wherein a desired database processor (server) is a processor among said plurality of information processors each having a physical database management system and a physical database.

9. A distributed database management system according to claim 1, wherein one of said plurality of information processors is a gateway server located between a plurality of information processors as database servers having said terminal device, a physical database management system, and a physical database, via said network each having distributed database access management means for managing said plurality of database servers.

10. A distributed database management system comprising:
    a communication network;
    at least a terminal device including application program execution means connected to said communication network;
    a plurality of information processors connected to said communication network;
    a plurality of physical databases installed in at least one of said information processors;
    at least a logical database grouping a plurality of said physical databases and account information for identifying whether to approve an access to at least one of said physical databases, said logical database and said account information being defined by logical database information stored in at least one of said terminal device and said plurality of information processors; and
    account information searching means installed in at least one of said terminal device and said plurality of information processors, for searching account information for logging in a physical database constituting said logical database using the account information held in said logical database information, said account information for said logging in being inputted in an access to a logical database, said access being issued from said application program execution means.

11. A distributed database management system according to claim 10, wherein a desired database processor (server) is a processor among said plurality of information processors each having a physical database management system and a physical database.

12. A distributed database management system according to claim 10, wherein one of said plurality of information processors is a gateway server located between a plurality of information processors as database servers having said terminal device, a physical database management system, and a physical database, via said network each having distributed database access management means for managing said plurality of database servers.

13. A distributed database management system which is an information processor which is connected to at least one physical database holding a table via a physical database management system for managing said physical database, and is connected furthermore to application program execution means for accessing said physical database, receiving an access statement for accessing physical databases which is issued by said application program execution means, selecting one of said physical databases as an access object, and transferring said access statement to the physical database management system for managing said physical database, comprising:

a logical database dictionary for holding information on a logical database in which at least one of said physical databases is grouped;

a logical database defining unit for registering information on said logical database in said logical database dictionary;

a statement buffer for holding said access statement;

a logical database access controller for receiving an access statement from said application program execution means and storing it in said statement buffer; and a table location searching unit for transferring said access statement held in said statement buffer to the physical database management system for managing said physical database by selecting one of said physical databases as an access object;

wherein said table location searching unit includes means for receiving an access statement for instructing logging in the database, for selecting one of said physical databases belonging to the instructed logical database as an access object of said access statement when the database which is instructed to be connected is registered in said logical database dictionary as said logical database, for selecting another one of said physical databases belonging to the instructed logical database as an access object of said access statement when a response of access refusal is given to the transfer of said access statement, and for transferring said access statement held in said statement buffer once again.

14. A distributed database management system according to claim 13, wherein said information on the logical database includes identification information of the logical database, and a priority order of at least one of said physical databases, wherein each identification information of at least one physical database belonging to said logical database; and wherein said table location searching unit includes means for deciding an access object of said access statement according to said priority order of at least one of the physical databases included in said information on the logical database held in said logical database dictionary.

15. A distributed database management system according to claim 13, wherein said information on the logical database includes identification information of the logical database, a priority order of said physical databases belonging to the logical database, and identification information of each of said physical databases belonging to the logical database; and wherein said table location searching unit includes means for selecting a highest priority physical database as an access object of said access statement according to said priority order of at least one of the physical databases included in said information on the logical database held in said logical database dictionary, when said access statement to be transferred is a statement for instructing creation of tables.

16. A distributed database management system according to claim 13, wherein said information on the logical database includes access privilege information for said logical database; and wherein said table location searching unit includes means for checking an access privilege of said application program execution means which issues said access statement using said access privilege information which is held in said logical database dictionary, prior to transfer of said access statement and for refusing transfer of said access statement when there is no access privilege.

17. A distributed database management system according to claim 13, wherein said information on the logical database includes identification information of the logical database, and identification information of each of said physical databases belonging to the logical database; and wherein said table location searching unit includes means for rewriting the logical database identification information of said access statement held in the statement buffer, which is to be logged in to decided identification information of the physical database when said access statement to be transferred designates the identification information of the logical database and instructs logging in and for transferring said rewritten access statement to the physical database management system for managing said physical database by selecting said decided physical database as an access object.

18. A distributed database management system according to claim 17, wherein said information of the logical database has at least one logical database account having at least one user identifier and password which are permitted to access said logical database furthermore; and wherein said table location searching unit includes means for checking whether the logical database account described in said access statement coincides with one of logical database accounts held in said logical database dictionary prior to transfer of said access statement and for refusing transfer of said statement when there is no coincidence.

19. A distributed database management system according to claim 17, wherein said information of the logical database has a physical database account having a user identifier and password which are permitted to access said physical database according to each identification information of said physical database furthermore; and wherein said table location searching unit includes means for rewriting the logical database account of said access statement held in the statement buffer to said physical database account held in said logical database dictionary prior to transfer of said statement furthermore when said access statement to be transferred instructs logging in the database.

20. A distributed database management system according to claim 19, wherein said logical database dictionary has a logical database control block and a logical account control block as a storage area of information on said logical database, and said logical database control block is installed in each said logical database and holds at least the identification information of said logical database and the identification information of at least one physical database belonging to said logical database, and said logical account control block is installed for each said logical database account and holds a physical database account having at least the identification information of said physical database which is permitted to access by said logical database account and the identifier and password of a user who is permitted to access said physical database; and wherein said table location searching unit includes means for selecting the physical database indicated by the physical database identification information which is held in said logical database control block holding said logical database identification information and said logical account control block holding said logical account in common as said access object when said logical database identification information and said logical database account are described in said access statement.

21. A distributed database management system according to claim 20, wherein said logical database defining unit includes means for receiving input of said logical database account, encrypting the physical database account included in said information by using said logical database account as a key, and storing it in said logical database dictionary when the information of said logical database is registered in said logical database dictionary; and wherein the physical database account rewriting means of said table location searching unit includes means for receiving input of said logical database account, decrypting the encrypted physical database account which is held in said logical database dictionary in correspondence with the identification information of the physical database decided as a transfer object by using said inputted logical database account as a key, and using it so as to rewrite said logical database account.

22. A distributed database management system according to claim 21, wherein said table location searching unit includes means for refusing transfer of said access statement when decryption of the physical database account stored in said logical database dictionary fails.

23. A distributed database management system according to claim 20, wherein said logical database dictionary has a logical account control block for holding at least the identification information of said physical database which is permitted to be accessed by said logical database account and the physical database account of said physical database for each said logical database account as a storage area of said physical database account for information on said logical database, and rewriting of said database account is to rewrite the account of said logical database of the access statement held in said statement buffer to an account corresponding to the physical database identification information which is decided as an access object among the physical database accounts held in said logical account control block which holds said described logical database account when said logical database account is described in said access statement.

24. A distributed database management system according to claim 23, wherein said table location searching unit includes means for transferring said logical database account without rewriting it when said logical account control block holding said described logical database account is not in said logical database dictionary.

25. A distributed database management system according to claim 23, wherein said table location searching unit includes means for transferring the access statement without rewriting said logical database account when the account of the physical database which is decided as an access object is not in said logical account control block which holds said described logical database account furthermore.

26. A distributed database management system according to claim 20, wherein said information of the logical database has a physical database account having a user identifier and password which are permitted to access said physical database according to each identification information of said physical database furthermore; and wherein said table location searching unit includes means for rewriting the logical database account of the logical database of said access statement held in the statement buffer to said physical database account held in said logical database dictionary prior to transfer of said statement furthermore when said access statement to be transferred instructs logging in the database.

27. A distributed database management system according to claim 17, wherein said logical database dictionary has a logical database control block for holding at least the identification information of said logical database and the identification information of at least one physical database belonging to said logical database in each said logical database as a storage area of information on said logical database and said table location searching unit rewrites the identification information of said logical database to the identification information of the physical database which is decided as an access object among the physical database identification information held in said logical database control block which holds the identification information of said designated logical database.

28. A distributed database management system according to claim 27, wherein said table location searching unit includes means for transferring said logical database identification information without rewriting it when said logical database control block holding said described logical database identification information is not in said logical database dictionary.

29. A distributed database management system according to claim 13, wherein said table location searching unit includes means for selecting each of at least one physical database belonging to said logical database as an access object, transferring said access statement to the physical database management system for managing said physical databases, creating a table by combining system catalog information of each physical database which is inputted as a response to said transfer into said physical database management system, and informing said application program execution means which issues said access statement of the contents of said table when said access statement to be transferred designates said logical database and instructs to refer to the system catalog.

30. A distributed database management system according to claim 13, wherein the distributed database management system has a log information storage area for holding the log information on access to said logical database in each said logical database furthermore; and wherein said table location searching unit includes means for storing the log information on the executed logical database access in said log information storage area, and means for informing of the information held in said log information storage area according to a request from said application program execution means.

31. A distributed database management system according to claim 30, wherein said log information includes at least one of identification information of the logical database, identification information of the physical database, the table identification information, a user identifier of the logical database described in said received access statement, and a user identifier of the physical database described in said transferred access statement which are to be accessed.

32. A distributed database management system according to claim 13, wherein when said access statement includes designation of a table, said table location searching unit includes table location predicting means for predicting said physical database holding said table before transferring said access statement, and selecting said predicted physical database as an access object of said access statement.

33. A distributed database management system according to claim 32, wherein said table location predicting means is means for extracting physical database identification information which is described in said access statement beforehand from said access statement and selecting said physical database indicated by said physical database identification information as an access object.

34. A distributed database management system according to claim 32, wherein the distributed database management system has an access table buffer for associating and holding the identification information of said physical database and the table identification information held in said physical database furthermore; and wherein said table location predicting means is means for searching for identification information of the designated table in said access table buffer, detecting the physical database corresponding to said table identification information, and selecting said physical database as an access object, and said table location searching unit includes means for storing the identification information of said physical database which is decided as an access object by transferring the access statement which designates said table and the identification information of said designated table in said access table buffer furthermore.

35. A distributed database management system according to claim 32, wherein the distributed database management system has a system catalog buffer for associating and holding identification information of said logical database, identification information of the physical database belonging to said logical database, and table identification information held in said physical database furthermore;

wherein said table location searching unit includes means for selecting each of at least one physical database belonging to said logical database as an access object, transferring said access statement to the physical database management system for managing said physical databases, creating a table having the identification information of the logical database, the identification information of the physical database belonging to said logical database, and the table identification information held in said physical database by combining the system catalog information of each physical database which is inputted as a response to said transfer into said physical database management system, informing said application program execution means which issues said access statement of the contents of said table, and storing the contents of said table in said system catalog buffer furthermore when said access statement to be transferred designates said logical database and instructs to refer to the system catalog; and wherein said table location predicting means is means for searching for the identification information of said designated table in said system catalog buffer, detecting the physical database corresponding to the table identification information, and selecting said physical database as an access object.

36. A distributed database management system according to claim 35, wherein the distributed database management system has an access table buffer for associating and holding the identification information of said physical database and the table identification information held in said physical database furthermore; and wherein said table location searching unit includes means for storing the identification information of said physical database which is an access object of transfer when the access statement designating said table is transferred and the identification information of said designated table in said access table buffer furthermore.

37. A distributed database management system according to claim 13, wherein said table location searching unit includes means for creating a new access statement for designating each table designated in said access statement one by one and instructing an operation which is the same as that of said access statement on the basis of said access statement when the access statement to be processed which is held in said statement buffer includes designation of a plurality of tables and for selecting each access statement as a processing object of said transfer and means for creating a table by combining a response corresponding to the transfer of each of said new access statements into said physical database management system, and informing said application program execution means which issues said access statements of the contents of said created tables furthermore.

38. A distributed database management system which is an information processor which is connected to at least one physical database holding a table via a physical database management system for managing said physical database, and is connected furthermore to application program execution means for accessing said physical database, receiving an access statement for accessing physical databases which is issued by said application program execution means, selecting one of said physical databases as an access object, and transferring said access statement to the physical database management system for managing said physical database, comprising:

a logical database dictionary for holding information on a logical database in which at least one of said physical databases is grouped;

a logical database defining unit for registering information on said logical database in said logical database dictionary;

a statement buffer for holding said access statement;

a logical database access controller for receiving an access statement from said application program execution means and storing it in said statement buffer; and a table location searching unit for transferring said access statement held in said statement buffer to the physical database management system for managing said physical database by selecting one of said physical databases as an access object;

wherein said table location searching unit includes means for receiving an access statement for instructing logging in the database, creating an access statement for designating each table designated in said access statement one by one and instructing an operation which is the same as that of said access statement when the access statement to be processed which is held in said statement buffer includes designation of a plurality of tables, selecting one of said physical databases belonging to the designated logical database as said access object, transferring said created access statements respectively, creating a new table by combining responses to said transfer, and informing said application program execution means which issues said access statement of the contents of said created table.

39. A distributed database management method in a system including a communication network, at least a terminal device including application program execution means connected to said communication network, a plurality of information processors connected to said communication network, and a plurality of physical databases installed in at least one of said information processors, said method comprising the steps of:

storing logical database information in at least one of said terminal device and said plurality of information processors, said logical database information defining at least a logical database grouping a plurality of said physical databases;

storing tables in at least one of said physical databases;

receiving a request for one of said tables from said application program execution means; and searching said table for which said request was received by searching a group of physical databases defined in said logical database information.

40. A distributed database management method in a system including a communication network, at least a terminal device including application program execution means connected to said communication network, a plurality of information processors connected to said communication network, and a plurality of physical databases installed in at least one of said information processors, said method comprising the steps of:

storing logical database information in at least one of said terminal device and said plurality of information processors, said logical database information defining at least a logical database grouping a plurality of said physical databases, and account information for identifying whether to approve an access to at least one of said physical databases;

receiving an access to a logical database from said application program execution means, account information for logging in a physical database constituting said logical database being inputted in said access; and searching said account information for logging in using the account information held in said logical database information.

41. A distributed database management method in a system which is an information processor which is connected to at least one physical database holding a table via a physical database management system for managing said physical database, and is connected furthermore to application program execution means for accessing said physical database, receiving an access statement for accessing physical databases which is issued by said application program execution means, selecting one of said physical databases as an access object, and transferring said access statement to the physical database management system for managing said physical database, said method comprising the steps of:

holding in a logical database dictionary, information on the logical database in which at least one of said physical databases is grouped;

registering by a logical database defining unit, information on said logical database in said logical database dictionary;

holding in a statement buffer, said access statement;

receiving through a logical database access controller, an access statement from said application program execution means and storing it in said statement buffer; and transferring through a table location searching unit, said access statement held in said statement buffer to the physical database management system for managing said physical database by selecting one of said physical databases as an access object;

wherein said table location searching unit includes means for receiving an access statement for instructing logging in the database, for selecting one of said physical databases belonging to the instructed logical database as an access object of said access statement when the database which is instructed to be connected is registered in said logical database dictionary as said logical database, for selecting another one of said physical databases belonging to the instructed logical database as an access object of said access statement when a response of access refusal is given to the transfer of said access statement, and for transferring said access statement held in said statement buffer once again.

42. A distributed database management method in a system which is an information processor which is connected to at least one physical database holding a table via a physical database management system for managing said physical database, and is connected furthermore to application program execution means for accessing said physical database, receiving an access statement for accessing physical databases which is issued by said application program execution means, selecting one of said physical databases as an access object, and transferring said access statement to the physical database management system for managing said physical database, said method comprising the steps of:

holding in a logical database dictionary, information on the logical database in which at least one of said physical databases is grouped;

registering by a logical database defining unit, information on said logical database in said logical database dictionary;

holding in a statement buffer, said access statement;

receiving through a logical database access controller, an access statement from said application program execution means and storing it in said statement buffer; and transferring through a table location searching unit, said access statement held in said statement buffer to the physical database management system for managing said physical database by selecting one of said physical databases as an access object;

wherein said table location searching unit includes means for receiving an access statement for instructing logging in the database, creating an access statement for designating each table designated in said access statement one by one and instructing an operation which is the same as that of said access statement when the access statement to be processed which is held in said statement buffer includes designation of a plurality of tables, selecting one of said physical databases belonging to the designated logical database as said access object, transferring said created access statements respectively, creating a new table by combining responses to said transfer, and informing said application program execution means which issues said access statement of the contents of said created table.

* * * * *